US012663802B2

(12) United States Patent
Suthar et al.

(10) Patent No.: US 12,663,802 B2
(45) Date of Patent: Jun. 23, 2026

(54) CLUTTER TIDYING ROBOT UTILIZING FLOOR SEGMENTATION FOR MAPPING AND NAVIGATION SYSTEM

(71) Applicant: Clutterbot, Inc., Claymont, DE (US)

(72) Inventors: Mahaveer Suthar, Bangalore (IN); Akash Jadhav, Kingston (CA); Justin David Hamilton, Wellington (NZ); Shantanu Singh, Bangalore (IN); Dhruv Krishna, Bangalore (IN)

(73) Assignee: Clutterbot, Inc., Claymont, DE (US)

( * ) Notice: Subject to any disclaimer, the term of this patent is extended or adjusted under 35 U.S.C. 154(b) by 50 days.

(21) Appl. No.: 18/745,868

(22) Filed: Jun. 17, 2024

(65) Prior Publication Data

US 2024/0419183 A1 Dec. 19, 2024

(30) Foreign Application Priority Data

Jun. 15, 2023 (IN) .............................. 202341040880

(51) Int. Cl.
G05D 1/246 (2024.01)
A47L 11/40 (2006.01)
(Continued)

(52) U.S. Cl.
CPC ........ G05D 1/2464 (2024.01); A47L 11/4011 (2013.01); A47L 11/4036 (2013.01);
(Continued)

(58) Field of Classification Search
CPC .... G05D 1/2464; G05D 1/245; G05D 1/2465; G05D 2105/10; G05D 1/242;
(Continued)

(56) References Cited

U.S. PATENT DOCUMENTS 6,338,013 B1 1/2002 Ruffner
6,810,305 B2 10/2004 Kirkpatrick, Jr.
(Continued)

FOREIGN PATENT DOCUMENTS

AU 2015218522 A1 9/2015
AU 2020101865 A4 10/2020
(Continued)

OTHER PUBLICATIONS

Gonzalez et al., Multi-LiDAR Mapping for Scene Segmentation in Indoor Environments for Mobile Robots, May 2022, MDPI, pp. 1-19. (Year: 2022).*

(Continued)

*Primary Examiner* — Navid Z. Mehdizadeh
*Assistant Examiner* — Caitlin R Mccleary
(74) *Attorney, Agent, or Firm* — Carnelian Law LLC

(57) ABSTRACT

A method and apparatus are disclosed for a clutter tidying robot utilizing floor segmentation for its mapping and navigation system, whereby a perception module and navigation module transform lidar and image data from lidar sensors and cameras of a robot sensing system using segmentation and pseudo-laserscan or point cloud transformations to generate global and local maps. The robot pose and maps are transmitted to a robot brain that directs an action module to produce robot action commands controlling the operation of a clutter tidying robot using the pose and map data. In this manner multi-stage planning and sophisticated obstacle avoidance techniques may be incorporated into autonomous robot operations.

20 Claims, 49 Drawing Sheets

(51) Int. Cl.

| | | |
|---|---|---|
| *G01S 17/86* | (2020.01) | |
| *G01S 17/89* | (2020.01) | |
| *G05D 1/245* | (2024.01) | |
| *G05D 105/10* | (2024.01) | |
| *G06V 10/25* | (2022.01) | |
| *G06V 10/26* | (2022.01) | |
| *G06V 10/30* | (2022.01) | |
| *G06V 10/764* | (2022.01) | |
| *G06V 10/80* | (2022.01) | |
| *G06V 20/58* | (2022.01) | |
| *G06V 20/70* | (2022.01) | |

(52) U.S. Cl.
CPC .............. *G01S 17/86* (2020.01); *G01S 17/89* (2013.01); *G05D 1/245* (2024.01); *G05D 1/2465* (2024.01); *G06V 10/25* (2022.01); *G06V 10/26* (2022.01); *G06V 10/30* (2022.01); *G06V 10/764* (2022.01); *G06V 10/803* (2022.01); *G06V 20/58* (2022.01); *G06V 20/70* (2022.01); *A47L 2201/04* (2013.01); *G05D 2105/10* (2024.01)

(58) Field of Classification Search
CPC ........... G05D 2101/20; G05D 2111/10; G05D 2111/17; G05D 2111/52; G05D 2111/54; G05D 1/243; G05D 1/246; G05D 1/667; G05D 2105/14; G05D 2107/40; G05D 2109/10; A47L 11/4011; A47L 11/4036; A47L 2201/04; G01S 17/86; G01S 17/89; G06V 10/25; G06V 10/26; G06V 10/30; G06V 10/764; G06V 10/803; G06V 20/58; G06V 20/70

See application file for complete search history.

(56) References Cited

U.S. PATENT DOCUMENTS

| | | | |
|---|---|---|---|
| 9,089,969 | B1 | 7/2015 | Theobald |
| 9,827,677 | B1 | 11/2017 | Gilbertson et al. |
| 9,827,678 | B1 | 11/2017 | Gilbertson et al. |
| 10,207,408 | B1 | 2/2019 | Ebrahimi Afrouzi |
| 11,020,858 | B2 | 6/2021 | Amacker et al. |
| 11,407,118 | B1 | 8/2022 | Augenbraun et al. |
| 11,409,296 | B1 * | 8/2022 | Kim ...................... G05D 1/0214 |
| 11,720,117 | B1 * | 8/2023 | Kim ...................... G01C 21/383 |
| | | | 701/23 |
| 11,789,457 | B1 * | 10/2023 | Woo ........................ H04R 3/005 |
| | | | 700/253 |
| 12,064,880 | B2 | 8/2024 | Hamilton et al. |
| 12,287,639 | B1 | 4/2025 | Queiroz et al. |
| 12,310,545 | B1 | 5/2025 | Hamilton |
| 2002/0116089 | A1 | 8/2002 | Kirkpatrick, Jr. |
| 2006/0116973 | A1 | 6/2006 | Okamoto et al. |
| 2007/0239315 | A1 | 10/2007 | Sato et al. |
| 2009/0137348 | A1 | 5/2009 | Tsai |
| 2016/0260161 | A1 | 9/2016 | Atchley et al. |
| 2017/0329333 | A1 | 11/2017 | Passot et al. |
| 2018/0104815 | A1 | 4/2018 | Yang |
| 2018/0284792 | A1 | 10/2018 | Kleiner et al. |
| 2018/0312095 | A1 | 11/2018 | Eletrabi |
| 2018/0329425 | A1 | 11/2018 | Watts |
| 2019/0217476 | A1 | 7/2019 | Jiang et al. |
| 2020/0026301 | A1 * | 1/2020 | Taylor .................. G05D 1/0214 |
| 2020/0086182 | A1 | 3/2020 | New et al. |
| 2020/0156246 | A1 | 5/2020 | Srivastav |
| 2020/0279436 | A1 * | 9/2020 | Bleyer .................. G06T 15/005 |
| 2020/0376675 | A1 | 12/2020 | Bai et al. |
| 2021/0038950 | A1 | 2/2021 | Sullivan |
| 2021/0069904 | A1 | 3/2021 | Duan et al. |
| 2021/0128989 | A1 | 5/2021 | Legg et al. |
| 2021/0132213 | A1 * | 5/2021 | Advani ................. G01S 13/865 |
| 2021/0138311 | A1 | 5/2021 | Wang et al. |
| 2021/0339393 | A1 | 11/2021 | Dan |
| 2021/0373560 | A1 | 12/2021 | Koga et al. |
| 2022/0168893 | A1 | 6/2022 | Hamilton et al. |
| 2022/0171907 | A1 | 6/2022 | Chang et al. |
| 2022/0253056 | A1 | 8/2022 | Ranjan et al. |
| 2022/0398775 | A1 * | 12/2022 | Streem ................... G06T 17/05 |
| 2023/0015751 | A1 | 1/2023 | Serackis et al. |
| 2023/0116896 | A1 | 4/2023 | Hamilton et al. |
| 2023/0206755 | A1 * | 6/2023 | Jha ......................... G08G 1/005 |
| | | | 340/425.5 |
| 2023/0401837 | A1 | 12/2023 | Yan et al. |
| 2024/0142994 | A1 | 5/2024 | Ebrahimi Afrouzi |
| 2024/0192690 | A1 * | 6/2024 | Ebrahimi Afrouzi .. G06N 3/047 |
| 2024/0218863 | A1 | 7/2024 | Eletrabi et al. |
| 2024/0292990 | A1 | 9/2024 | Hamilton |
| 2024/0424355 | A1 | 12/2024 | Zhang et al. |
| 2024/0428560 | A1 | 12/2024 | Buerkle et al. |

FOREIGN PATENT DOCUMENTS

| | | |
|---|---|---|
| AU | 2022360549 A1 | 5/2024 |
| CN | 202526850 U | 11/2012 |
| CN | 107137890 A | 9/2017 |
| CN | 107378958 A | 11/2017 |
| CN | 107650147 A | 2/2018 |
| CN | 108217183 A | 6/2018 |
| CN | 108786065 A | 11/2018 |
| CN | 110558900 A | 12/2019 |
| CN | 210616549 U | 5/2020 |
| CN | 111633627 A | 9/2020 |
| CN | 112828847 A | 5/2021 |
| CN | 114468859 A | 5/2022 |
| CN | 218552245 U | 3/2023 |
| CN | 116616642 A | 8/2023 |
| CN | 116709962 A | 9/2023 |
| CN | 117442132 A | 1/2024 |
| DE | 102017112740 A1 | 12/2018 |
| EP | 1942223 B1 | 7/2008 |
| EP | 3766591 A1 | 1/2021 |
| JP | 2019092999 A | 6/2019 |
| JP | 2020138046 A | 9/2020 |
| JP | 2023052271 A | 4/2023 |
| KR | 1020190130941 | 11/2019 |
| KR | 20200126036 A | 11/2020 |
| KR | 20230139407 A | 10/2023 |
| KR | 20240133919 A | 9/2024 |
| WO | 2012103525 A2 | 8/2012 |
| WO | 2016105702 A1 | 6/2016 |
| WO | 2019126332 A1 | 6/2019 |
| WO | 2020071669 A1 | 4/2020 |
| WO | 2020190272 A1 | 9/2020 |
| WO | 2022029730 A1 | 2/2022 |
| WO | 2022115761 A1 | 6/2022 |
| WO | WO-2023031620 A1 * | 3/2023 ............... G06T 7/11 |
| WO | 2023060285 A1 | 4/2023 |
| WO | 2023110103 A1 | 6/2023 |
| WO | 2025184405 A1 | 9/2025 |

OTHER PUBLICATIONS

U.S. Appl. No. 63/119,533, filed Nov. 30, 2020, Justin David Hamilton.

Bahl, Laavanye et al. "Cu Bi: A Decluttering Robot". Dec. 2018. Retrieved from the Internet (Year: 2018).

Bahl, Laavanye et al. "Cu Bi: Room De cluttering Robot". May 2019. Retrieved from the Internet (Year: 2019).

U.S. Appl. No. 63/253,867, filed Oct. 8, 2021, Justin David Hamilton.

Bahl, Laavanye et al. "Cu Bi: Room De cluttering Robot". May 2019. Retrieved from the Internet (Year: 2019) Carnegie Mellon University pp. 1-29.

PCT/US2022/077917 International Search Report dated Jan. 25, 2023.

PCT/US2022/077917 Written Opinion of the ISA.

Official Action Translation from Japanese Patent Office dated Apr. 2, 2024 for application JP 2023-533262 100107766.

(56)            References Cited

OTHER PUBLICATIONS

PCT/US2021/061143 International Search Report Feb. 8, 2022.
PCT/US2021/061143 Written Opinion of the International Searching Authority Feb. 6, 2022.
China National Intellectual Property Administration Application No. 202180080246.2 filing date May 30, 2023 First Office Action, entire document dated Nov. 3, 2025.
China National Intellectual Property Administration Application No. 202180080246.2 filing date May 30, 2023 First Office Action, entire document dated Nov. 3, 2025 translation.
Changsheng Shen (Bobby), "CMU MRSD 2020: Team D—Cu Bi—A Decluttering Robot," YouTube, Dec. 10, 2019. https://www.youtube.com/watch?v=IA-MaF _m8QA (accessed Jan. 19, 2026). (Year: 2019).
Canberk Alper et al: "Cloth Funnels: Canonicalized-Alignment for Multi-Purpose Garment Manipulation", 2023 IEEE International Conference On Robotics and Automation (ICRA), IEEE, May 29, 2023 (May 29, 2023), pp. 5872-5879.
CuBi: Room Decluttering Robot May 2019) (chromeextension:// efaidnbmnnnibpcajpcglclefindmkaj/https://mrsdprojects.ri.cmu.edu/ 2018teamd/wpcontent/uploads/sites/34/2019/12/TeamD_ FinalReport 10.pdf).

Guanqi Chen et al: "Language-Augmented Symbolic Planner for Open-world Task Planning", Arxiv.Org, Cornell University Library, Jul. 13, 2024.
PCT/US25/43792, International Search Report, Dec. 10, 2025.
PCT/US25/43792, Written Opinion, Dec. 10, 2025.
PCT/US25/43802, International Search Report, Dec. 16, 2025.
PCT/US25/43802, Written Opinion, Dec. 16, 2025.
PCT/US25/43805, International Search Report, Dec. 16, 2025.
PCT/US25/43805, Written Opinion, Dec. 16, 2025.
PCT/US25/44087, International Search Report, Jan. 8, 2026.
PCT/US25/44087, Written Opinion, Jan. 8, 2026.
PCT/US25/44271, International Search Report, Jan. 5, 2026.
PCT/US25/44271, Written Opinion, Jan. 5, 2026.
PCT/US25/44310, International Search Report, Nov. 27, 2025.
PCT/US25/44310, Written Opinion, Nov. 27, 2025.
PCT/US25/44316, International Search Report, Jan. 8, 2026.
PCT/US25/44316, Written Opinion, Jan. 8, 2026.
PCT/US25/44322, International Search Report, Dec. 11, 2025.
PCT/US25/44322, Written Opinion, Dec. 11, 2025.
PCT/US25/44326, International Search Report, Dec. 15, 2025.
PCT/US25/44326, Written Opinion, Dec. 15, 2025.
Tsurumine Yoshihisa et al.: "Variationally Autoencoded Dynamic Policy Programming for Robotic Cloth Manipulation Planning based on Raw Images", 2022 IEEE/SICE International Symposium On System Integration (SII), IEEE, Jan. 9, 2022, pp. 416-421.

* cited by examiner

700

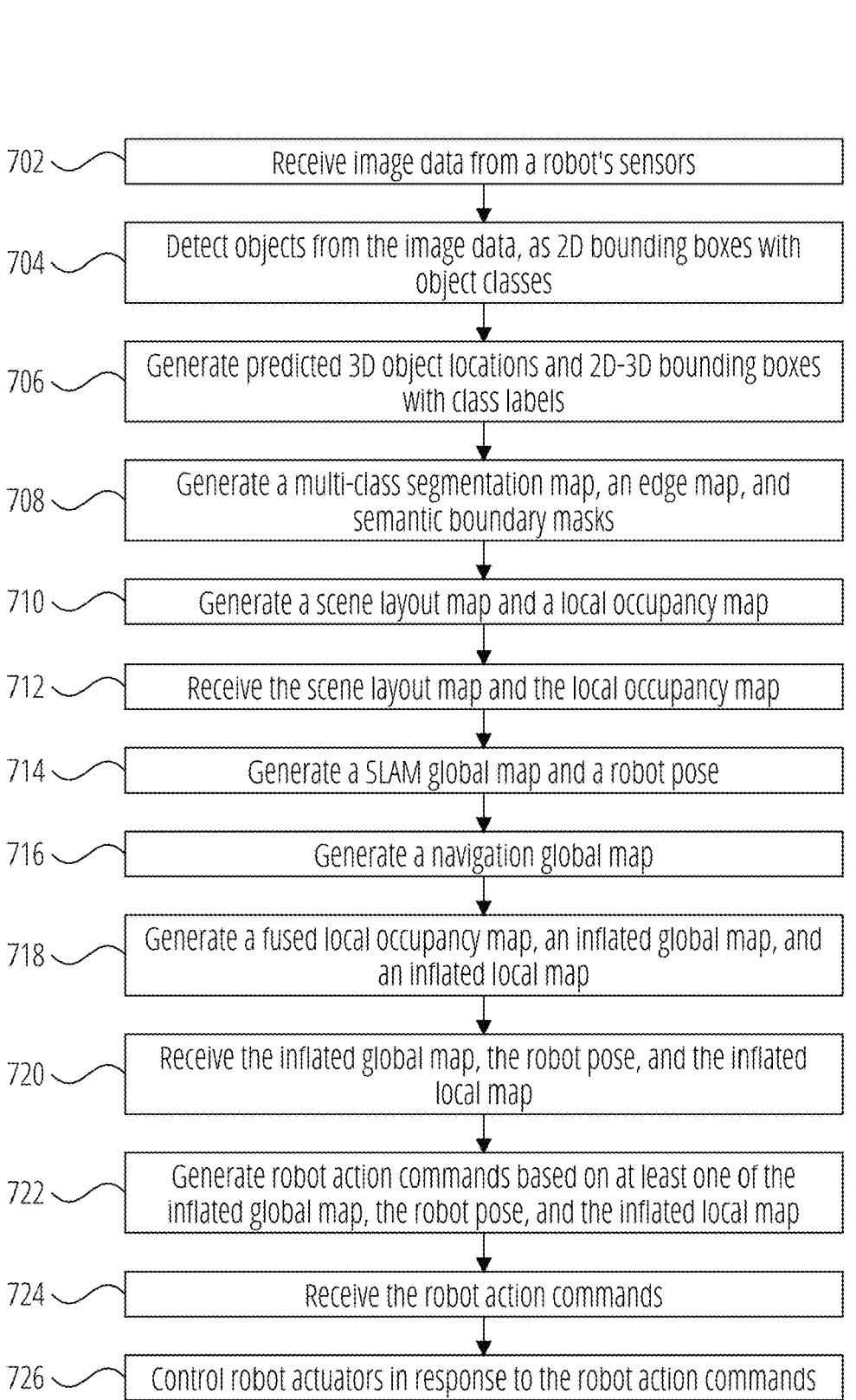

702 — Receive image data from a robot's sensors

704 — Detect objects from the image data, as 2D bounding boxes with object classes 706 — Generate predicted 3D object locations and 2D-3D bounding boxes with class labels 708 — Generate a multi-class segmentation map, an edge map, and semantic boundary masks 710 — Generate a scene layout map and a local occupancy map 712 — Receive the scene layout map and the local occupancy map 714 — Generate a SLAM global map and a robot pose 716 — Generate a navigation global map 718 — Generate a fused local occupancy map, an inflated global map, and an inflated local map 720 — Receive the inflated global map, the robot pose, and the inflated local map 722 — Generate robot action commands based on at least one of the inflated global map, the robot pose, and the inflated local map 724 — Receive the robot action commands 726 — Control robot actuators in response to the robot action commands

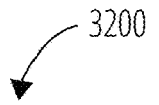
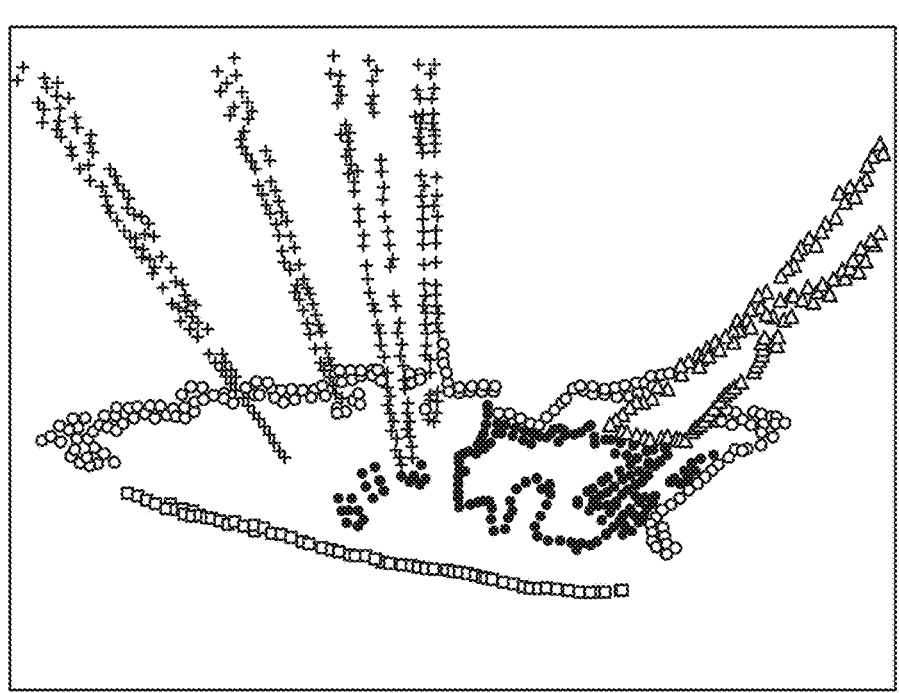
FIG. 32
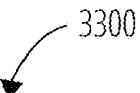
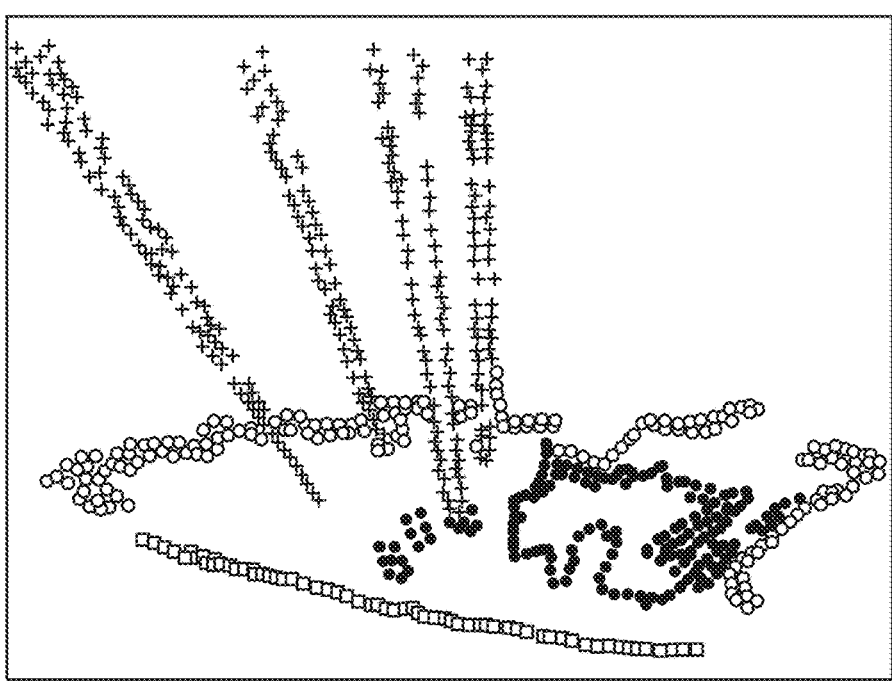
FIG. 33

3400

3500

3600

3700

3800

3900

4000

4100

4400

4500

4600

5700

1600

5702

5704

CLUTTER TIDYING ROBOT UTILIZING FLOOR SEGMENTATION FOR MAPPING AND NAVIGATION SYSTEM

CROSS-REFERENCE TO RELATED APPLICATIONS

This application claims the benefit of and priority to Foreign National provisional patent application No. 202341040880, filed in India on Jun. 15, 2023, the contents of which are incorporated herein by reference in their entirety.

BACKGROUND

Objects underfoot represent not only a nuisance but also a safety hazard. Thousands of people each year are injured in a fall at home. A floor cluttered with loose objects may represent a danger, but many people have limited time in which to address the clutter in their homes. Automated cleaning or robots may represent an effective solution.

However, some objects present a variety of challenges in how they may be effectively captured and contained for transport to an appropriate repository or deposition location. Objects that are proportionally large in comparison with the containment area may not be simply swept up and moved. A set of small, lightweight objects may scatter or roll with initial contact, and capturing them one at a time may present a drain on both time and robot energy. Highly deformable objects may simply slide out of or bunch away from rigid capturing mechanisms. Some objects may stack neatly with care but present an unpleasantly dispersed and disorganized pile if simply dropped and left as they land.

There is, therefore, a need for a capture, containment, transport, and deposition algorithm that accounts for the geometry and capabilities of the robot's components and potential difficulties associated with certain types of objects.

BRIEF SUMMARY

A method is disclosed comprising receiving, at a perception module of a robotic control system, image data from a robot's sensors, wherein the perception module comprises a detection module, a scene segmentation module, and a mapping module, wherein the robot's sensors include at least one of cameras, lidar sensors, inertial measurement unit (IMU) sensors, wheel encoders, and other sensors. The method includes detecting, by the detection module, objects from the image data, as 2D bounding boxes with object classes. The method includes generating, by the detection module, predicted 3D object locations, using the 2D bounding boxes and a ground plane and 2D-3D bounding boxes with class labels, the 2D-3D bounding boxes based on the predicted 3D object locations. The method includes generating, by the scene segmentation module, a multi-class segmentation map, using a segmentation model to segregate a floor boundary and other relevant regions in the image data, an edge map including the floor boundary and other relevant boundaries, with semantic information, and semantic boundary masks, from the multi-class segmentation map, wherein the semantic boundary masks identify relevant boundaries and their semantic information. The method includes generating, by the mapping module, using the 2D-3D bounding boxes and the semantic boundary masks, a scene layout map, wherein the scene layout map includes elements relevant for global mapping, and a local occupancy map, wherein the local occupancy map includes elements useful for local path planning and local obstacle avoidance. The method includes receiving, at a navigation module, the scene layout map, and the local occupancy map, wherein the navigation module includes a simultaneous localization and mapping module (SLAM), a global mapper module, and a fusion and inflation module. The method includes generating, by the SLAM, using lidar data, IMU data, and wheel encoding data, a SLAM global map, which comprises a 2D occupancy grid representation of an environment with obstacle information at lidar height and real-time location information of a robot, and a robot pose. The method includes generating, by the global mapper module, using the SLAM global map, the lidar data, and the scene layout map, a navigation global map, which represents an improved 2D occupancy grid representation of the environment over the SLAM global map. The method includes generating, by the fusion and inflation module using the lidar data, the navigation global map, and the local occupancy map, a fused local occupancy map, with the lidar data and information from the navigation global map and the local occupancy map, making the fused local occupancy map useful for obstacle avoidance, an inflated global map, which includes buffer regions for the robot around obstacles, and an inflated local map based on the fused local occupancy map, which includes the buffer regions for the robot around the obstacles. The method includes receiving, at a robot brain, the inflated global map, the robot pose, and the inflated local map. The method includes generating, by the robot brain, robot action commands based on at least one of the inflated global map, the robot pose, and the inflated local map. The method includes receiving, at an action module, the robot action commands. Finally, the method includes controlling robot actuators in response to the robot action commands.

An apparatus is also disclosed comprising a robot, a processor, and a memory storing instructions that, when executed by the processor, configure the apparatus to perform the disclosed method.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 7 illustrates a routine 700 in accordance with one embodiment.

FIG. 16-FIG. 52 provide exemplary visual representations of data that is input to, processed in, and output by the perception module and navigation module embodiments herein.

DETAILED DESCRIPTION

The disclosed solution includes a robot configured with operational controls that direct the robot to perform tidying and vacuuming actions autonomously based on signals detected from sensors. In some embodiments, user inputs or configuration settings may be provided to configure the operational controls. These inputs may be analyzed through a number of processing steps and then acted upon by the robot as described herein.

At a high level, the robot may detect image data of its surroundings in conjunction with distance scanning based on lidar technology, and may use this data for segmentation, object detection, and classification, in order to determine what objects need to be acted upon, what objects need to be avoided, what objects obstruct potential paths across the floor, and which areas of the floor are drivable. This information may be used to update global and local maps used by the robot to plan its tasks and navigate its surroundings to perform those tasks.

Figure 1:
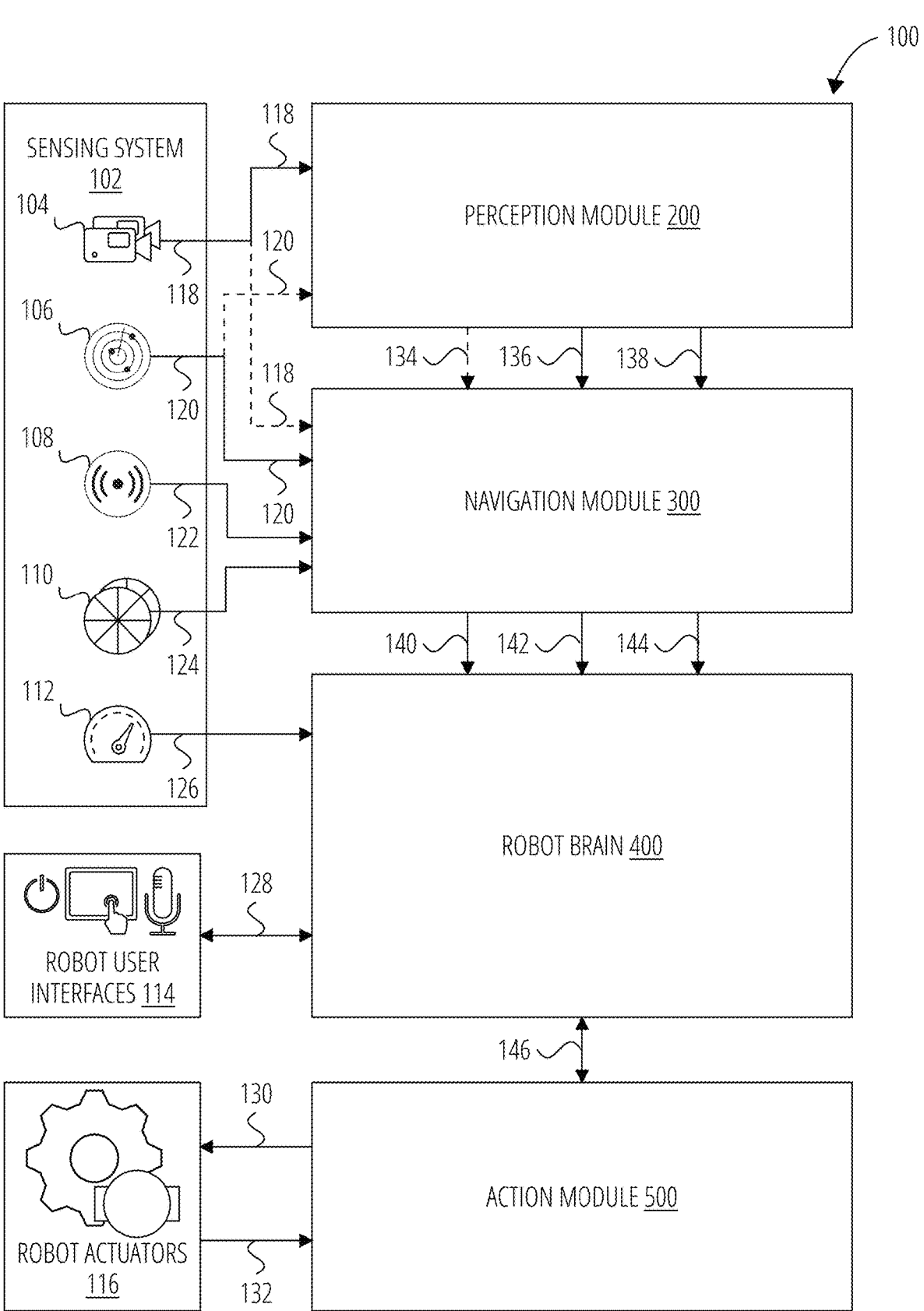
FIG. 1 illustrates robotic control system interfaces 100 in accordance with one embodiment.

FIG. 1 illustrates robotic control system interfaces 100 in accordance with one embodiment. The robotic control system interfaces 100 may comprise a sensing system 102, including the robot's sensors, such as cameras 104, lidar sensors 106, IMU sensors 108, wheel encoders 110, and other sensors 112. The robotic control system interfaces 100 may further comprise robot user interfaces 114 and robot actuators 116. A tidying robot such as the robot 5300 introduced in FIG. 53A having a robotic control system such as the robotic control system 5500 described with respect to FIG. 55 may include operational components that interface with the sensing system 102, robot user interfaces 114, robot actuators 116, and each other. These components may include a perception module 200, a navigation module 300, a robot brain 400, and an action module 500, which are described in detail with respect to FIG. 2 through FIG. 5.

The perception module 200 may receive image data 118 from the cameras 104. In one embodiment, the perception module 200 may receive additional data from other elements of the sensing system 102. For example, in one embodiment the perception module 200 may also receive lidar data 120 from the lidar sensors 106. Based on the input image data 118 received from the cameras 104, the perception module 200 may generate scene layout map data 136 and local occupancy map data 138 as described with respect to FIG. 2. The scene layout map data 136 and local occupancy map data 138 may be transmitted to the navigation module 300. In some embodiments, the perception module 200 may send the filtered 2D and 3D bounding boxes 134 it may generate to the navigation module 300 as well. Additional embodiments for the perception module and its operation are illustrated in and described with respect to FIG. 8-FIG. 11.

The navigation module 300 may receive lidar data 120 from the lidar sensors 106, IMU data 122 from the IMU sensors 108, and wheel encoding data 124 from the wheel encoders 110 in addition to the scene layout map data 136 and local occupancy map data 138 from the perception module 200. The lidar data 120, IMU data 122, and wheel encoding data 124 may be used to determine a position or "pose" of the robot 5300 within the environment it intends to navigate. In addition, this data may be used to transform the scene layout map data 136 and local occupancy map data 138 into an inflated local map data 142 and inflated global map data 144, as is described in greater detail with respect to FIG. 3. The robot pose 140, inflated local map data 142, and inflated global map data 144 may be transmitted to the robot brain 400. Additional embodiments for the navigation module and its operation are illustrated in and described with respect to FIG. 12-FIG. 14.

The robot brain 400 may receive other sensor data 126 from the other sensors 112 of the sensing system 102 in addition to the robot pose 140, inflated local map data 142, and inflated global map data 144 from the navigation module 300. The other sensor data 126 may be used along with the data from the navigation module 300 to generate robot operating system (ROS) messages, such as ROS messaging signals 146, for transmission to the action module 500. This is described in greater detail with respect to FIG. 4 and FIG. 5.

The action module 500 may receive the ROS messaging signals 146 from the robot brain 400. The action module 500 may generate robot action command signals 130 based on the ROS messaging signals 146 from the robot brain 400, as is described in greater detail with respect to FIG. 5. The robot actuators 116 may be actuated by these robot action command signals 130 in a manner that commands the robot 5300 to perform actions as directed by the robot brain 400. During such actuation, the forces applied by the robot actuators 116 as they operate may be measured and transmitted back to the action module 500 as actuator force feedback signals 132. Such actuator force feedback signals 132 may indicate the completion of actions, the encountering of obstructions, fault conditions, etc. The action module 500 may use ROS messaging signals 146 to communicate the actuator force feedback signals 132 back to the robot brain 400.

Figure 2:
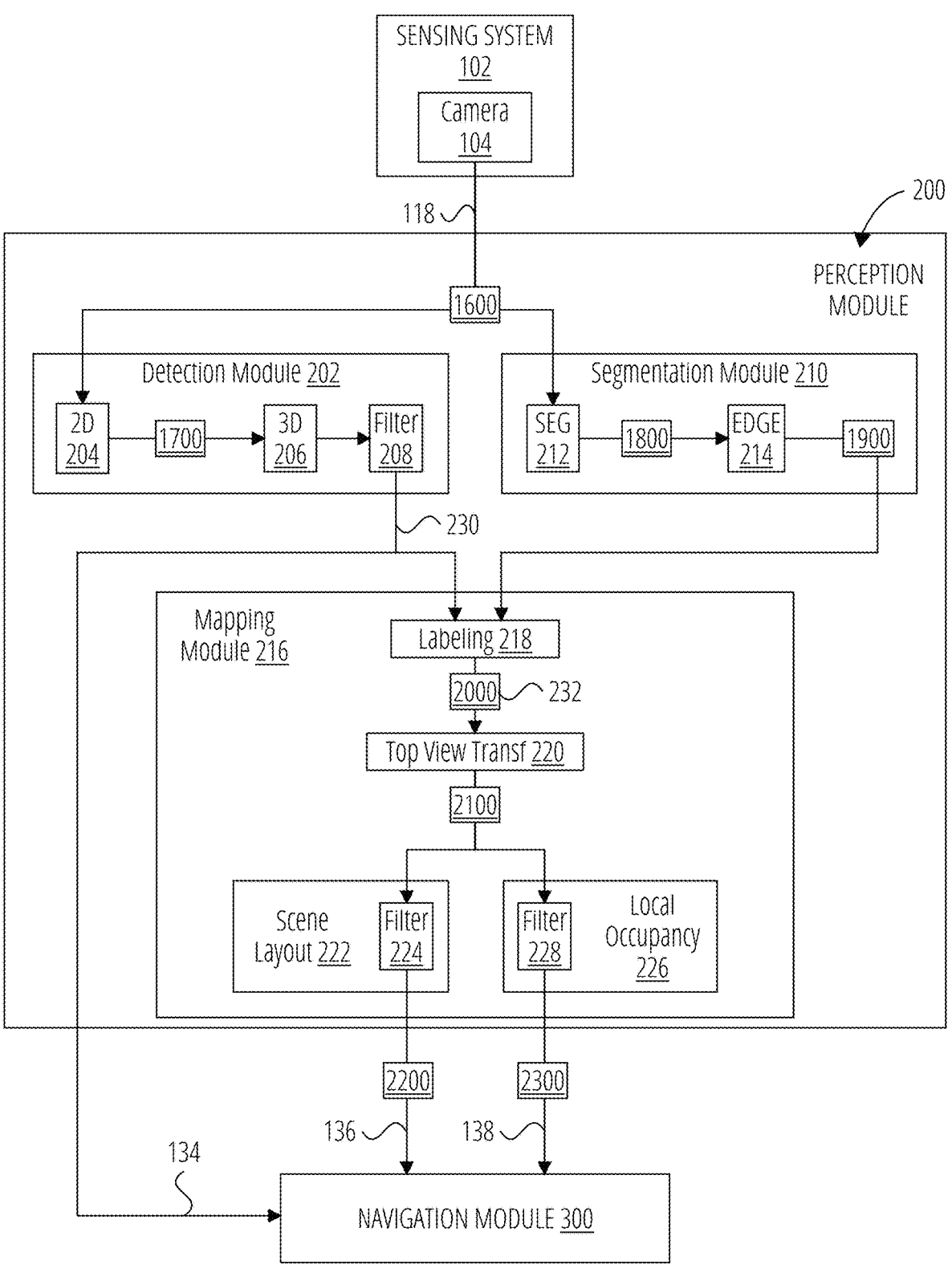
FIG. 2 illustrates a perception module 200 in accordance with one embodiment.

FIG. 2 illustrates a perception module 200 in accordance with one embodiment. The perception module 200 may include a detection module 202, a scene segmentation module 210, and a mapping module 216. In one embodiment, the detection module 202 may include a 2D object detection model 204, 3D location prediction 206, and detection filtering 208. The scene segmentation module 210 may include a segmentation model 212 and edge detection algorithms 214. In one embodiment, the mapping module 216 may include a labeling module 218, a top view transformation module 220, a scene layout module 222, and a local occupancy module 226. The perception module 200 may take in image data 118 from the sensing system 102 and may produce scene layout map data 136 and local occupancy map data 138, which it may transmit to the navigation module 300.

The perception module 200 may take in raw red/green/blue (RGB) image data 118 and may create higher-level features such as 2D bounding boxes and class labels for objects detected in the image data, as well as scene layout and local occupancy maps for use in planning and navigation. The perception module 200 may use object detection and segmentation models to identify different elements in the scene represented by the image data. These elements may be converted into 3D coordinates and/or maps using post-processing algorithms.

Detected objects may be classified and labeled in a number of ways. Some classes that may be useful for the purposes of a clutter tidying robot may be "obstacles," "dynamic objects," "static objects," "movable objects," "tidyable objects," "toys," "pets," "humans," "children," "clothing," "furniture," "miscellaneous household object," etc. Detected objects may be identified using one or more class labels, as is most useful for robot planning and operation. "Obstacles" refers to objects that may impede the passage of a robot as it navigates its environment to complete desired tasks. "Dynamic objects" refers to objects that may be expected to move independently of the robot during the time the robot is exploring, and navigating its environment, such as people, pets, other robots, etc. The term "Static object" in this disclosure refers to elements of a scene that are not expected to change over time, typically because they are rigid and immovable. Some composite objects may be split into a movable part and a static part. Examples include door frames, bookshelves, walls, countertops, floors, couches, dining tables, etc. The term "Movable object" in this disclosure refers to elements of the scene that are not desired to be moved by the robot (e.g., because they are decorative, too large, or attached to something), but that may be moved or deformed in the scene due to human influence. Some composite objects may be split into a movable part and a static part. Examples include doors, windows, blankets, rugs, chairs, laundry baskets, storage bins, etc. The term "Tidyable object" in this disclosure refers to elements of the scene that may be moved by the robot and put away in a home location. These objects may be of a type and size such that the robot may autonomously put them away, such as toys, clothing, books, stuffed animals, soccer balls, garbage, remote controls, keys, cellphones, etc.

Figure 16:
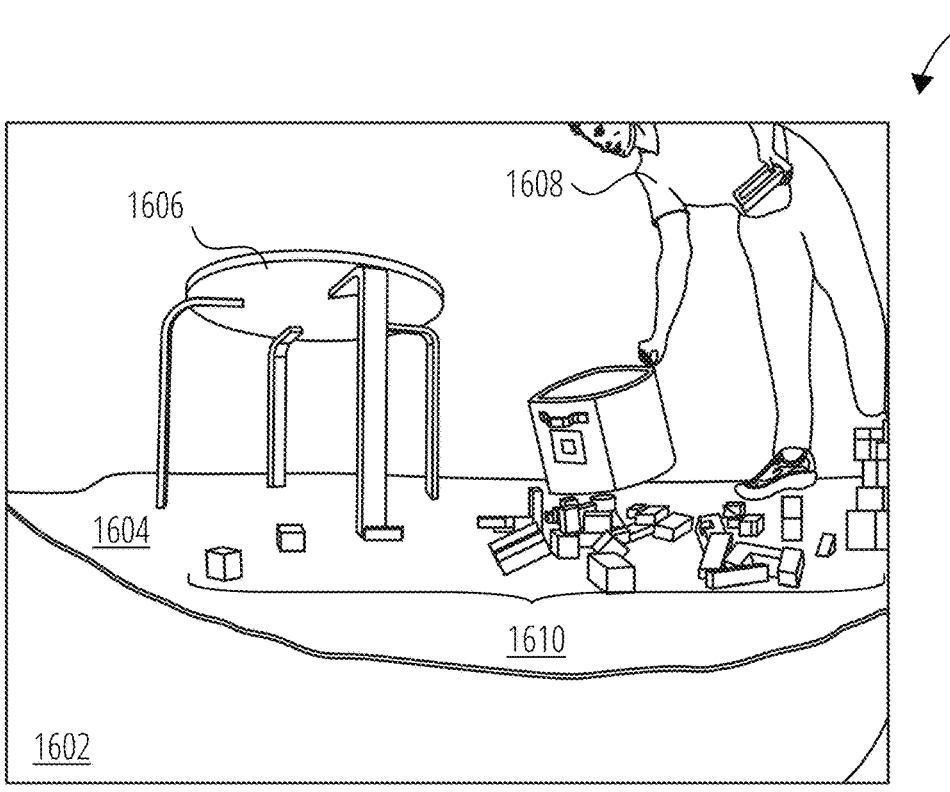
Figure 17:
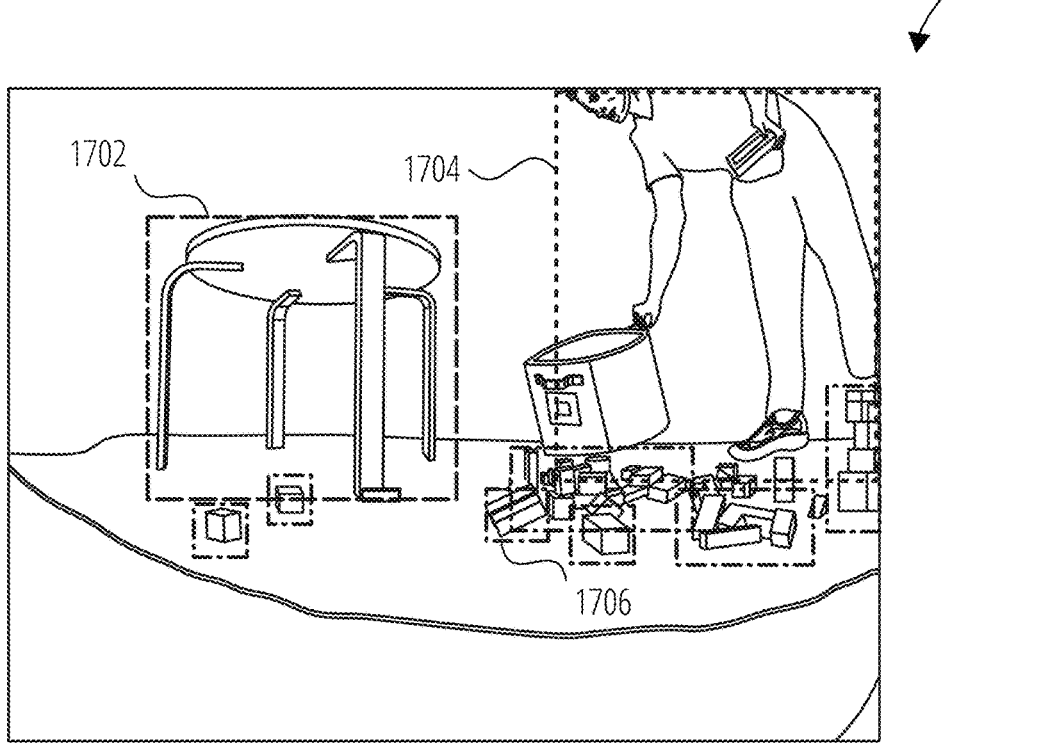

Given image data 118, such as a raw RGB camera frame representing a detected image of a scene 1600, exemplified by the image shown in FIG. 16, the detection module 202 may estimate the shape and positions of objects of interest in the frame with respect to the robot 5300, such as the floor 1602, rug 1604, furniture 1606, person 1608, and toys 1610 captured in the detected image of a scene 1600. The detection module 202 may use a 2D object detection model 204 to detect objects in the frame. This may include object classifications and the extents of 2D bounding boxes indicating the locations of the objects. Object detection models such as those in the You Only Look Once (YOLO) series or DEtection TRansformer (DETR) series may be used to perform object detection through neural network architectures or using classical methods. These models may produce 2D bounding boxes with pixel coordinates for box center and size, as well as class labels, such as toy, bin, bin-label, book, clothes, home-misc., human, pet, furniture, etc., as exemplified by classified 2D bounding boxes 1700. Exemplary classified 2D bounding boxes 1700, as shown in FIG. 17, may include bounding boxes classified to indicate obstacles 1702, dynamic objects 1704, tidyable objects 1706, etc.

The detection module 202 may then use 3D location prediction 206 and a detected ground plane to generate 3D bounding boxes for the objects in the classified 2D bounding boxes 1700. The detections may be lifted from 2D to 3D, assuming the objects are on the ground (in contact with the ground plane). This allows the detection module 202 to project the detected objects as 3D bounding boxes with respect to the frame of reference of the robot 5300. Assuming all detections to be on the ground, the bottom corners of the bounding boxes may be used as contact points with the floor. Where the height of the camera from the floor is known, as may be the case for the 160, the 3D location of each floor pixel in the image plane may be calculated. This may be used to convert the contact points for each 2D bounding box to 3D coordinates with respect to the camera. The height of each bounding box may be assumed to be the same as the width.

Where the assumption of every object being on the floor is violated, much larger distances may be calculated as a result. These issues may be corrected by post-processing detection filtering 208, where the 3D outputs may be filtered to remove irrelevant objects such as humans, furniture, and other objects that violate assumptions of being on the ground or are projected inside the shovel 5308 of the robot 5300. The detection filtering 208 may take in the 2D and 3D bounding boxes and the class labels and may compute a distance from the 3D bounding boxes to a known center point of the robot 5300. This distance may be used to determine whether or not the object is too far from the robot, or whether it lies within the extent of the robot 5300 shovel 5308. Objects too far from the robot 5300 and objects in the shovel 5308 may have their classification and bounding box data removed to form a set of filtered 2D-3D bounding boxes and class labels 230.

The scene segmentation module 210 may take in raw RGB image data 118, such as the detected image of a scene 1600, and may use a segmentation model 212 to identify the floor and any rugs, playmats, and other relevant boundaries as an edge map. The segmentation model 212 may be a model such as BiSeNet, Scaformer, or a similar model. The segmentation model 212 may produce a multi-class segmentation map 1800 for the floor or drivable area.

Figure 19:
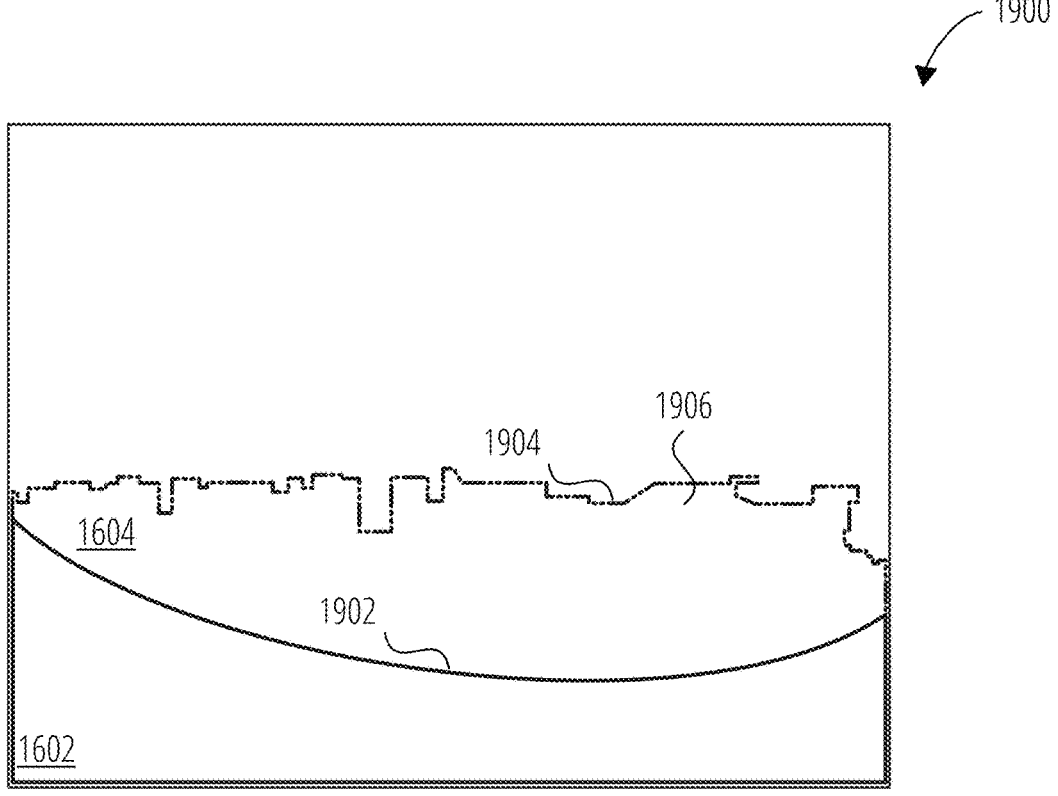

The multi-class segmentation map may be sent to edge detection algorithms 214. The edge detection algorithm 214 may be a 3×3 kernel convolution with thresholding deployed on a graphics processing unit (GPU) or central processing unit (CPU). Canny or a similar edge detector may be used. Techniques such as mask-shifting followed by mask subtraction, performed by the GPU or CPU may be used. In this manner, the edge detection algorithms 214 may identify the relevant boundaries in the segmentation map with their semantic information. The scene segmentation module 210 may in this manner output drivable area boundary masks with semantic information 1900, as illustrated in FIG. 19, identifying a floor boundary 1902 for the detected floor 1602 region and other relevant boundaries 1904 for other relevant regions 1906, such as the rug 1604, or playmats, drop cloths, etc., as drivable area boundary masks with semantic information 1900. The drivable area boundary masks with semantic information 1900 from the scene segmentation module 210, and the filtered 2D-3D bounding box and class label 230 from the detection module 202, may both be passed to the mapping module 216 for further processing.

The mapping module 216 may take the filtered 2D-3D bounding box and class label 230 and drivable area boundary masks with semantic information 1900 as input and may add additional semantic context. In this manner, the mapping module 216 may generate semantically rich pseudo-laserscans that may be used for planning and navigation tasks by the robot 5300. A labeling module 218 of the mapping module 216 may take in the filtered 2D-3D bounding box and class label 230 and drivable area boundary masks with semantic information 1900 and may provide additional semantic labels 232 to the boundary map to improve task-specific filtering of generated pseudo-laserscan points. The locations of 2D bounding boxes or the 3D locations of 3D bounding boxes with respect to the robot 5300 may be used to determine points in the edge mask that are inside the corresponding bounding boxes. All of these points may be assigned the same label as the bounding box to provide a semantically rich boundary map 2000.

A top view transformation module 220 may receive the semantically rich boundary map 2000 and use it to create a pseudo-laserscan/point cloud with semantic label classes 2100. The top view transformation module 220 may wrap the image of the semantically rich boundary map 2000 to real-world location coordinates. In one embodiment, this may be performed using a lookup table that stores the pixel mappings from image space to the real world. In one embodiment, this may be performed using a homography matrix that maps the pixels to real-world coordinates in real time. The pseudo-laserscan/point cloud with semantic label classes 2100 may be sent to a scene layout module 222 and a local occupancy module 226.

The scene layout module 222 may accept the pseudo-laserscan/point cloud with semantic label classes 2100 and may pass it through a filter 224, keeping the semantically relevant points needed for global mapping and discarding points not needed. The filter 224 may iterate over all of the points in the pseudo-laserscan/point cloud with semantic label classes 2100 and may remove points whose class does not match classes identified in the filter 224 configuration parameters. The result may be scene layout map data 136 such as the scene layout map 2200, which may include the elements relevant for global mapping and may be transmitted to the navigation module 300.

The local occupancy module 226 may take in the pseudo-laserscan/point cloud with semantic label classes 2100 and may pass it through a filter 228, keeping the semantically relevant points needed for local path planning and obstacle avoidance. The filter 228 may iterate over all of the points in the pseudo-laserscan/point cloud with semantic label classes 2100 and may remove those whose class does not match classes identified in the configuration for the filter 228. The filtered laserscan/point cloud may form local occupancy map data 138 such as the local occupancy map 2300, which may include elements useful for local path planning and local obstacle avoidance and may be transmitted to the navigation module 300. In some embodiments, the filtered 2D-3D bounding box and class label 230 may be passed to the navigation module 300 or other navigation module embodiment as shown for the filtered 2D and 3D bounding boxes 134 introduced in FIG. 1.

Figure 3:
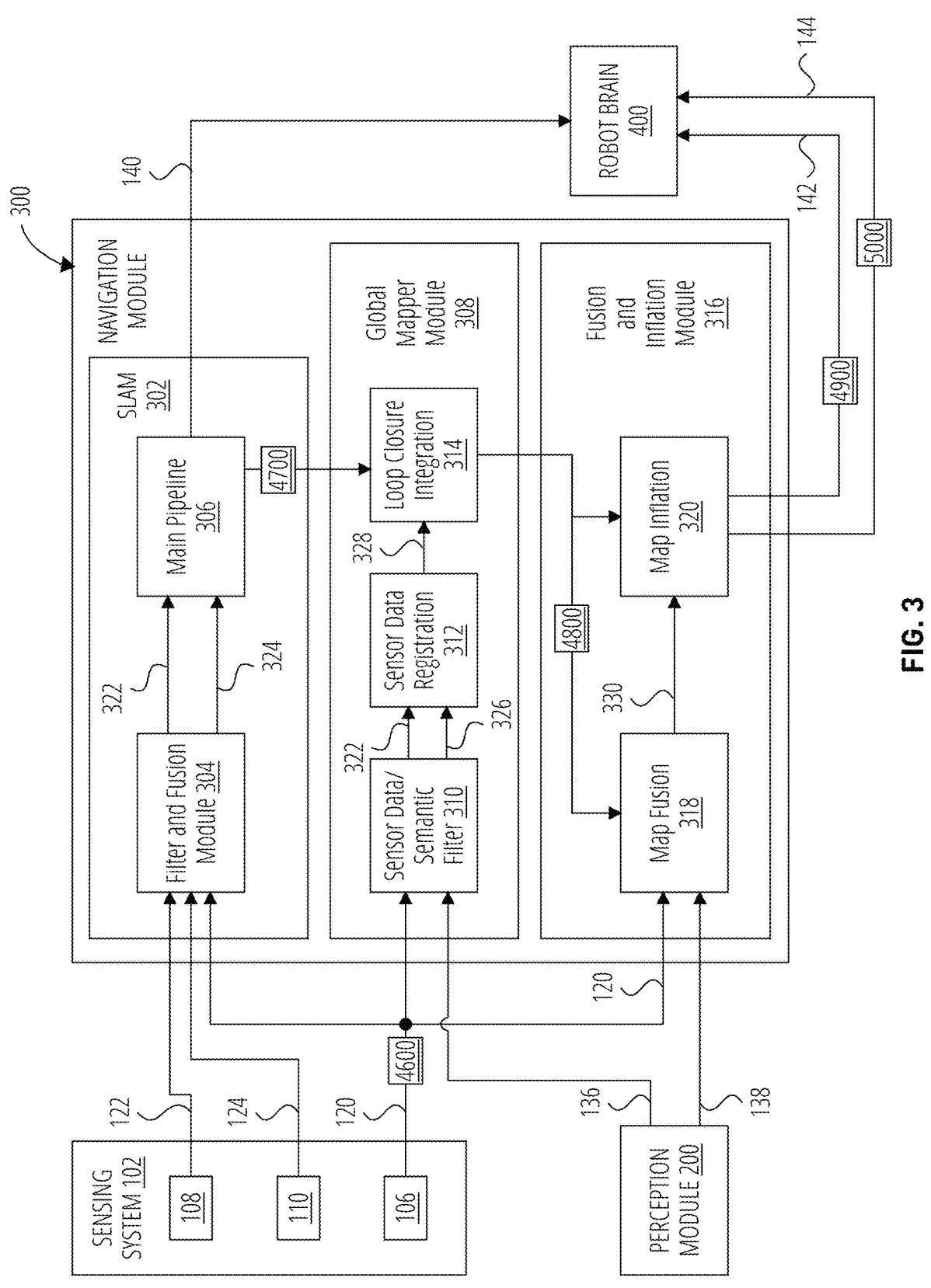
FIG. 3 illustrates a navigation module 300 in accordance with one embodiment.

FIG. 3 illustrates a navigation module 300 in accordance with one embodiment. The navigation module 300 may include a simultaneous localization and mapping module 302, a global mapper module 308, and a fusion and inflation module 316. In one embodiment, the simultaneous localization and mapping module 302 may include a sensor data filter and fusion module 304 and a main pipeline 306. The global mapper module 308 may include a sensor data filter and semantic filter 310, multi-sensor data registration 312, and loop closure integration 314. The fusion and inflation module 316 may include map fusion 318 and map inflation 320. The navigation module 300 may take in lidar data 120, IMU data 122, and wheel encoding data 124 from the sensing system 102, as well as scene layout map data 136 and local occupancy map data 138 from the perception module 200. The navigation module 300 may use this data to generate a robot pose 140, an inflated local map data 142, and an inflated global map data 144, which it may transmit to the robot brain 400.

The simultaneous localization and mapping module 302 may process the lidar data 120, IMU data 122, and wheel encoding data 124 as described below to determine a robot 5300 pose and location within a SLAM global map. The robot 5300 may be capable of taking on a number of poses for the purposes of performing its tasks, these poses comprising the conditions and actions of its moveable parts, such as the shovel 5308, shovel arm 5310, shovel arm pivot point 5312, grabber pads 5314, grabber pad arms 5316, pad pivot points 5318, and pad arm pivot points 5320, described in detail with respect to FIG. 53A through FIG. 54E. The main pipeline 306 of the simultaneous localization and mapping module 302 may provide the robot pose 140 to the robot brain 400.

The sensor data filter and fusion module 304 of the simultaneous localization and mapping module 302 may take in lidar data 120, which is a form of laser or visual data representing detected objects in a scene 4600, as well as IMU data 122 and wheel encoding data 124 as a source of odometry. Additional visual and odometry data may be received as input from other sources depending on the application or on the hardware available. This data may be passed through relevant filters to eliminate noise and data that is potentially unreliable. Lidar data 120 may be passed through a box filter that may remove data that lies within a predefined footprint around the lidar, in order to cater to objects around the lidar that may move along with it. This may be achieved by checking each point in the lidar data 120 to determine if the point lies within a provided polygon based on the number of intersections of a line passing through the point and infinity with all sides of the polygon.

Other filters may be used at this stage as well, based on the quality of lidar data 120 input. In this manner, the sensor data filter and fusion module 304 may generate filtered lidar data 322.

In order to cater to the bias offset created due to the misalignment of the IMU sensor 108 z-axis with a gravity vector, a correction filter may be used by the sensor data filter and fusion module 304 to rectify this offset in the angular velocity output of the sensor, represented in the IMU data 122. This offset may be configured at a calibration step. The filter stage may subtract the same offset from every data instance. Additional components of the IMU data 122 may be used and filtered appropriately in the sensor data filter and fusion module 304 depending on the input data quality.

Owing to the noise in the angular velocity output of wheel encoding data 124, the same may be filtered by the sensor data filter and fusion module 304. The remaining wheel encoding data 124 may be fused with the filtered IMU data 122 to generate an encoder-IMU filtered and fused odometry data 324 source for the simultaneous localization and mapping module 302. An extended Kalman filter (EKF) may be used for this fusion. The filtered lidar data 322 and filtered and fused odometry data 324 created by the sensor data filter and fusion module 304 may be passed to the simultaneous localization and mapping module 302 main pipeline 306.

The main pipeline 306 may receive the filtered lidar data 322 and filtered and fused odometry data 324, as well as other relevant visual and odometry information depending on the application or available hardware. The sensing system 102 may provide a new laser measurement, in the form of lidar data 120 at particular intervals governed by robot motion. The lidar data 120 may correspond to a given odometry reading at these intervals, which may also be determined using data from the sensing system 102, as described above. For each new laser measurement provided in the filtered lidar data 322, a new 2D point registration may be created by the main pipeline 306. The filtered lidar data 322 for a single time instance may be provided in the form of consecutive angular range measurements that give a Euclidean distance between an obstacle detected at a point located at a particular angle from the lidar center. This angular range may be provided in polar coordinate form. This polar data may be converted to 2D cartesian coordinates using standard formulas for 2D geometry, and then transformed from the lidar frame of reference (center of lidar) to the frame of reference for the odometry reading at that point in time, provided in the filtered and fused odometry data 324. The 2D point registrations may be added to a pose-graph, which may be a graphical representation of the odometry poses at each lidar measurement and their relationships, where nodes represent the poses and edges represent the spatial constraints (i.e., 2D transformations between the poses of corresponding nodes). The pose-graph may be initiated by the main pipeline 306 when it is provided the filtered lidar data 322 from the robot's initial lidar scan.

The main pipeline 306 may use consecutive such filtered lidar data 322 scans and filtered and fused odometry data 324 readings for scan-to-scan matching to estimate and correct any odometry slippages that may have occurred between lidar scans. An odometry slippage may be detected when the filtered and fused odometry data 324 is inconsistent with the location of the robot 5300 indicated by the filtered lidar data 322. As subsequent scans and readings arrive at the main pipeline 306, a number "N" of the poses (nodes) in the pose-graph may be used together in a chain to look for loop closure. The number N may be tuned based on factors such as expected odometry and lidar noise and compute availability. Loop closure may be detected by determining if the current location being observed through the sensors has been previously visited by the robot or not. This is achieved by comparing current sensor data instances with previously stored instances corresponding to the area near the current estimated location of the robot. If a loop closure is detected, a correction constraint may be added to the pose-graph. The odometry poses for the N poses in the chain may be corrected based on the results from a pose-graph optimization. The optimization may be an error minimization technique incorporating the correction of the newly observed loop closure constraint into the N previous poses. As a result, the main pipeline 306 may effectively achieve better global consistency in the SLAM global map it generates as output by reducing distortions and noise in mapped regions that arise from odometry slippages.

The main pipeline 306 may perform a final spatial registration that may include probabilistically updating the 2D point registrations using methods such as Bayesian belief update and log odds update, which are based on counters of hits and misses of lidar beams. The final spatial registration may use all of the 2D point registrations it has collected from all data instances in a common grid for each particular location in the occupancy grid (cell location) defined by its spatial location in the real world, the starting location of the pipeline, and the map resolution. This grid is initialized at an origin point of the occupancy grid map based on the location where the pipeline is started. The local occupancy grid may drift due to odometry slippage but may be corrected in this manner. Grid sizing depends on the resolution of the map to be created and updated in the main pipeline 306, as well as the extents of the coordinates in the 2D point registrations generated above, which may increase as the robot explores more areas. This workflow encompasses the approach based on the sensor suite used by us. However, for a different set of sensors, providing similar types of sources may involve additional or alternative steps, but overall may eventually lead to a similar occupancy grid-based representation of the environment.

Figure 47:
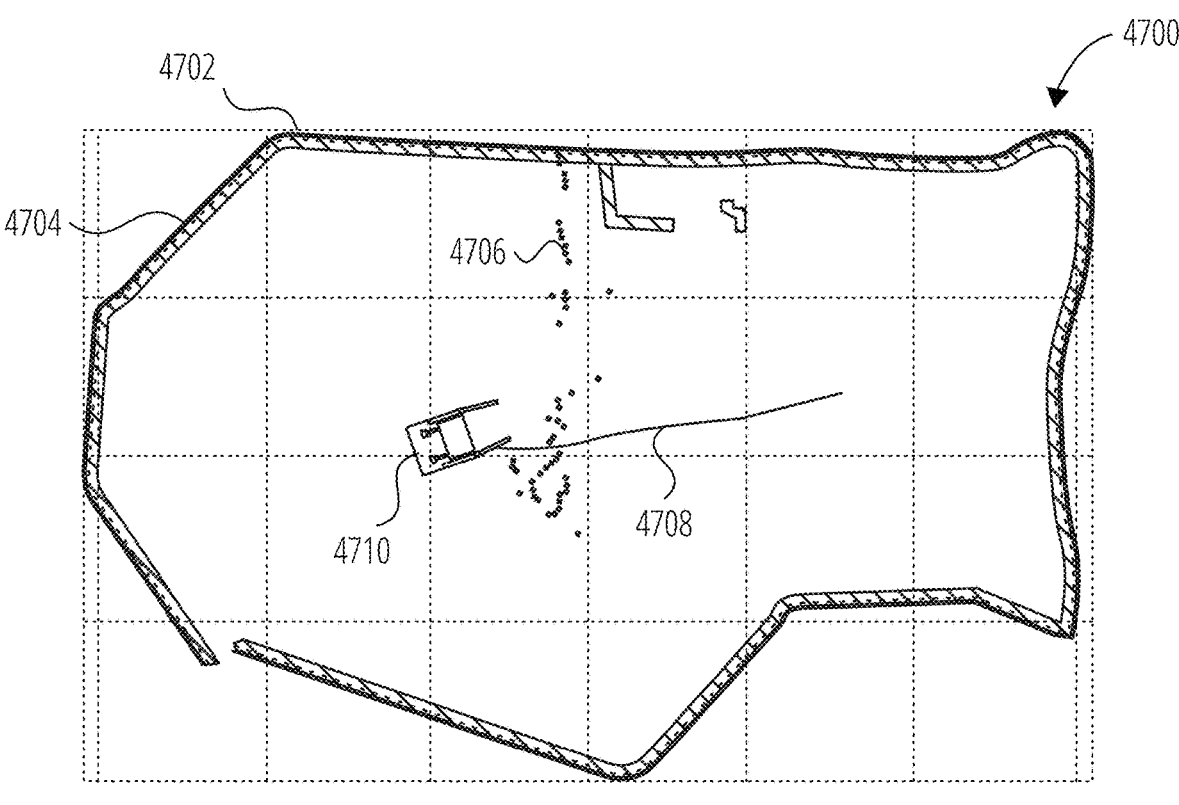

Through these steps, the main pipeline 306 may produce a SLAM global map 4700, which may be a 2D occupancy grid representation 4702 of the environment with obstacle information at lidar height and real-time location information for the robot. An exemplary SLAM global map 4700 is shown in FIG. 47, along with lidar data 4704, scene map data 4706, a global plan 4708, and real-time location information of the robot 4710. The main pipeline 306 may provide the SLAM global map 4700 to the loop closure integration 314 module of the global mapper module 308, which is described in greater detail below.

The global mapper module 308 may include a sensor data filter and semantic filter 310. The sensor data filter and semantic filter 310 may receive as input the lidar data 120 from the sensing system 102, as well as other sources of relevant visual information, and the scene layout map data 136 from the perception module 200. Similar to the sensor data filter and fusion module 304 of the simultaneous localization and mapping module 302, this filter may eliminate noise and potentially unreliable data in the context of mapping without regard to localization (the global mapper module 308 may rely on the simultaneous localization and mapping module 302 for accurate localization). The lidar data 120 and other visual data may be processed as described for the sensor data filter and fusion module 304. The scene layout map data 136 may be passed through a semantic filter that caters to the filtering of points from the scene layout map data 136 based on semantic information provided. This may act as an additional step of filtering control to eliminate unreliable/irrelevant semantic labels during mapping. The filtered lidar data 322 and filtered scene layout map 326 provided by the sensor data filter and semantic filter 310 may be input to the multi-sensor data registration 312.

Similar to the SLAM main pipeline 306, the multi-sensor data registration 312 may create 2D point registrations, but in this case, it may be for the visual sensors of the sensing system 102. These registrations may created using the localization information from the simultaneous localization and mapping module 302 module rather than odometry data. The multi-sensor data registration 312 may transform the visual sensor data from the sensor frame of reference to the frame of reference in which the SLAM module main pipeline 306 provides real-time localization information, i.e., the location where the main pipeline 306 begins mapping. All of the 2D point registrations for the visual sensor data may then be probabilistically updated together in a common 2D occupancy grid based on predetermined sensor confidence values using similar approaches to those described for the main pipeline 306 above. Additional optimization techniques such as those used for the pose-graph optimization as well as particle filter-based updates may be introduced to provide additional accuracy improvements based on the use case. The multi-sensor data registration 312 may thus create 2D point registrations 328 forming a 2D occupancy grid representation of the environment with obstacle information at lidar height and information from the scene layout map data 136.

The 2D point registrations 328 may be provided to the loop closure integration 314 of the global mapper module 308, along with the SLAM global map 4700 from the simultaneous localization and mapping module 302, including odometry pose corrections for the N data points at their N timestamps. The loop closure integration 314 may use these inputs to create a navigation global map 4800 that is an improved 2D occupancy grid representation 4802, as compared with the 2D occupancy grid representation 4702 of the SLAM global map 4700. The loop closure integration 314 may leverage the loop closure performed in the simultaneous localization and mapping module 302 to improve already-registered points that may be affected due to slippage in odometry that has been fixed by the simultaneous localization and mapping module 302 but may need to be updated in the global mapper module 308. The loop closure integration 314 may reiterate over the 2D point registrations 328 that are temporally near the loop closure pose corrections previously generated. In this manner, slippage may not need to be recomputed and recorrected during global mapper registration at the multi-sensor data registration 312.

Figure 48:
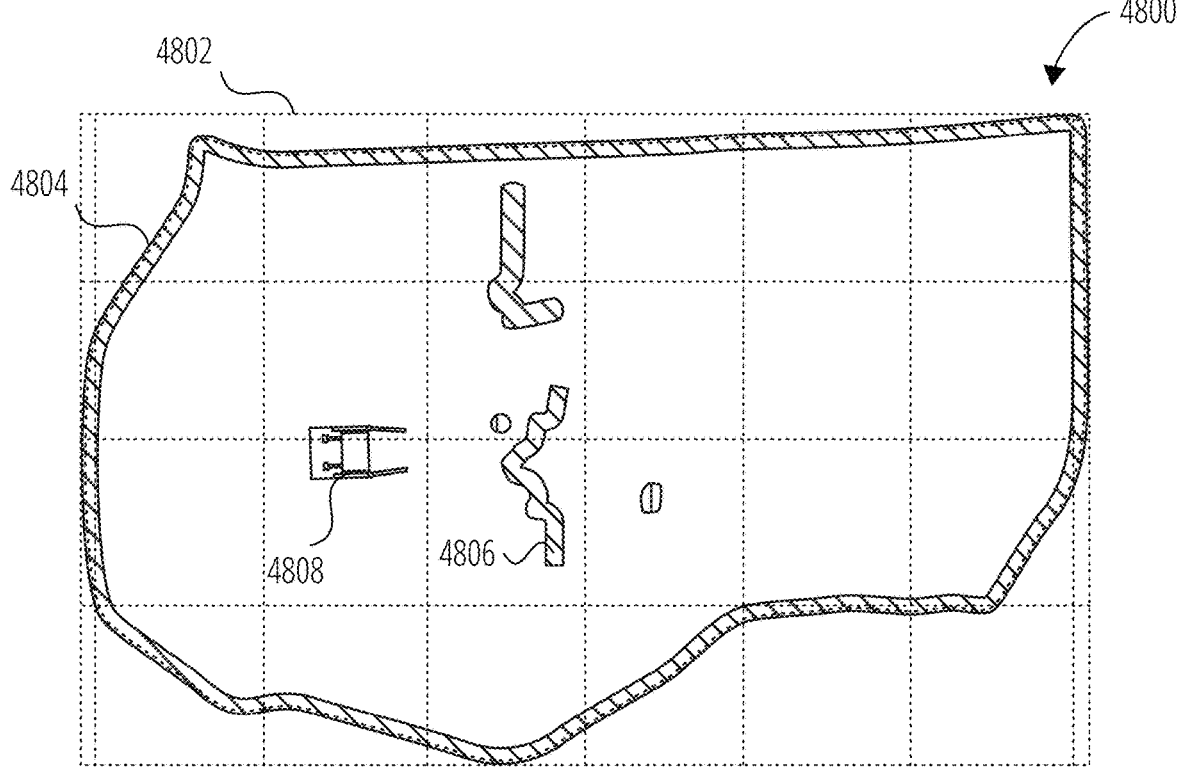

Using these map pose corrections, the loop closure integration 314 may update each data instance, and may then update the corresponding 2D point registrations 328 using the corrected poses. These updated registrations may then be used to re-update the probabilities of respective cells in the grid of the navigation global map 4800 in a manner similar to that used by the main pipeline 306 to update the SLAM global map 4700. The navigation global map 4800 may thus be an improved 2D occupancy grid representation 4802 of the environment (as compared to the SLAM global map 4700). An exemplary navigation global map 4800 is shown in FIG. 48, along with lidar data 4804, scene map data 4806, and real-time location information of the robot 4808.

The navigation global map 4800 may be sent to the fusion and inflation module 316. The fusion and inflation module 316 may also receive lidar data 120 from the sensing system

102 and local occupancy map data 138 from the perception module 200. The map fusion 318 of the fusion and inflation module 316 may fuse the multiple input maps and/or sensor data into a fused local occupancy map 330. The local occupancy map data 138 and the lidar data 120 may be used to register the data points in a single-shot manner onto the navigation global map 4800 from the global mapper module 308. Any new point in the local occupancy map data 138 or lidar data 120 may be updated immediately in the output fused local occupancy map 330, not probabilistically. The fused local occupancy map 330 may then be cropped into a smaller square map around the robot 5300 (acting as its center). This may provide a local map that is useful for obstacle avoidance in the environment. The immediate updates of laser data may aid with the inclusion of objects at lidar height, such as humans walking, furniture, etc., within the lidar field of vision, as well as those from the local occupancy map data 138 that may be below the lidar field of vision, such as pets, babies, toys, etc. The fused local occupancy map 330 may be passed to map inflation 320.

Figure 49:
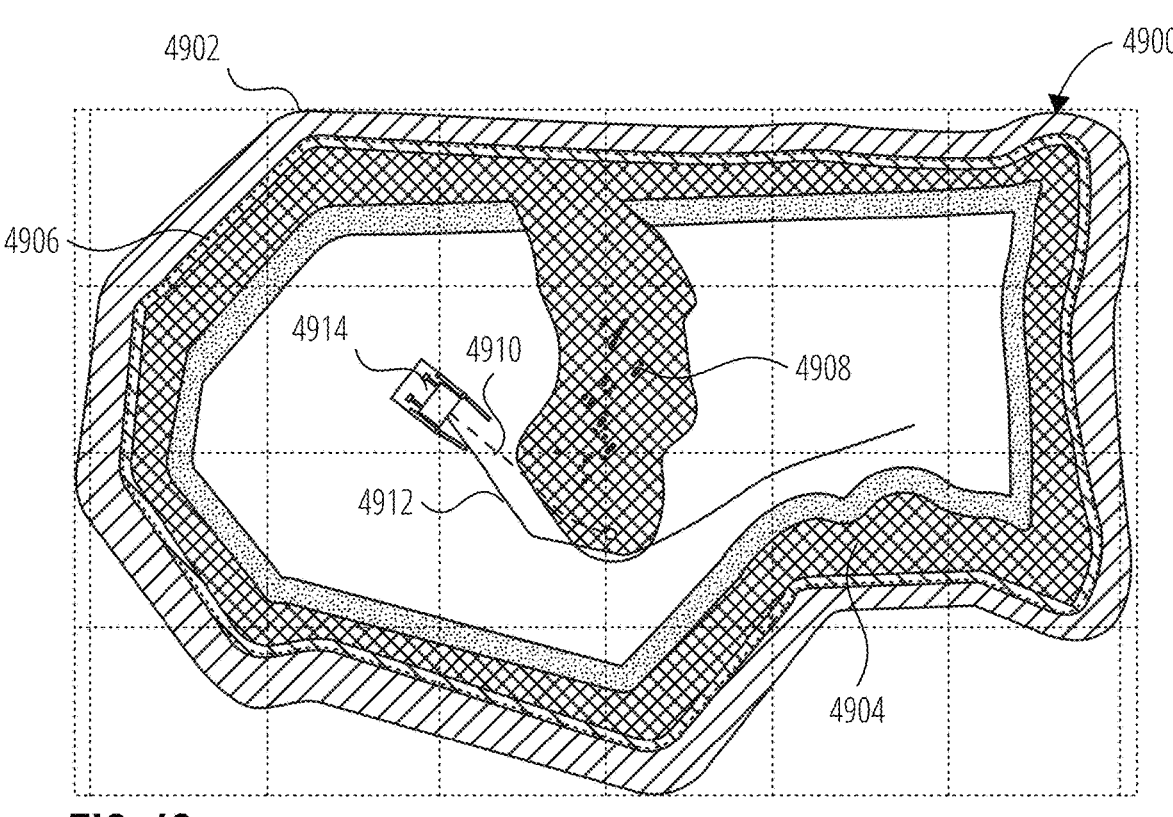

The map inflation 320 may take in the navigation global map 4800 from the global mapper module 308 and the fused local occupancy map 330 from map fusion 318. In applications where other map information is available, the map inflation 320 may also take in this data. Map inflation 320 may perform the inflation of input occupancy grid maps to include a factor of safety around obstacles, in essence creating a buffer for the robot 5300. The size of this buffer region may be governed by the robot's size in order to enable it to avoid obstacles. In one embodiment map inflation 320 may be used to make inflated versions of global and local maps that may be used for navigation. An expanded occupied cost region may be created around every occupied cell in the input occupancy grid, based on the radius of inflation. This may aid the robot 5300 in planning its movements to avoid these regions of buffer around obstacles. This inflation may also help mask narrow spaces in the environment that may appear to be free space but may not have dimensions that would allow the robot 5300 to pass through. In this manner, the map inflation 320 may produce an inflated local map 4900 that is a 2D occupancy grid representation 4902 of the robot's environment with a buffer region 4904. An exemplary inflated local map 4900 is shown in FIG. 49, including the lidar data 4906 and scene map data 4908. A local plan with an integrated global mapper module 4910, a global plan with an integrated global mapper module 4912, and real-time location information of the robot 4914 are also shown. The inflated local map 4900 may be provided as inflated local map data 142 to the robot brain 400.

Figure 50:
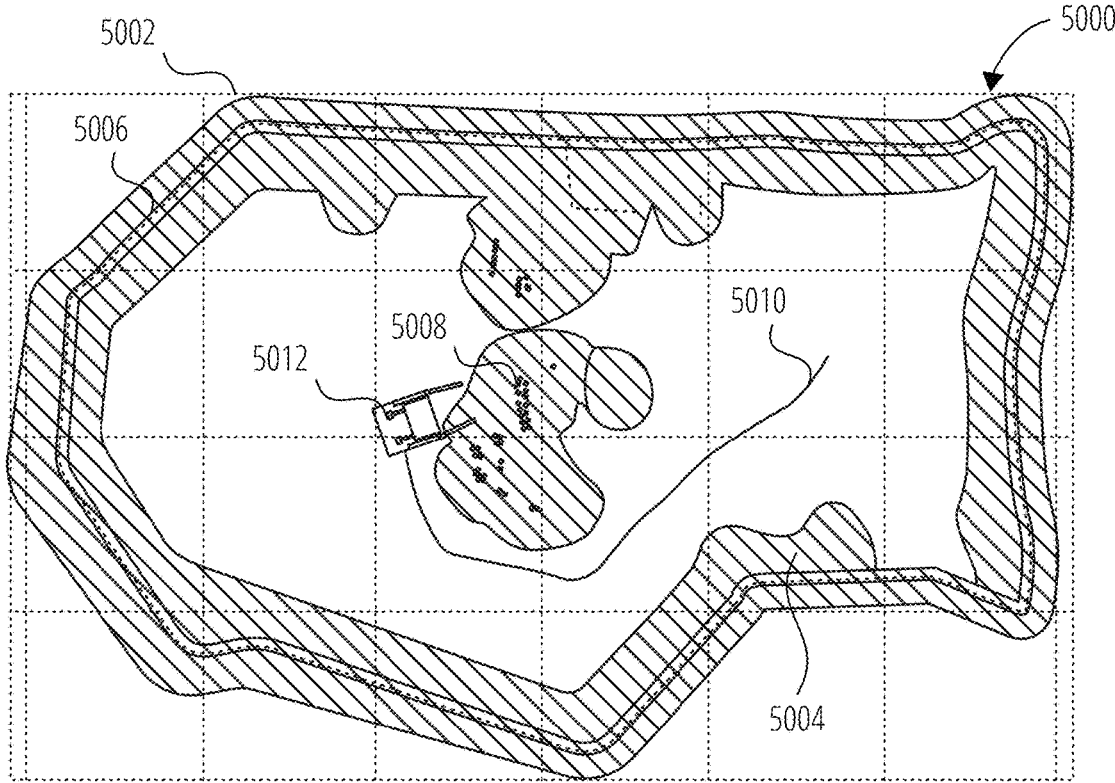

Similarly, the map inflation 320 may produce an inflated global map 5000 that may be provided as inflated global map data 144 to the robot brain 400. The inflated global map 5000 may be a 2D occupancy grid representation 5002 including a buffer region 5004. An exemplary inflated global map 5000 is shown in FIG. 50, including lidar data 5006 and scene map data 5008. A global plan 5010 and real-time location information of the robot 5012 are also shown. The inflated global map 5000 may be provided as inflated global map data 144 to the robot brain 400.

Figure 12:
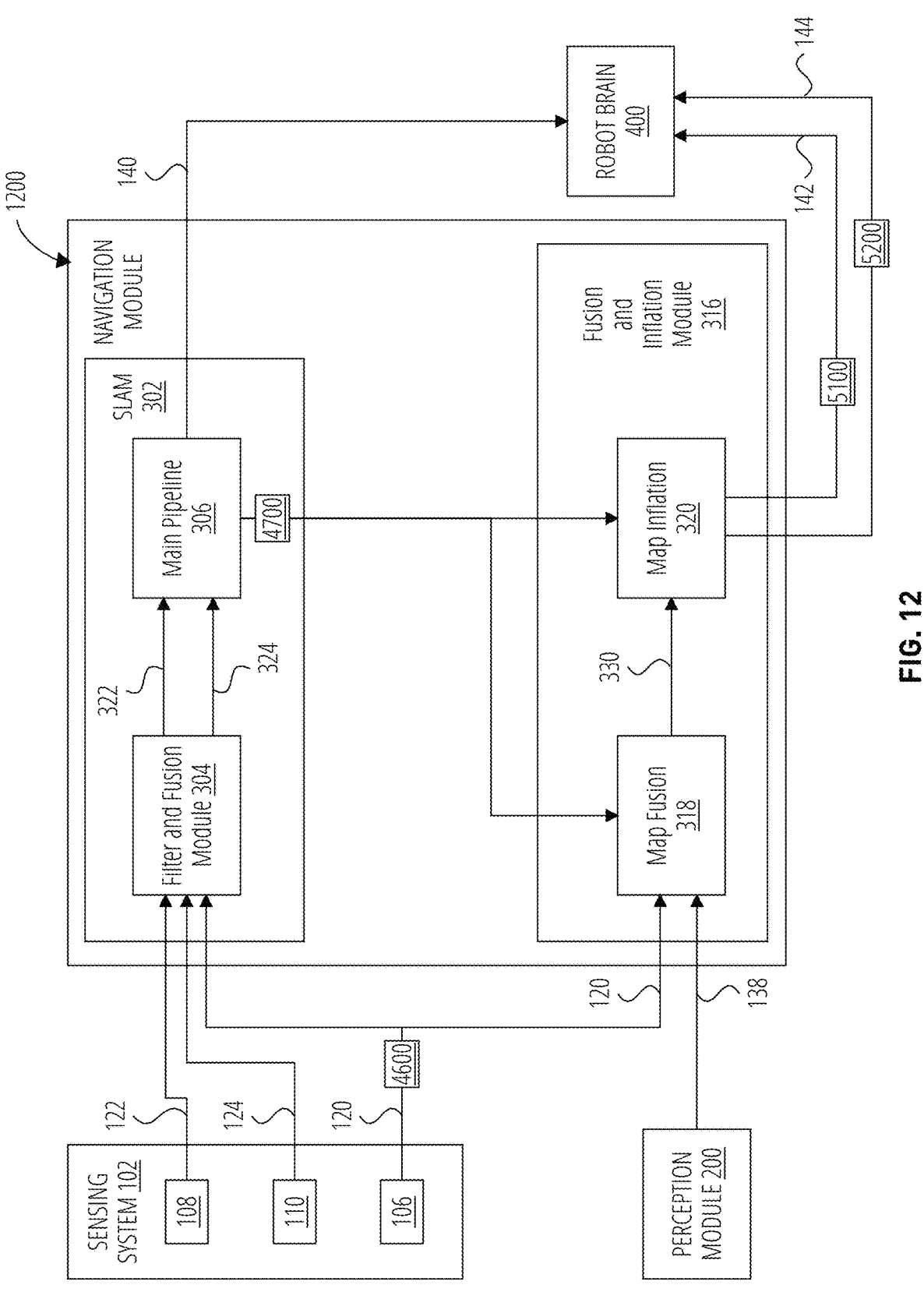
FIG. 12 illustrates a navigation module 1200 in accordance with one embodiment.
Figure 13:
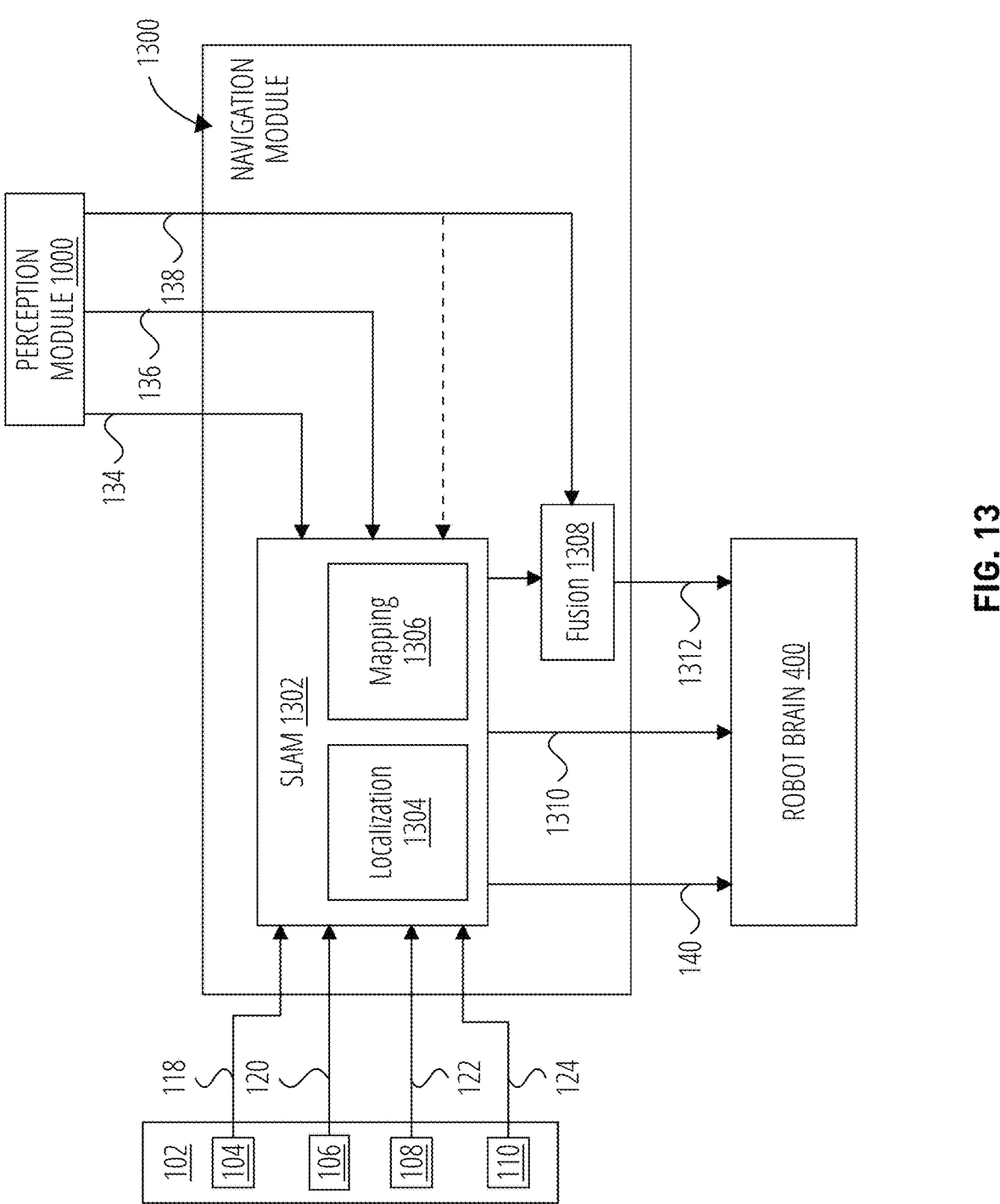
FIG. 13 illustrates a navigation module 1300 in accordance with one embodiment.
Figure 14:
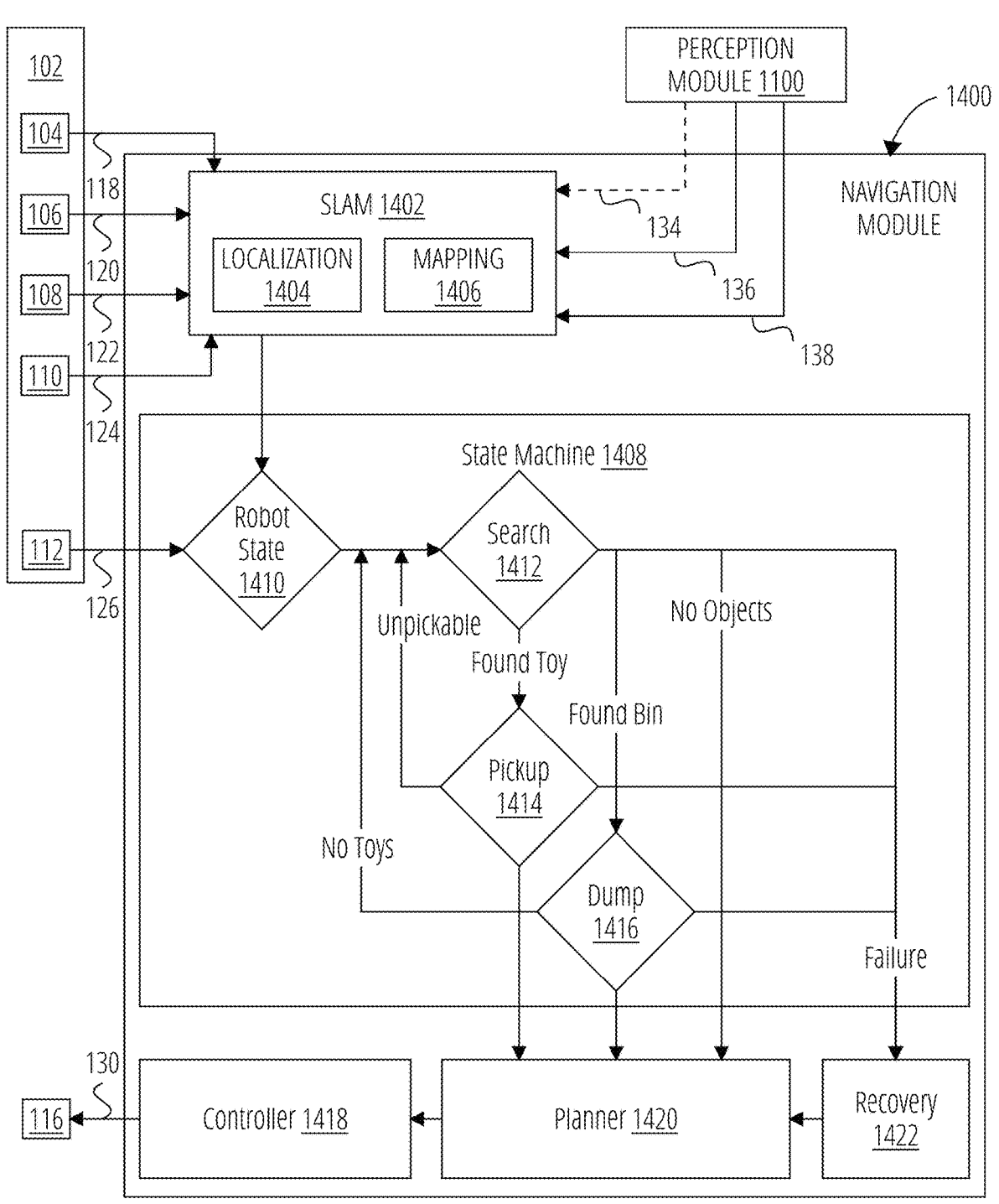
FIG. 14 illustrates a navigation module 1400 in accordance with one embodiment.

Additional embodiments for the navigation module and its operation are illustrated in and described with respect to FIG. 12-FIG. 14.

Figure 4:
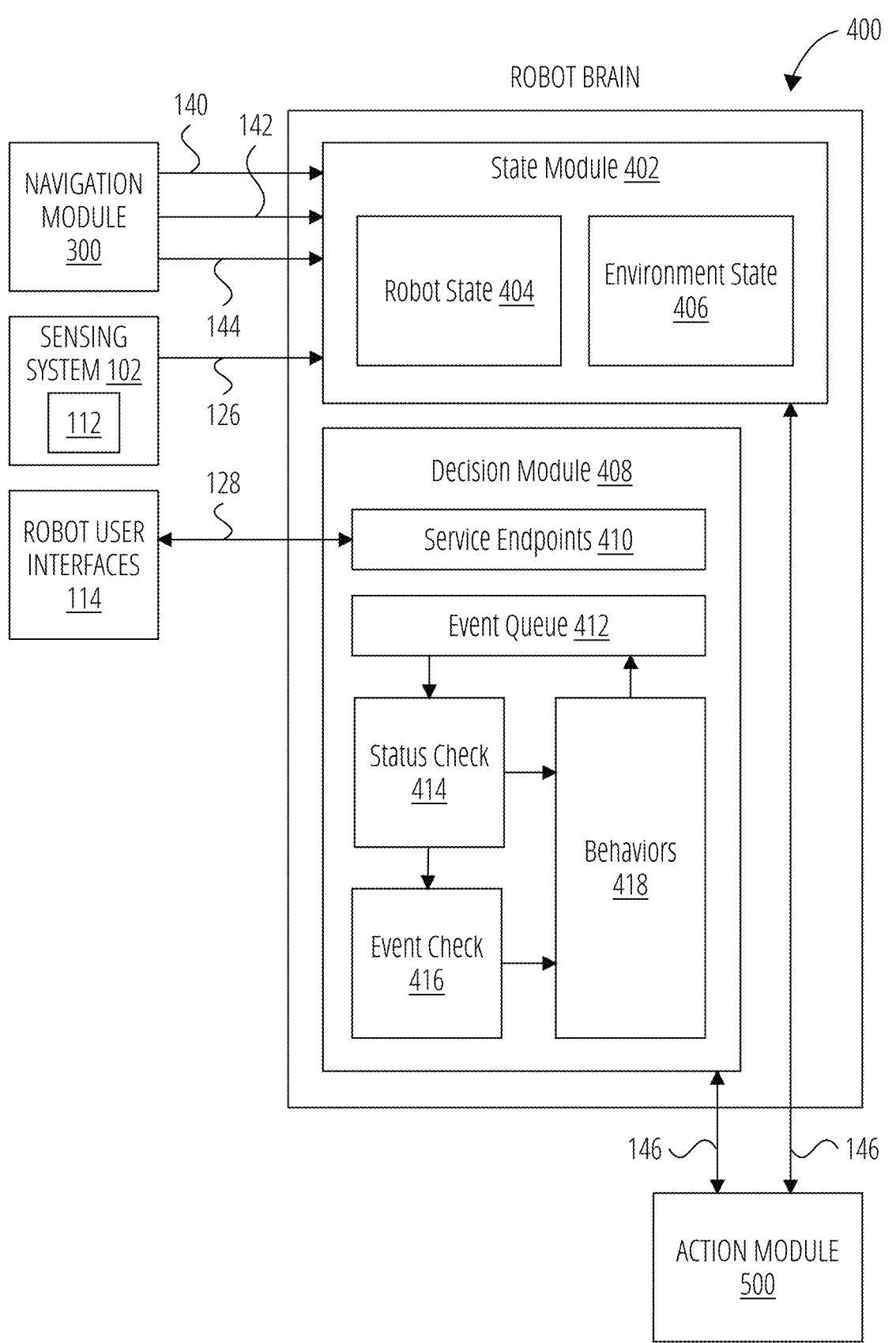
FIG. 4 illustrates a robot brain 400 in accordance with one embodiment.

FIG. 4 illustrates a robot brain 400 in accordance with one embodiment. The robot brain 400 may include a state module 402 and a decision module 408. The state module 402 may include a robot state 404 and an environment state 406. The decision module 408 may include service endpoints 410, an event queue 412, status check 414 algorithms, event check 416 algorithms, and behaviors 418.

The robot brain 400 may take the robot pose 140, inflated local map data 142, and inflated global map data 144 data from the navigation module 300, as well as data from other sensors 112 among the sensing system 102 in addition to those previously mentioned. A state module 402 in the robot brain 400 may use this information to determine a robot state 404 and an environment state 406, which the robot brain 400 may communicate, via a ROS message queue 502, to an action module 500. The robot state 404 may include conditions and parameters such as the robot pose 140, as determined by the navigation module 300 in one embodiment, a power charging status, the robot's location within its environment, a current task, a previous task, and/or next task the robot has to perform, a task status such as success or failure, and other state conditions, as are described in more detail with respect to FIG. 6A and FIG. 6B. The environment state may reflect conditions of an environment 5602 as detected by sensors and preserved as observations and maps, as described with respect to FIG. 56. The environment state 406 may include locations of objects as detected and located by the perception module 200, the boundaries of a navigable area, a progress state toward a goal such as all detected objects handled as determined by their categories, etc. A decision module 408 may interact with a robot user interface 114, such as a mobile computing device application, web page, and/or hardware buttons, which provides a user the ability to communicate with and control the robot. The integration of such an interface is described in greater detail with respect to the robotic control algorithm 6200 of FIG. 62. The decision module 408 may take interface signals 128 from the robot user interfaces 114 and determine service endpoints 410, inform an event handler or event queue 412, and control robot behaviors 418. The data from the decision module 408 likewise may be communicated to the action module 500 via the ROS message queue 502.

Figure 5:
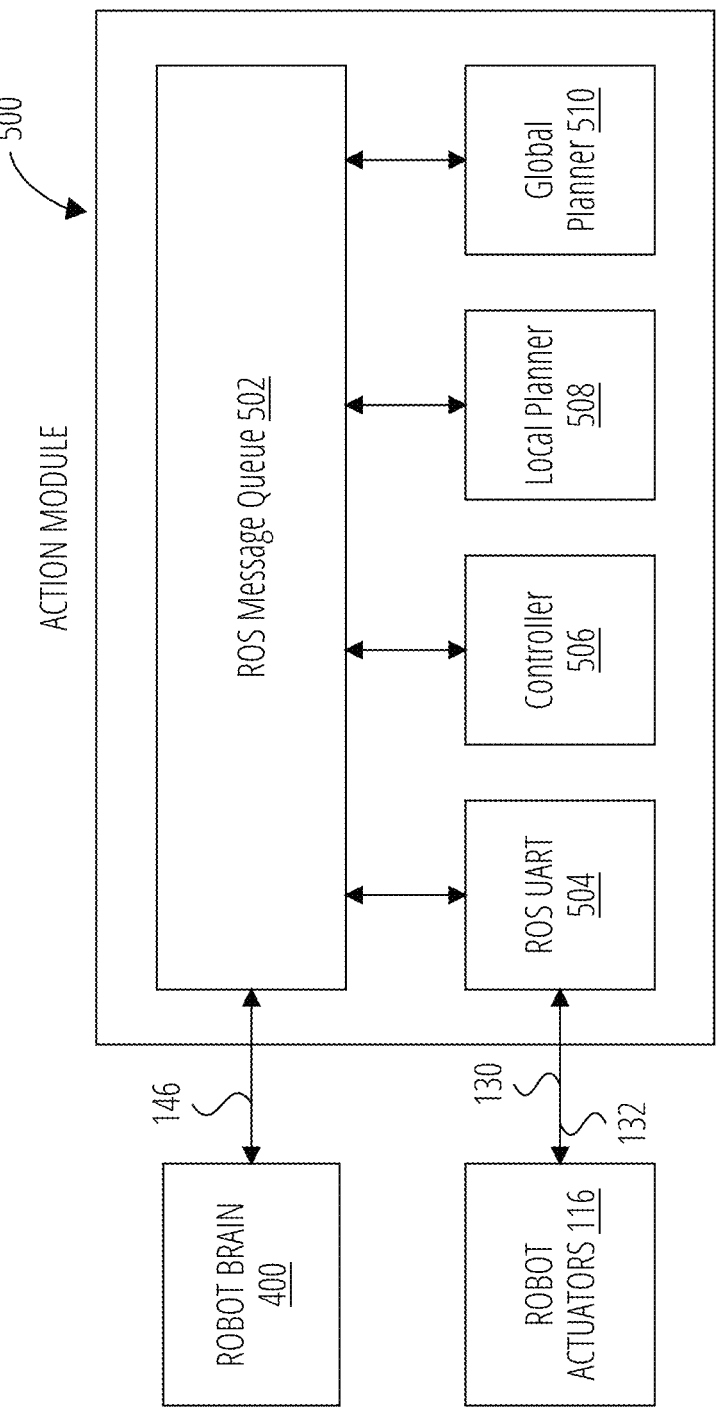
FIG. 5 illustrates an action module 500 in accordance with one embodiment.

FIG. 5 illustrates an action module 500 in accordance with one embodiment. The action module 500 may include a ROS message queue 502, an ROS universal asynchronous receiver/transmitter (UART) shown as ROS UART 504, a controller 506, a local planner 508, and a global planner 510.

The action module 500 may take information from and send information to the robot brain 400 using the ROS message queue 502. The action module 500 may also take information from and send information to robot actuators 116, so as to effect action by the robot 5300 within its environment, as will be well understood by one of skill in the art. In one embodiment, the action module 500 may be the portion of the robotic control system 5500, such as the motion controller 5912 and motor and servo controller 5914, described in more detail with respect to FIG. 59, that controls actuators such as motors and servos which may impel the robot 5300 to move throughout its environment and adjust its pose, as discussed above and in FIG. 54A through FIG. 54E, in order to perform the tasks it is instructed to perform.

Figure 6A:
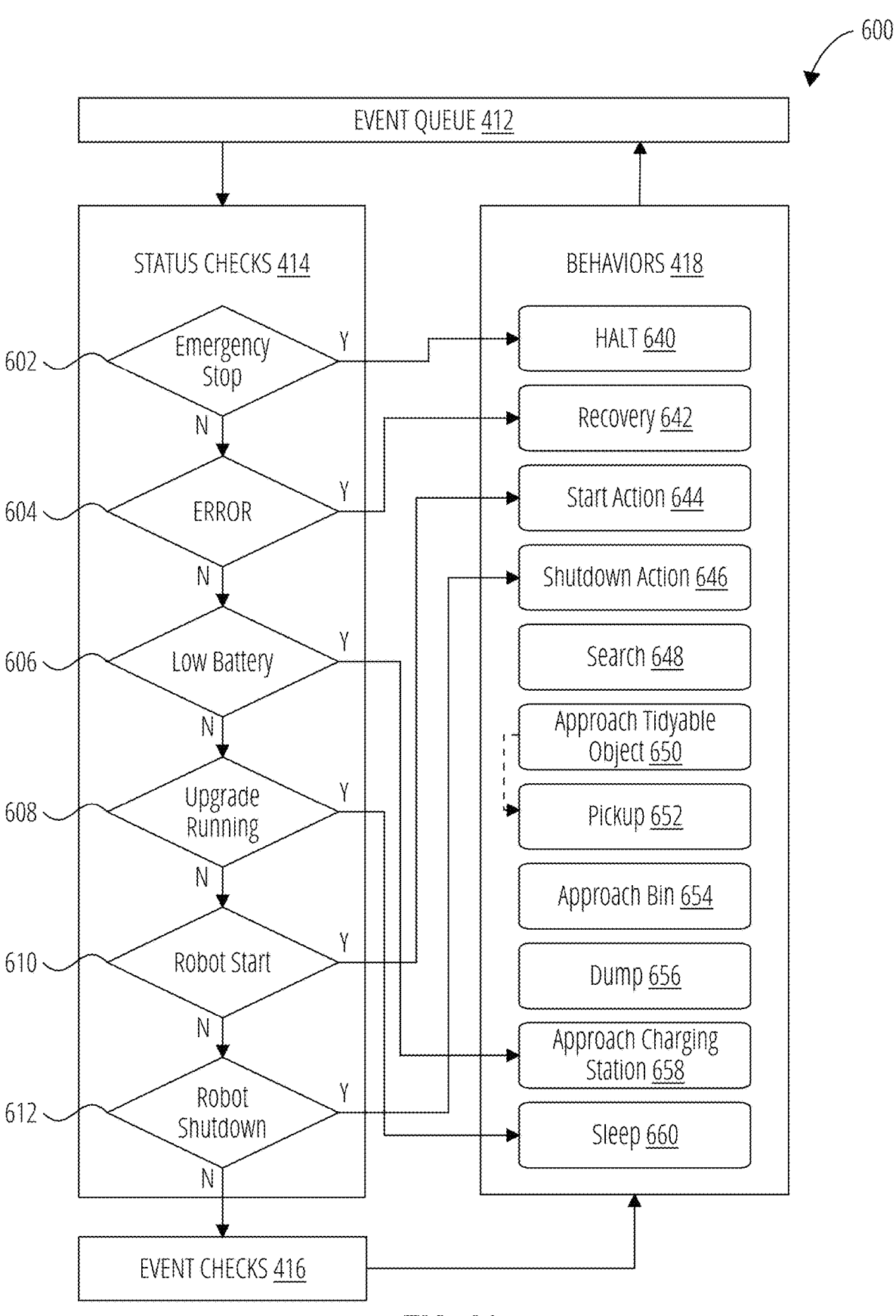
FIG. 6A and FIG. 6B illustrate a robot brain flow diagram 600 in accordance with one embodiment.
Figure 6B:
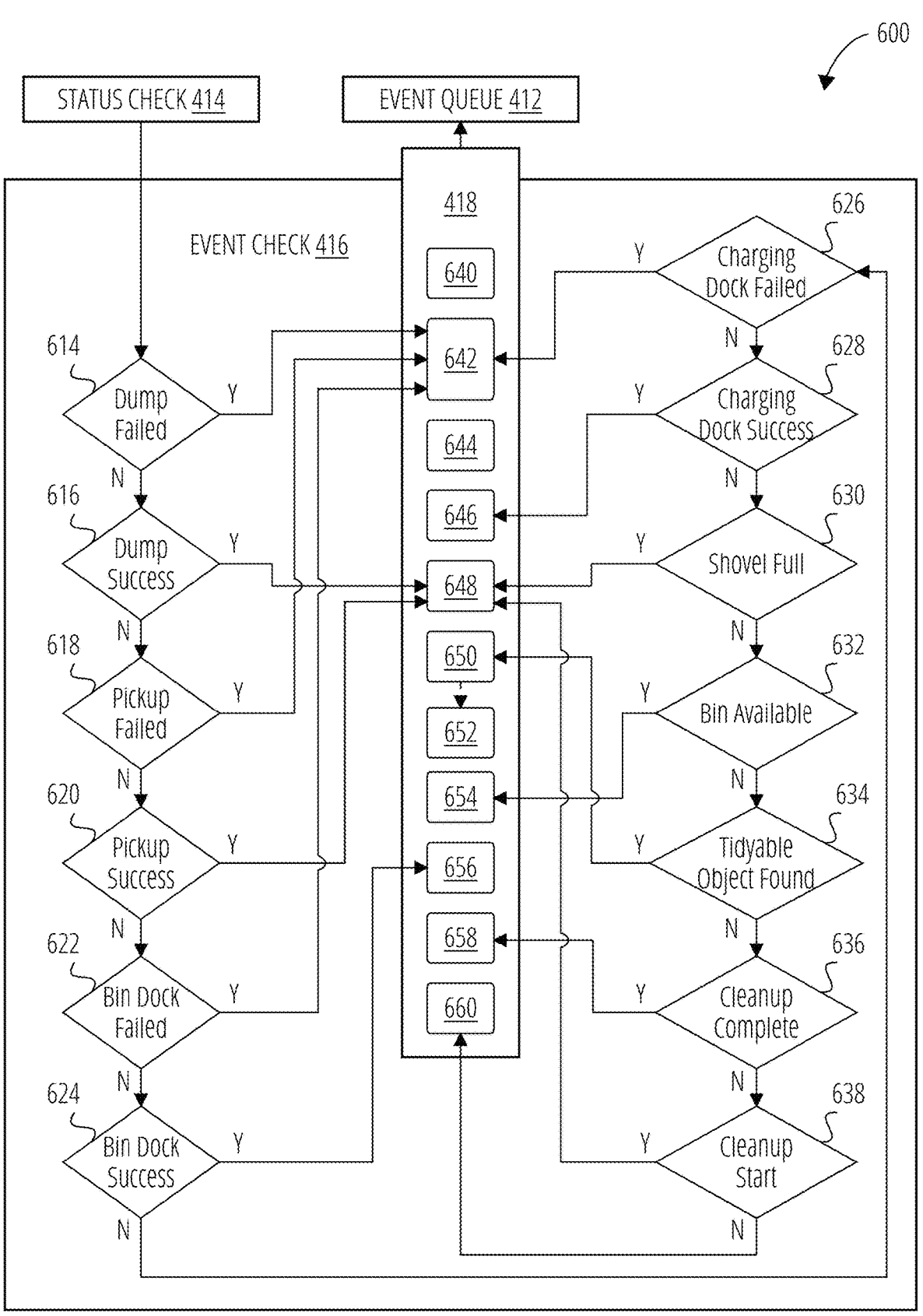

FIG. 6A and FIG. 6B illustrate a robot brain flow diagram 600 in accordance with one embodiment. The actions of the flow diagram may be performed by a robot brain 400 in conjunction with the perception module 200, the navigation module 300, and the action module 500, as introduced in FIG. 5.

The state module 402 of the robot brain 400 may store data on a robot state, such as the robot's position, orientation, velocity, acceleration, joint states, and battery status. The state module 402 may also store data on an environment state, such as the global map, the local map, detected objects, and destination bins for different classes of objects. This state data may be communicated via the ROS message queue 502 to the action module 500.

The robot brain 400 may also include a decision module 408 that takes in data from interfaces (which may include a mobile app, a web application programming interface, hardware buttons, the robot charging port, etc.). The interfaces may communicate with service endpoints, which may inform an event queue 412 or priority message queue. The event queue 412 may send poll messages to a status check 414 algorithm, which may determine an appropriate behavior 418 from among the behaviors 418 available. The selection of a behavior 418 results in a push message back to the event queue 412, as well as communication to the ROS message queue 502 in order to effect an action by the robot using the action module 500.

Beginning with the status check 414, if a need for an emergency stop is detected at check 602, the HALT 640 behavior 418 may be selected. Otherwise, if an ERROR is detected at check 604, a recovery 642 behavior 418 may be selected. Otherwise, if a low battery status is detected at check 606, an approach charging station 658 behavior 418 may be selected. Otherwise, if an upgrade running state is detected at check 608, a sleep 660 behavior 418 may be selected. Otherwise, if a robot start status is detected at check 610, a start action 644 behavior 418 may be selected. Otherwise, if a robot shutdown status is detected at check 612, a shutdown action 646 behavior 418 may be selected. After the status checks 414 have been performed, they may be followed by event checks 416.

The event check 416 algorithm may begin by determining if a dump failed event is detected at check 614, and if so, a recovery 642 behavior 418 may be selected. Otherwise, if a dump success event is detected at check 616, a search 648 behavior 418 may be selected. Otherwise, if a pickup failed event is detected at check 618, a recovery 642 behavior 418 may be selected. Otherwise, if a pickup success event is detected at check 620, a search 648 behavior 418 may be selected. Otherwise, if a bin dock failed event is detected at check 622, a recovery 642 behavior 418 may be selected. Otherwise, if a bin dock success event is detected check 624, a dump 656 behavior 418 may be selected. Otherwise, if a charging dock failed event is detected at check 626, a recovery 642 behavior 418 may be selected. Otherwise, if a charging doc success event is detected at check 628, a shutdown action 646 behavior 418 may be selected. Otherwise, if a shovel full event is detected at check 630, a search 648 behavior 418 may be selected. Otherwise, if a bin available event is detected at check 632, an approach bin 654 behavior 418 may be selected. Otherwise, if a tidyable object available event is detected at check 634, an approach tidyable object 650 behavior 418 may be selected. In one embodiment, the approach tidyable object 650 behavior 418 may be immediately followed by a pickup 652 behavior 418. Otherwise, if a cleanup complete event is detected at check 636, an approach charging station 658 behavior 418 may be selected. Otherwise, if a cleanup start event is detected at check 638, a search 648 behavior 418 may be selected. Otherwise, a sleep 660 behavior 418 may be selected.

This description is intended to illustrate and not limit the operation of the robot brain 400 within a robot as disclosed herein. One of skill in the art will readily apprehend that the checks listed may be performed in some other order and that more or fewer checks than are illustrated here may be performed, resulting in the selection of more, fewer, or other behaviors than are included in behaviors 418.

FIG. 7 illustrates an example routine 700 in accordance with one embodiment. The routine 700 may be performed by the elements of the robotic control system interfaces 100 as described herein for the purpose of controlling a clutter tidying robot utilizing floor segmentation for the robot's mapping and navigation system. Although the example routine 700 depicts a particular sequence of operations, the sequence may be altered without departing from the scope of the present disclosure. For example, some of the operations depicted may be performed in parallel or in a different sequence that does not materially affect the function of the routine 700. In other examples, different components of an example device or system that implements the routine 700 may perform functions at substantially the same time or in a specific sequence.

According to some examples, the method includes receiving image data from a robot's sensors at block 702. For example, the perception module 200 illustrated in FIG. 2 may receive image data from a robot's sensors. The perception module may comprise a detection module a scene segmentation module, and a mapping module. The robot's sensors may include at least one of cameras, lidar sensors, IMU sensors, wheel encoders, and other sensors.

According to some examples, the method includes detecting objects from the image data, as 2D bounding boxes with object classes at block 704. For example, the detection module 202 illustrated in FIG. 2 may detect objects from the image data, as 2D bounding boxes with object classes.

According to some examples, the method includes generating predicted 3D object locations and 2D-3D bounding boxes with class labels at block 706. For example, the detection module 202 illustrated in FIG. 2 may generate predicted 3D object locations and 2D-3D bounding boxes with class labels. The 3D object locations may be predicted using the 2D bounding boxes and a ground plane. The 2D-3D bounding boxes may be based on the predicted 3D object locations. In one embodiment, detection filtering by the detection module may remove the 2D-3D bounding boxes that are not on the ground or are inside of a shovel on the robot.

According to some examples, the method includes generating a multi-class segmentation map, an edge map, and semantic boundary masks at block 708. For example, the scene segmentation module 210 illustrated in FIG. 2 may generate a multi-class segmentation map, an edge map, and semantic boundary masks. The multi-class segmentation map may be generated using a segmentation model to segregate a floor boundary and other relevant regions in the image data. The edge map may include the floor boundary and other relevant boundaries, with semantic information. The semantic boundary masks may be created from the multi-class segmentation map. The semantic boundary masks may identify relevant boundaries and their semantic information. In one embodiment, the scene segmentation module may run an edge detection algorithm on the multi-class segmentation map, resulting in the semantic boundary masks with semantic information.

According to some examples, the method includes generating a scene layout map and a local occupancy map at block 710. For example, the mapping module 216 illustrated in FIG. 2 may generate a scene layout map and a local occupancy map. The scene layout map and the local occupancy map may be created using the 2D-3D bounding boxes and the semantic boundary masks. The scene layout map may include elements relevant for global mapping. The local occupancy map may include elements useful for local path planning and local obstacle avoidance. In one embodiment, the mapping module may use a labeling module to add additional semantic labels to the segmentation boundary masks by determining the points in the edge map that are inside a corresponding 2D bounding box or a corresponding 2D-3D bounding box. The labeling module may then assign all of the points inside of the corresponding 2D bounding box or corresponding 2D-3D bounding box the same label as that of the corresponding 2D bounding box or corresponding 2D-3D bounding box, thereby resulting in a semantically rich boundary map. The semantically rich boundary map may be warped into a point cloud with real-world coordinates and semantic label classes by a top view transformation module. The top view transformation module may use at least one of a lookup table that stores pixel mappings from an image space to real-world coordinates and a homography matrix that maps pixels from the image space to the real-world coordinates in real time. A scene layout module may filter the point cloud with real-world coordinates and semantic label classes, keeping the semantically relevant points needed for global mapping and discarding points not needed for global mapping. Similarly, the local occupancy module may filter the point cloud with real-world coordinates and semantic label classes, keeping the semantically relevant points needed for local path planning and obstacle avoidance.

According to some examples, the method includes receiving the scene layout map and the local occupancy map at block 712. For example, the navigation module 300 illustrated in FIG. 3 may receive the scene layout map and the local occupancy map. The navigation module may include a simultaneous localization and mapping module (SLAM) a global mapper module, and a fusion and inflation module.

According to some examples, the method includes generating a SLAM global map and a robot pose at block 714. For example, the simultaneous localization and mapping module 302 illustrated in FIG. 3 may generate a SLAM global map and a robot pose. The SLAM global map and robot pose may be generated using lidar data, IMU data, and wheel encoding data. The SLAM global map may include a 2D occupancy grid representation of the environment with obstacle information at lidar height and real-time location information of the robot. In one embodiment, a filter and fusion module in the simultaneous localization and mapping module may process the lidar data, the IMU data, and the wheel encoding data by removing noise and potentially unreliable data from the lidar data and the IMU data resulting in filtered lidar data and filtered IMU data, the filter and fusion module may also remove noise and potentially unreliable data from the angular velocity output of the wheel encoding data and fuse the non-angular velocity output data of the wheel encoding data with the filtered IMU data to generate filtered and fused odometry data. In one embodiment, the simultaneous localization and mapping module may use a main pipeline to generate the 2D occupancy grid representation of the environment with obstacle information at lidar height and real-time location information of the robot. The main pipeline may do this by receiving filtered lidar data and filtered and fused odometry data, creating a new 2D point registration for each new laser measurement at a given odometry reading, estimating and correcting odometry slippages between each odometry reading by scan-to-scan matching the new 2D point registrations, thereby resulting in odometry slippage data points, adding the odometry slippage data points to a pose-graph, resulting in an optimized pose-graph, and looking for loop closure in a chain of 'N' odometry slippage data points. Loop closure represents a process of determining if a current location observed by the robot's sensor has been previously visited by the robot. On condition loop closure is detected, the main pipeline may correct the odometry poses for each new 2D point registration based on the optimized pose-graph, resulting in loop closure pose corrections. The main pipeline may then form a common 2D occupancy grid using the 2D point registrations and probabilistically updated 2D point registrations, wherein the common 2D occupancy grid is the 2D occupancy grid representation of the environment with the obstacle information at lidar height and the real-time location information of the robot.

According to some examples, the method includes generating a navigation global map at block 716. For example, the global mapper module 308 illustrated in FIG. 3 may generate a navigation global map. The navigation global map may be created using the SLAM global map, lidar data, and the scene layout map. The navigation global map may represent an improved 2D occupancy grid representation of the environment when compared with the SLAM global map. In one embodiment, the global mapper module may use a sensor data filter to filter the lidar data and the scene layout map. The sensor data filter may remove noise and potentially unreliable data from the lidar data. The scene layout map may be passed through a semantic filter that caters to the filtering of points from the scene layout map based on the semantic information provided. The sensor data filter may output filtered lidar data and a filtered scene layout map where unreliable and irrelevant semantic labels have been removed during mapping. In one embodiment, the global mapper module may use a multi-sensor data registration to generate an enhanced 2D occupancy grid representation of the environment with obstacle information at lidar height, from the filtered lidar data and the filtered scene layout map received from the sensor data filter and semantic filter, by creating a new enhanced 2D point registration for each new laser measurement and the scene layout map using the real-time location information from the SLAM and updating all registrations from all of the robot's sensors, probabilistically, together in an enhanced common 2D occupancy grid based on predetermined confidence values of the robot's sensors. In one embodiment, the global mapper module may receive, by loop closure integration, the new enhanced 2D point registrations and the SLAM global map including the loop closure pose corrections. The loop closure integration may reiterate, temporally, over the new 2D point registrations that are near the loop closure pose corrections for all of the updated registrations of the robot's sensors from the multi-sensor data registration to provide reiterated loop closure pose corrections. The loop closure integration may update map pose data of each of the robot's sensors using the reiterated loop closure pose corrections, re-update the updated registrations of each of the robot's sensors with the updated map pose data, thereby resulting in enhanced registrations, and re-update, probabilistically with the enhanced registrations, respective cells in the enhanced common 2D occupancy grid, thereby resulting in the navigation global map.

According to some examples, the method includes generating a fused local occupancy map, an inflated global map, and an inflated local map at block 718. For example, the fusion and inflation module 316 illustrated in FIG. 3 may generate a fused local occupancy map, an inflated global map, and an inflated local map. These maps may be created from the lidar data, the navigation global map, and the local occupancy map. The fused local occupancy map may include lidar data and information from the navigation global map and the local occupancy map, making the local occupancy map useful for obstacle avoidance. The inflated global map may include buffer regions for the robot around obstacles. The inflated local map may be based on the fused local occupancy map, which includes buffer regions for the robot around obstacles.

According to some examples, the method includes receiving the inflated global map, the robot pose, and the inflated local map at block 720. For example, the robot brain 400 illustrated in FIG. 4 may receive the inflated global map, the robot pose, and the inflated local map.

According to some examples, the method includes generating robot action commands based on at least one of the inflated global map, the robot pose, and the inflated local map at block 722. For example, the robot brain 400 illustrated in FIG. 4 may generate robot action commands based on at least one of the inflated global map, the robot pose, and the inflated local map. In one embodiment, the robot brain may receive an interface signal from a robot user interface. The robot brain may then generate the robot action commands based on at least one of the inflated global map, the robot pose, the inflated local map, and the interface signal.

According to some examples, the method includes receiving the robot action commands at block 724. For example, the action module 500 illustrated in FIG. 5 may receive the robot action commands.

According to some examples, the method includes controlling robot actuators in response to the robot action commands at block 726. For example, the action module 500 illustrated in FIG. 5 may control robot actuators in response to the robot action commands.

Figure 8:
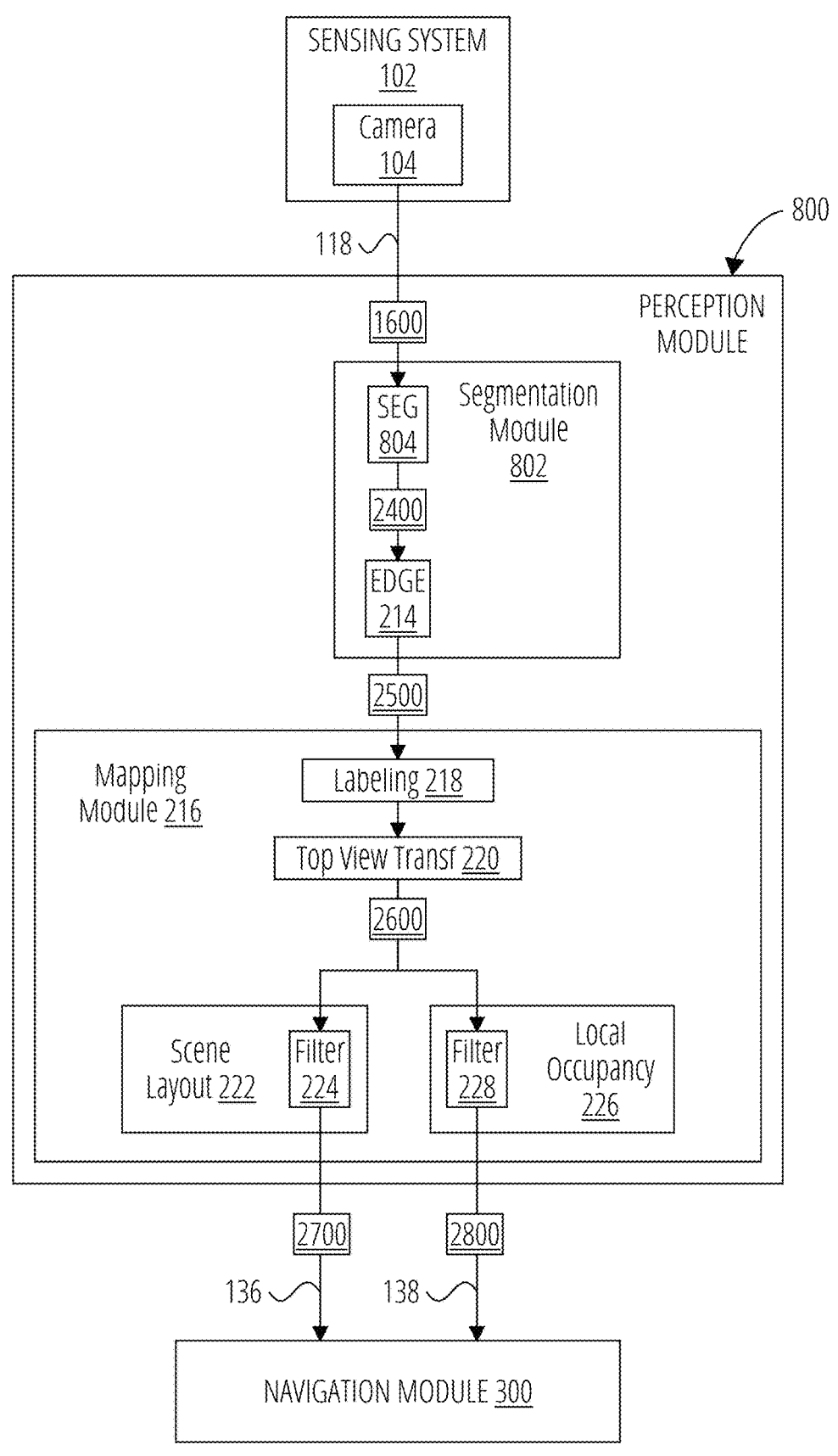
FIG. 8 illustrates a perception module 800 in accordance with one embodiment.

FIG. 8 illustrates a perception module 800 in accordance with one embodiment. The perception module 800 may include a scene segmentation module 802 and a mapping module 216. In one embodiment, the scene segmentation module 802 may include a segmentation model 804 and edge detection algorithms 214. In one embodiment, the mapping module 216 may include a top view transformation module 220, a scene layout module 222, and a local occupancy module 226. The perception module 800 may take in image data 118 from the sensing system 102 and may produce scene layout map data 136 and local occupancy map data 138, which it may transmit to the navigation module 300.

The scene segmentation module 802 may take in raw RGB image data 118, such as the detected image of a scene 1600, and may use a segmentation model 804 to identify the floor and any humans, toys, furniture, rugs, playmats, and other relevant boundaries as a multi-class segmentation map 2400. The segmentation model 804 may be a model such as BiSeNet, Seaformer, or a similar model. The multi-class segmentation map 2400 may be sent to the edge detection algorithm 214 to detect scene boundaries. The edge detection algorithm 214 may act as described with regard to FIG. 2 to produce a scene edge map 2500.

The mapping module 216 and its components may be the same as those described with respect to the perception module 200 of FIG. 2. The mapping module 216 may use the scene edge map 2500 provided by the scene segmentation module 802 to create the scene layout map data 136 such as the scene layout map scene layout map 2700, which may include the elements relevant for global mapping. The mapping module 216 may similarly produce local occupancy map data 138 such as the local occupancy map local occupancy map 2800, which may include elements useful for local path planning and local obstacle avoidance. This scene layout map data 136 and local occupancy map data 138 may be transmitted to the navigation module 300.

Figure 9:
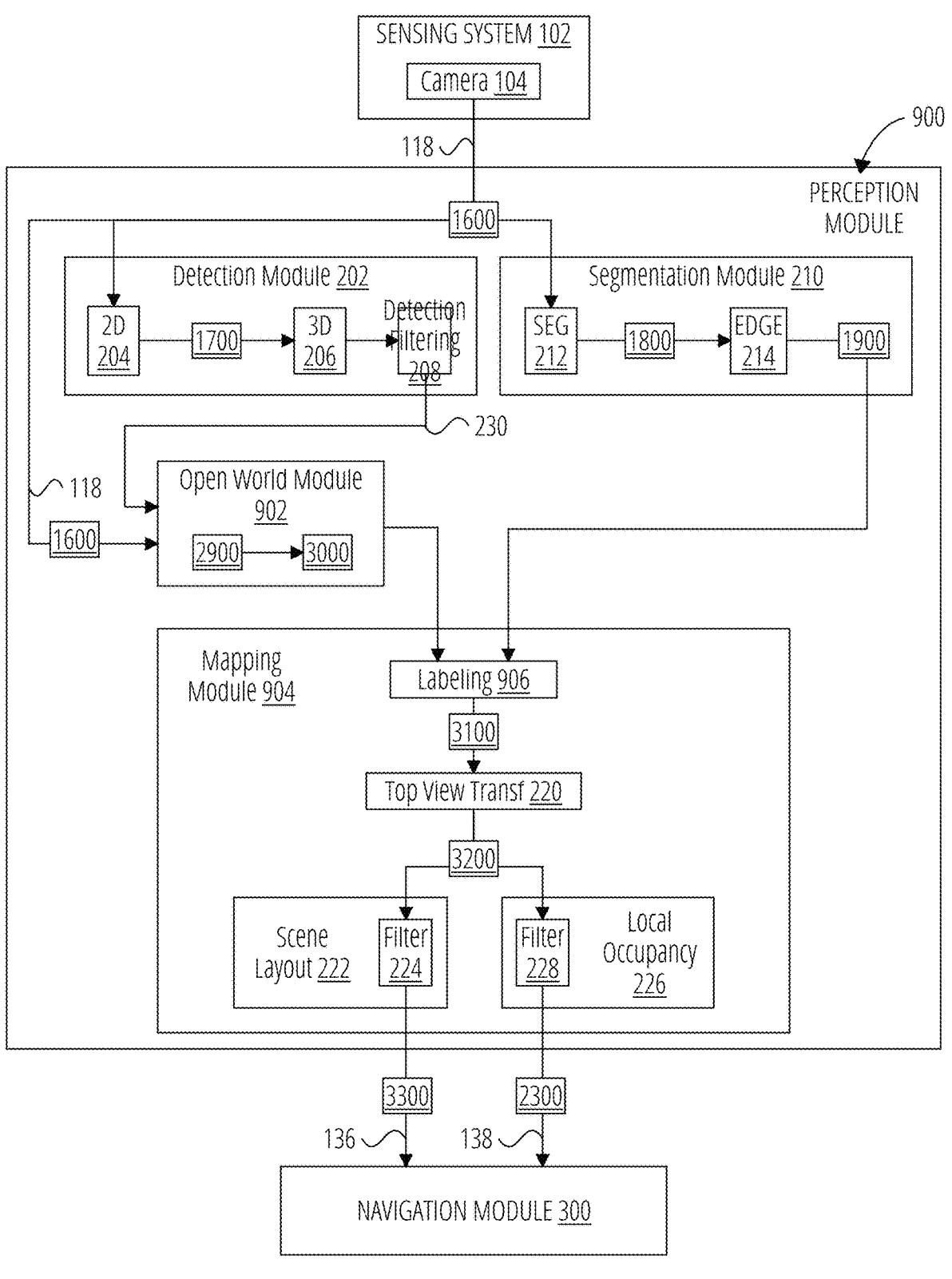
FIG. 9 illustrates a perception module 900 in accordance with one embodiment.

FIG. 9 illustrates a perception module 900 in accordance with one embodiment. The perception module 800 may include a detection module 202, a scene segmentation module 210, an open world segmentation module 902, and a mapping module 904. In one embodiment, the detection module 202 may include a 2D object detection model 204, 3D location prediction 206, and a detection filtering 208. The scene segmentation module 210 may include a segmentation model 212 and edge detection algorithms 214. In one embodiment, the mapping module 904 may include a labeling module 906, a top view transformation module 220, a scene layout module 222, and a local occupancy module 226. The perception module 200 may take in image data 118 from the sensing system 102 and may produce scene layout map data 136 and local occupancy map data 138, which it may transmit to the navigation module 300.

The perception module 200 may take in raw red/green/blue (RGB) image data 118 and may create higher-level features such as three-dimensional (3D) bounding boxes and class labels for objects detected in the image data, as well as scene layout and local occupancy maps for use in planning and navigation. The perception module 200 may use object detection and segmentation models to identify different elements in the scene represented by the image data. These elements may be converted into 3D coordinates and/or maps using post-processing algorithms.

Given image data 118, such as a raw RGB camera frame representing a detected image of a scene 1600, the detection module 202 may generate a set of filtered 2D-3D bounding box and class label 230 as described with respect to FIG. 2. The scene segmentation module 210 may take in raw RGB image data 118 and may produce drivable area boundary masks with semantic information 1900 as described with respect to FIG. 2.

The detection module 202 may pass the filtered 2D-3D bounding box and class label 230 to the open world segmentation module 902. The open world segmentation module 902 may also receive the image data 118. Given the image data 118 and filtered 2D-3D bounding box and class label 230, the open world segmentation module 902 may generate the segmentation masks 2900 of the objects present inside the bounding boxes. This may be performed by a Segment Anything Model (SAM) in one embodiment. The segmentation masks 2900 may be used to create a semantic boundary map 3000 of objects inside the bounding boxes. The semantic boundary map 3000 may be passed to the mapping module 904.

The mapping module 904 may take the semantic boundary map 3000 and drivable area boundary masks with semantic information 1900 as input and may add additional semantic context. In this manner, the mapping module 904 may generate semantically rich pseudo-laserscans that may be used for planning and navigation tasks by the robot 5300.

A labeling module 906 of the mapping module 904 may take in the segmentation mask 2900 and drivable area boundary masks with semantic information 1900 to create a semantically rich boundary map 3100 combining the semantics from both sources. The semantics from the two sources may be merged such that the resultant boundary map or edge map includes the semantic data from both sources, with any cases of discrepancy handled by a preconfigured priority order. The semantically rich boundary map 3100 created using the semantic boundary map 3000 may support improved task-specific filtering of the points created pseudo-laserscan/point cloud with semantic label classes 3200 generated by the top view transformation module 220, which process is described in greater detail with respect to FIG. 2.

Filtering may be applied as is also described with respect to FIG. 2 to create the scene layout map 3300 and local occupancy map 2300 that may be transmitted from the perception module 900 to the navigation module 300.

Figure 10:
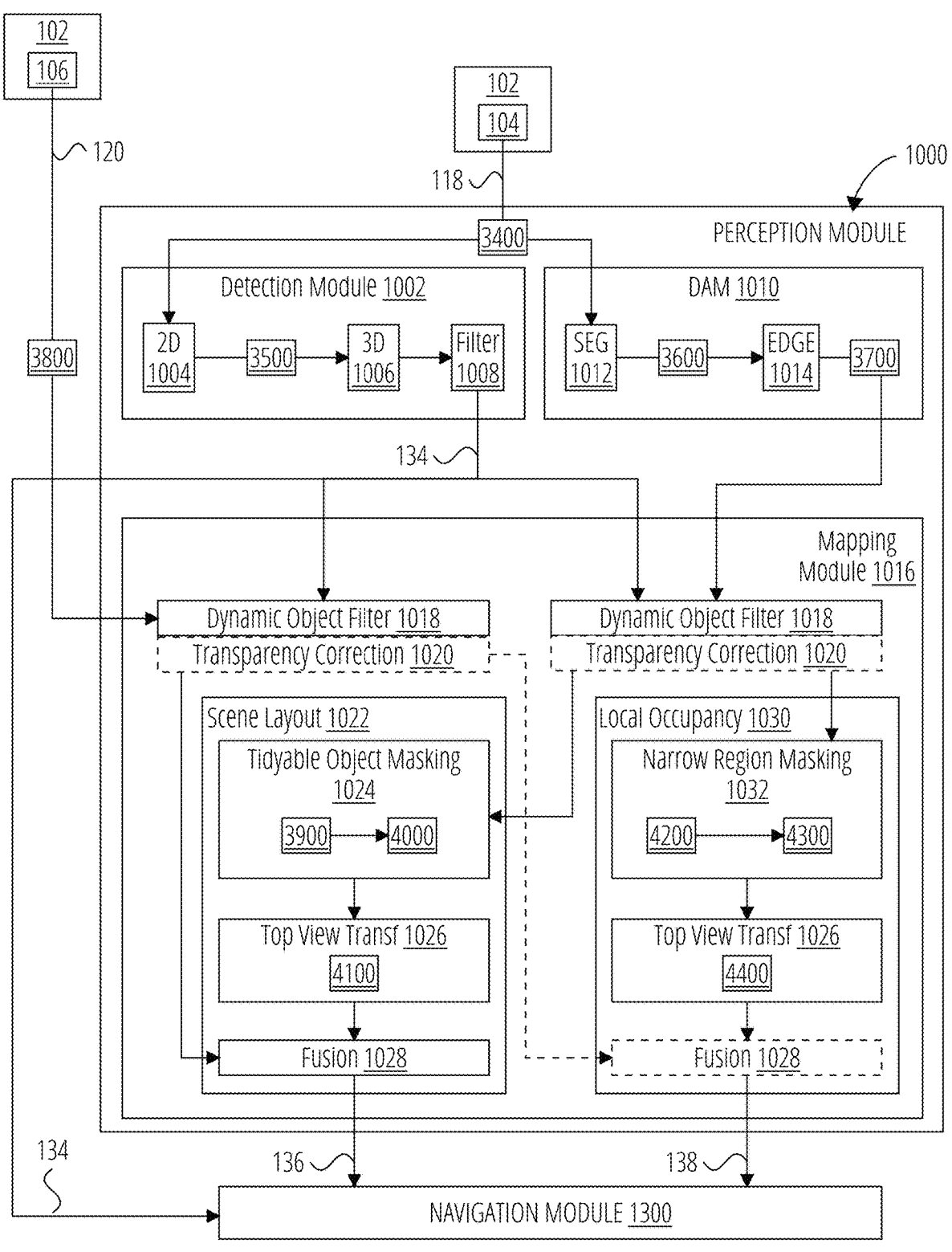
FIG. 10 illustrates a perception module 1000 in accordance with one embodiment.

FIG. 10 illustrates a perception module 1000 in accordance with one embodiment. The perception module 1000 may perform operations among its components, which in one embodiment include a detection module 1002 that includes a 2D object detection model 1004, 3D location prediction 1006, and a filter 1008, a drivable area module 1010 (DAM) that includes a segmentation model 1012 and an edge detection algorithm 1014, and a mapping module 1016 that includes a dynamic object filter 1018, transparency correction 1020 in some embodiments, a scene layout module 1022 with tidyable object masking 1024, a top view transformation module 1026, and a fusion 1028 module, and a local occupancy module 1030 with narrow region masking 1032, a top view transformation module 1026, and, in some embodiment, a fusion 1028 module.

Sensors from the sensing system 102 such as cameras 104 and lidar sensors 106 may provide input in the form of image data 118 such as the detected image of a scene 3400 and lidar data 120, such as the laserscan 3800. The 2D object detection model 1004 of the detection module 1002 may operate similarly to the 2D object detection model 204 previously described with regard to FIG. 2 to create classified 2D bounding boxes 3500. These may be lifted to three dimensions using 3D location prediction 1006, which may operate as previously described for 3D location prediction 206. A filter 1008, similar to the detection filtering 208, may generate filtered 2D and 3D bounding boxes 134, which may be passed to the mapping module 1016.

The objective of the detection module 1002 may be to take in a raw RGB frame from RGB camera feeds, such as the image data 118 representing the detected image of a scene 3400, and estimate the shape and positions of objects in the frame with respect to the robot. The detection module may use a 2D object detection model 1004 to detect objects in the frame. These detections may then be filtered by a filter 1008 to remove objects not on the ground or inside the shovel and the remaining objects converted to 3D bounding boxes by 3D location prediction 1006, or vice versa, as shown.

The objective of the 2D object detection model 1004 may be to detect object classes and extents as 2D bounding boxes, given the 2D frame of the image data 118 provided by the RGB camera feeds. The 2D object detection model 1004 may use off-the-shelf object detection models such as Yolo series which do object detection using neural network architectures. The output of 2D object detection model 1004 may be 2D bounding boxes with pixel coordinates for box center and size, as well as class labels (toy, bin, bin-label, book, clothes, home-misc.).

Given the output of the 2D object detection model 1004 as its input, the objective of 3D location prediction 1006 may be to predict the 3D location of objects indicated by the 2D bounding boxes using the ground plane. Assuming all detections to be on the ground, the bottom corners of bounding boxes may be used as contact points with the floor. If the height of the camera from the floor is known, the 3D location of each floor pixel in the image plane may be calculated. This may then be used to lift the contact points for each 2D bounding box to 3D coordinates with respect to the camera. The depth of each bounding box may be assumed to be the same as the width. The assumption of every object being on the floor is often violated and may result in much larger distances. These errors may be filtered out by a detection filter 1008 in the following post-processing step. The output of 3D location prediction 1006 may be 2D-3D bounding boxes with their class labels.

Given the 2D-3D bounding boxes and class labels, the objective of the filter 1008 may be to remove bounding boxes that are determined not to be on the ground or are determined to be inside the shovel. The distance of the 3D bounding boxes from the robot's center may be used to determine if the object is too far or within the extents of the shovel. Such objects may be removed. The filtered set of 2D-3D bounding boxes with their class labels may be filtered 2D and 3D bounding boxes 134 passed as output from filter 1008 and from detection module 1002. This output may be sent to a dynamic object filter 1018 and in some embodiments a transparency correction 1020 process, and thence to the scene layout module 1022 and local occupancy module 1030, as well as passed from the perception module 1000 to the navigation module 1300, as illustrated.

The drivable area module 1010 may include a segmentation model 1012 and edge detection algorithm 1014. In one embodiment, these may be tuned to detect the floor. The drivable area module 1010 may take as input the image data 118. The objective of the drivable area module 1010 may be to identify the floor boundary as an edge map. The drivable area module 1010 may run a segmentation model 1012 to identify the floor region and may use off-the-shelf edge detection algorithms to get the floor boundary. The overall output of the drivable area module 1010 may be an edge map including the floor boundary, which is provided to the mapping module 1016 as described below.

a floor segmentation model 1012 may take the RGB frame image data 118 as input. Given this input, the objective of the segmentation model 1012 may be to identify the floor region as a binary floor segmentation 3600. To this end, the segmentation model 1012 may run a segmentation model (BiSeNet) to segment the floor region. The output of the segmentation model 1012 may be a floor segmentation 3600 focused on the floor that is then provided as input to an edge detection algorithm 1014 to identify the floor boundary.

The edge detection algorithm 1014 may take as input the floor segmentation 3600 developed by the segmentation model 1012. The objective of the edge detection algorithm 1014 may be to identify the floor boundary as a binary mask. The edge detection algorithm 1014 may run an edge detection algorithm (3×3 kernel convolution with thresholding) to identify the boundary in the floor segmentation 3600. The resulting floor boundary mask 3700 may be sent as output to a dynamic object filter 1018 and in some embodiments a transparency correction 1020 process, and thence to the local occupancy module 1030 of the mapping module 1016.

The mapping module 1016 may take as input lidar data 120 including a lidar laserscan 3800. The mapping module 1016 may also receive the filtered 2D and 3D bounding boxes 134 from the detection module 1002 and the floor boundary mask 3700 from the drivable area module 1010. Given these inputs, the objective of the mapping module 1016 may be to generate pseudo-laserscans or point clouds useful for path planning and navigation downstream tasks. The mapping module 1016 may use the 3D locations of the detections to remove regions in both lidar laserscan 3800 data as well as the floor boundary mask 3700 corresponding to dynamic objects (humans, children, pets, other bots) using the dynamic object filter 1018. In some embodiments, the mapping module 1016 may also apply transparency correction 1020 to its inputs.

The scene layout module 1022 may use a filter such as tidyable object masking 1024 to mask tidyable object regions 3900 from the filtered floor boundary mask 3700. These regions may identified as belonging to non-stationary elements (tidyable objects or movable objects) using their 2D extents, as described in additional detail below. Note that the lidar data 120 may be assumed to be at a height where it may not interact with non-stationary elements frequently, so this filtering step may be skipped for the lidar laserscan 3800. The resulting floor boundary mask excluding tidyable objects 4000 may then be transformed to a non-pickable object pseudo-laserscan/point cloud 4100 by top view transformation module 1026, which may be fused with lidar data 120 by a fusion 1028 module to get the scene layout map data 136. The local occupancy module 1030 may use narrow region masking 1032 to mask narrow regions 4200 from the filtered floor boundary mask 3700. These may be object boundaries or areas that are candidates for having narrow space beneath or between them, of dimensions through which a robot may not be able to pass. The resulting floor boundary mask excluding narrow regions 4300 may then be converted to a non-narrow region pseudo-laserscan/point cloud 4400 and shared with the navigation module 1300 as local occupancy map data 138.

The dynamic object filter 1018 may take in the lidar data 120 and 2D-3D filtered 2D and 3D bounding boxes 134 from the detection module 1002, and may remove those regions which correspond to detections on dynamic objects in the scene (humans, children, pets, other robots, that etc.). From the available detections, the dynamic object filter 1018 may filter out those that belong to dynamic objects (humans, children, pets, etc.) and use their 3D bounding box location and extents to remove corresponding regions in the lidar laserscan 3800. The dynamic object filter 1018 may send the updated laserscan as output to the scene layout module 1022. Note that this step facilitates handling dynamic objects separately in the path planning (with motion forecasting) and not having them marked as static occupied spaces in the map.

The dynamic object filter 1018 or an additional may process the floor boundary mask 3700 output from the drivable area module 1010 along with the filtered 2D and 3D bounding boxes 134 from the detection module 1002. Given the floor boundary mask 3700, the dynamic object filter 1018 may remove those regions which correspond to detections of dynamic objects in the scene (humans, children, pets, other robots etc.). From the available detections, the dynamic object filter 1018 may filter out those that belong to dynamic objects (humans, children, pets etc.) and may use their 2D bounding box location and extents to remove corresponding regions in the floor boundary mask. The resulting discontinuities in the floor boundary may be filled using correction algorithms, such as clamp to bounding box boundary and then smoothen (Bezier). The dynamic object filter 1018 may output the floor and stationary objects bounding mask to the scene layout module 1022 and local occupancy module 1030.

The scene layout module 1022 may take as input the lidar laserscan 3800, as updated by the dynamic object filter 1018, the filtered 2D and 3D bounding boxes 134 from the detection module 1002, and the filtered floor bounding mask from the dynamic object filter 1018. Given these inputs, the scene layout module 1022 may mask tidyable object regions 3900 and remove those regions which correspond to detections on non-stationary objects in the scene (toys, books, clothes) to get the scene layout map. From the available detections, the scene layout module 1022 may filter out those that belong to non-stationary objects (toys, books, clothes, etc.) and may use their 2D bounding box location and extents to remove corresponding regions in the floor boundary mask excluding tidyable objects 4000. The resulting discontinuity in the floor boundary may be filled using correction algorithms such as clamp to bounding box boundary and then smoothen (Bezier). Note that this step helps remove elements that may also be removed during a cleanup session and may not be used for localization. Also, this step is not performed on the lidar laserscan 3800. As is described in greater detail below, the scene layout module 1022 may thereby output scene layout map data 136 in the form of a scene layout map using lidar data 120 and drivable area module 1010 laserscans.

The scene layout module 1022 includes tidyable object masking 1024 that takes in the floor boundary mask from the drivable area module 1010 and filtered 2D and 3D bounding boxes 134 from the detection module 1002. Given the floor boundary map, the scene layout module 1022 tidyable object masking 1024 may remove those regions that correspond to detections on non-stationary objects in the scene (toys, books, clothes). From the available detections, the tidyable object masking 1024 may filter out those that belong to non-stationary objects (toys, books, clothes, etc.). These may be obtained by running a secondary classifier on the cropped object images of each detection to predict whether it is stationary or not. For each detection in the filtered set, its 2D bounding box location and extents may be used to remove corresponding regions in the floor boundary mask. The resulting discontinuity in the floor boundary may be filled using correction algorithms such as clamp to bounding box boundary and then smoothen (Bezier). The tidyable object masking 1024 may output this floor and stationary objects bounding mask to a top view transformation module 1026.

In one embodiment, the top view transformation module 1026 may take in the floor and stationary objects bounding mask (such as the floor boundary mask excluding tidyable objects 4000) from the tidyable object masking 1024, as well as camera intrinsics and extrinsics, with the objective of generating a corresponding laserscan output for use in navigation and path-planning. If the camera's intrinsics and extrinsics are known, then every pixel in a camera frame may be mapped to specific regions on the ground. This may be used to convert the points in the floor boundary mask to specific regions on the floor. To create a laserscan output, rays may be emitted from the robot's center at discrete angles. The distance to the closest point in previously identified regions may be set if a ray intersects it. This non-pickable object pseudo-laserscan/point cloud 4100 may then be sent as an output for use in downstream tasks, such as fusion 1028 with lidar laserscan 3800.

Fusion 1028 with lidar laserscan 3800 may take in the lidar laserscan 3800, as filtered through the dynamic object filter 1018, as well as the DAM laser scan output from top view transformation module 1026 (the non-pickable object pseudo-laserscan/point cloud 4100). These two data sets may be fused together based on their respective transforms and confidence values to get the final laser-scan output. This may be performed by an off-the-shelf algorithm for fusing laserscans from multiple frames. This fused laserscan output may be the scene layout map data 136 output of the perception module 1000, which may be sent to the navigation module 1300.

The local occupancy module 1030 may take as input the floor boundary mask filtered of dynamic objects from the dynamic object filter 1018. The local occupancy module 1030 may also take the filtered 2D and 3D bounding boxes 134 from the detection module 1002. The local occupancy module 1030 may then remove those regions which fall within the bounding boxes of detections on objects having narrow spaces beneath them to get the local occupancy map. From the available detections, the local occupancy module 1030 may identify those that have a narrow space beneath them and may use their 2D bounding box location and extents to remove corresponding regions in the floor boundary mask. The resulting discontinuity in the floor boundary may be filled using correction algorithms such as clamp to bounding box boundary and then smoothen (Bezier). Note that this step helps remove regions that may not be considered during path planning as they pose a risk to the robot's movement and functioning. The resulting output may be local occupancy map data 138 in the form of a local occupancy map, as described in more detail below.

A filter such as narrow region masking 1032 may take in the floor and stationary objects bounding mask from the dynamic object filter 1018 and the filtered 2D and 3D bounding boxes 134 from the detection module 1002. Given these inputs, the narrow region masking 1032 may remove those regions which fall within the bounding boxes of detections on objects having narrow spaces beneath them to get the local occupancy map. From the available detections, the narrow region masking 1032 may identify those that have a narrow space beneath them. These may be obtained by running a secondary classifier on the cropped object images of each detection to predict whether it is a candidate or not. For each detection in the filtered set, the narrow region masking 1032 may use its 2D bounding box location and extents to remove corresponding regions in the floor boundary mask. The resulting discontinuity in the floor boundary may be filled using correction algorithms (clamp to bounding box boundary and then smoothen (Bezier)). This additional floor and stationary objects bounding mask may be output to conversion to pseudo-laserscan. This conversion may operate upon the output of narrow region masking 1032, which may result may in local occupancy map data 138.

The mapping module 1016 outputs may thus be scene layout map data 136 comprising a non-pickable object pseudo-laserscan/point cloud 4100, which may form a scene layout map containing static and non-pickable elements, useful for localization, and local occupancy map data 138 comprising a non-narrow region pseudo-laserscan/point cloud 4400, which may form a local occupancy map with dynamic elements and narrow/confined regions removed, useful for path planning and obstacle avoidance. Thus the perception module 1000 may produce output data as described above, for use by other robotic processing algorithms, such as those of the navigation module 1300. These outputs may include filtered 2D and 3D bounding boxes 134 and class labels for objects in the current frame, as well as a scene layout map and a local occupancy map, in the form of scene layout map data 136 and local occupancy map data 138 from the mapping module 1016.

Figure 11:
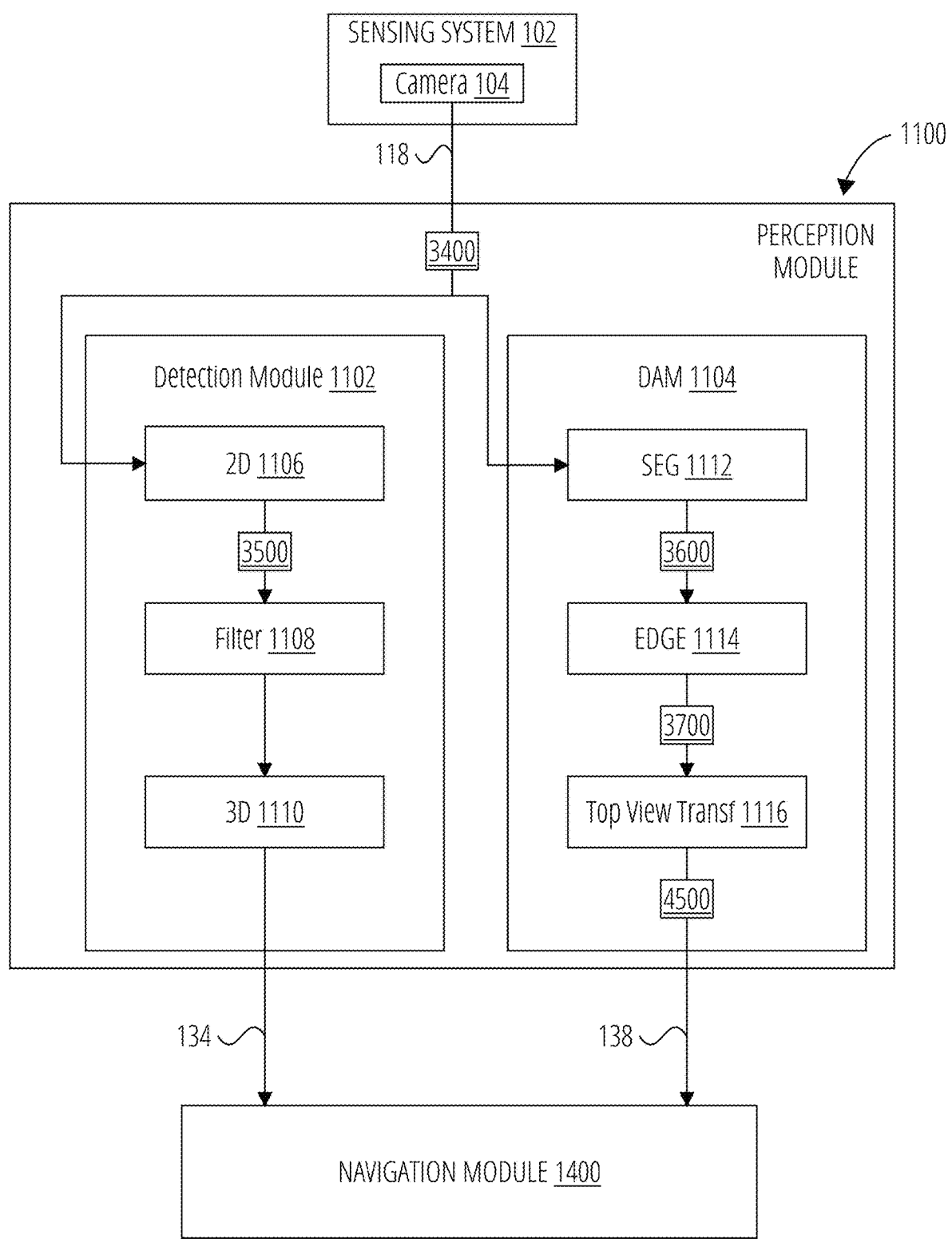
FIG. 11 illustrates a perception module 1100 in accordance with one embodiment.

FIG. 11 illustrates a perception module 1100 in accordance with one embodiment. The perception module 1100 may include a detection module 1102 and a drivable area module 1104. The detection module 1102 may include a 2D object detection model 1106, a filter 1108, and a 3D location mapping 1110. The drivable area module 1104 may include a segmentation model 1112, an edge detection algorithm 1114, and a top view transformation module 1116.

The detection module 1102 and drivable area module 1104 may be similar in many respects to the detection module 1002 and drivable area module 1010 introduced with respect to FIG. 10. However, the drivable area module 1104 may additionally include a top view transformation module 1116, which may generate the pseudo-laserscan/point cloud 4500 that may be provided as local occupancy map data 138 to other elements among the robotic control system interfaces. The detection module 1102 and drivable area module 1104 of the perception module 1100 may be in communication with sensors such as the sensing system 102 earlier described. The perception module 1100 here may be in communication with a navigation module, such as the navigation module 1400 shown, similar in many respects to the navigation module 300 previously described, or in alternative embodiments with the navigation module 1200 or navigation module 1300 described below.

FIG. 12 illustrates a navigation module 1200 in accordance with one embodiment. The navigation module 1200 may include a simultaneous localization and mapping module 302 and a fusion and inflation module 316 that may operate as described for those components with regard to FIG. 3, except as described below. The navigation module 1200 may take in lidar data 120, IMU data 122, and wheel encoding data 124 from the sensing system 102, as well as local occupancy map data 138 from the perception module 200. The navigation module 1200 may use this data to generate a robot pose 140, an inflated local map data 142, and an inflated global map data 144, which it may transmit to the robot brain 400.

The simultaneous localization and mapping module 302 may operate as previously described to generate a SLAM global map 4700 and the robot pose 140 that it sends to the robot brain 400. In this embodiment, rather than a global mapping module, the simultaneous localization and mapping module 302 may send the SLAM global map 4700 directly to the map fusion 318 and map inflation 320 modules of the fusion and inflation module 316. These modules may operate as previously described upon the SLAM global map 4700 from the simultaneous localization and mapping module 302, the lidar data 120, and the local occupancy map data 138.

Figure 51:
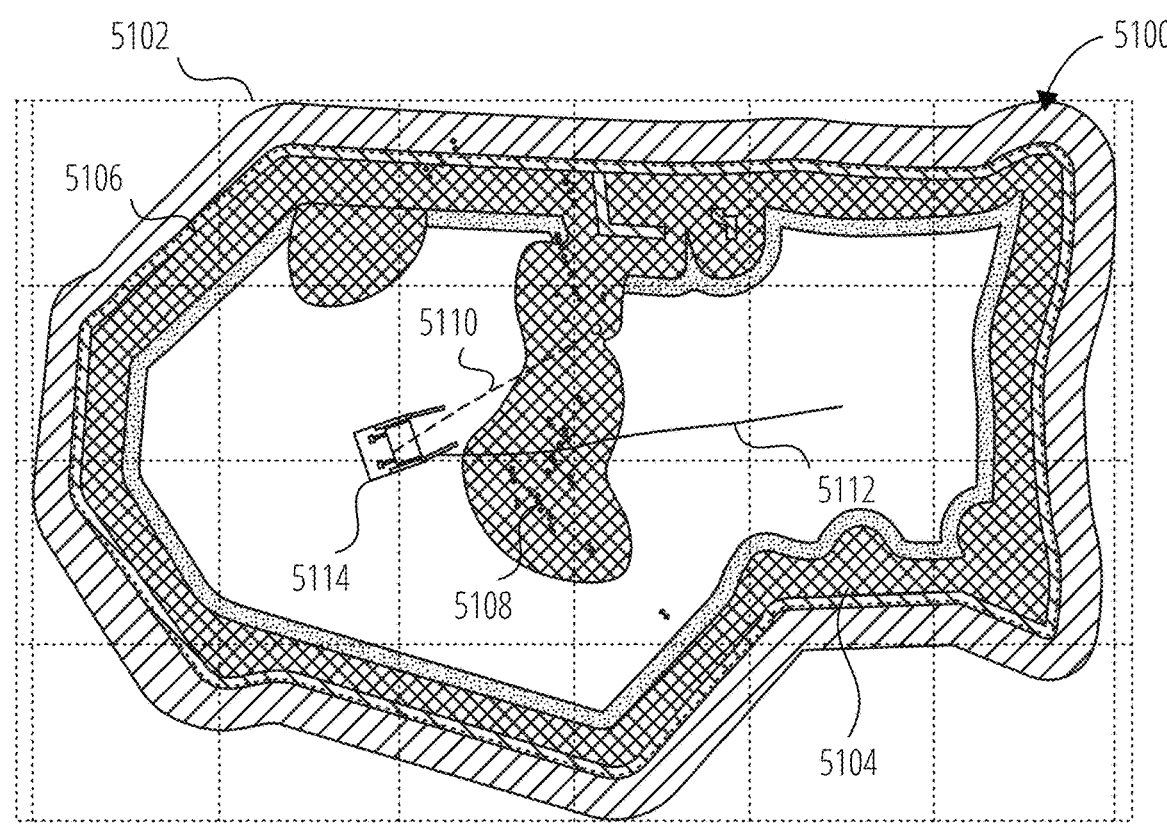

In this manner, the map inflation 320 may produce an inflated local map 5100 that is a 2D occupancy grid representation 5102 of the robot's environment with a buffer region 5104. An exemplary inflated local map 5100 is shown in FIG. 51, including the lidar data 5106 and scene map data 5108. A local plan without an integrated global mapper module 5110, a global plan without an integrated global mapper module 5112, and real-time location information of the robot 5114 are also shown. The inflated local map 5100 may be provided as inflated local map data 142 to the robot brain 400.

Figure 52:
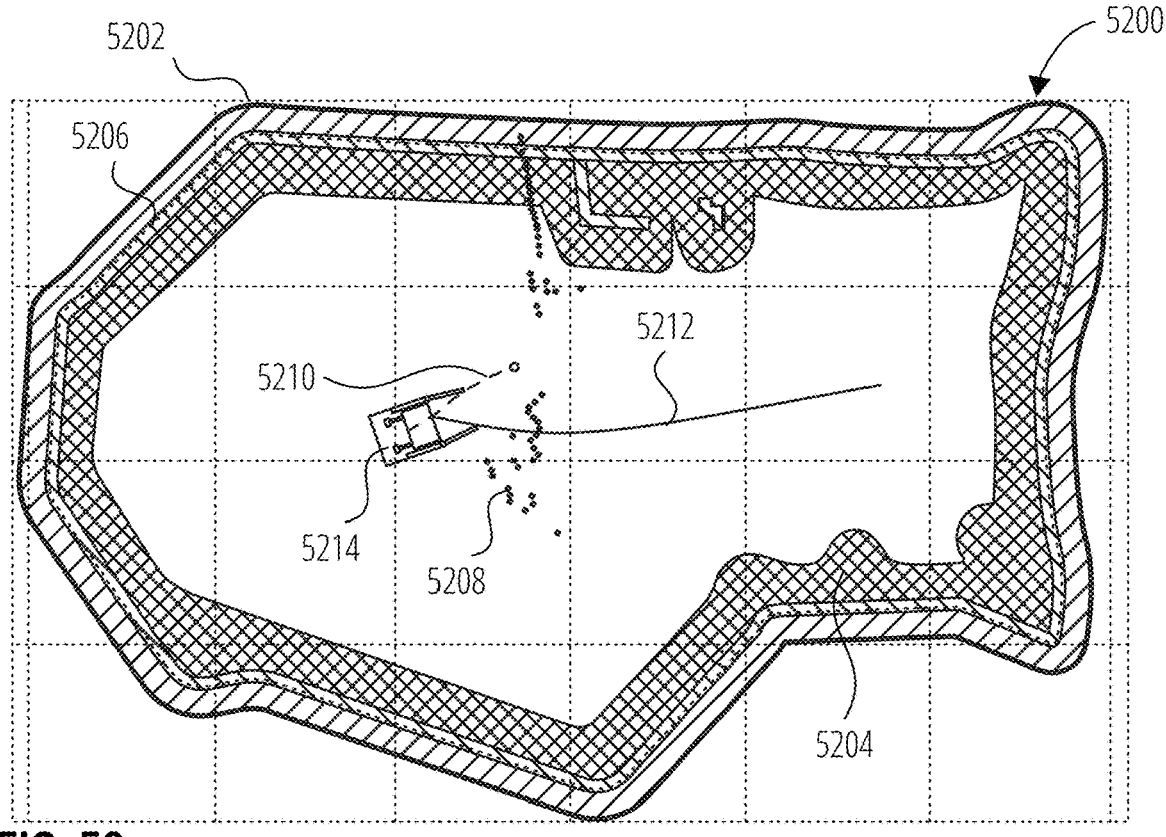

Similarly, the map inflation 320 may produce an inflated global map 5200 that may be provided as inflated global map data 144 to the robot brain 400. The inflated global map 5200 may be a 2D occupancy grid representation 5202 including a buffer region 5204. An exemplary inflated global map 5200 is shown in FIG. 52, including lidar data 5206 and scene map data 5208. A local plan 5210, a global plan 5212, and real-time location information of the robot 5214 are also shown. The inflated global map 5200 may be provided as inflated global map data 144 to the robot brain 400.

It may be noted that, in employing the embodiment including the global mapper module 308 (navigation module 300), the robot 5300 may be able to more effectively navigate among obstacles due to the improved object data available in the inflated local map 4900, shown in FIG. 49, which may be taken into account in creating the inflated global map 5000 with lidar data 5006, scene map data 5008, and global plan 5010, shown in FIG. 50, which supports improved robot 5300 planning, as compared to the inflated local map 5100 of FIG. 51 with lidar data 5106 and scene map data 5108 and the inflated global map 5200, shown in FIG. 52 with lidar data 5206, scene map data 5208, a local plan 5210, and a global plan 5212, generated without a global mapper module 308.

Lidar data 4906, scene map data 4908, a local plan with an integrated global mapper module 4910, a global plan with an integrated global mapper module 4912, and real-time location information of the robot 4914 are illustrated and may be compared with the local plan without an integrated global mapper module 5110 and global plan without an integrated global mapper module 5112. As seen in the global plan with an integrated global mapper module 4912, the robot 5300 may in its planning take objects into account and plan around them. Where the navigation module 1200 is used, with no global mapper module 308, the global plan without an integrated global mapper module 5112 passes through objects as it is not able to plan around them as effectively. While there is space for passage, and the inflated local map 5100 allows for a local plan that accounts for obstacles, the robot 5300 may not be able to perform avoidance well due to not being able to deviate from the global plan path significantly.

FIG. 13 illustrates a navigation module 1300 in accordance with one embodiment. The navigation module 1300 may include a simultaneous localization and mapping module 1302 to perform localization 1304 and mapping 1306, as well as a fusion 1308 module. The navigation module 1300 may receive filtered 2D and 3D bounding boxes 134, scene layout map data 136, and local occupancy map data 138 from the perception module, such as the perception module 1000 described with respect to FIG. 10, or from the other embodiments described elsewhere herein. The navigation module 1300 may further take in data from the sensing system 102, such as image data 118 from the cameras 104, lidar data 120 from the lidar sensors 106, inertial measurement unit or IMU data 122 from the IMU sensors 108, and wheel encoding data 124 from the wheel encoders 110. This data may be used to inform and update the robot 5300 on its position within the environment it intends to navigate.

The simultaneous localization and mapping or SLAM logic of the simultaneous localization and mapping module 1302 may take in the filtered 2D and 3D bounding boxes 134 and scene layout map data 136, as well as the sensor data, and may use this to generate a global map 1310 and determine a robot pose 140 and location within the scene layout map data 136, local occupancy map data 138, and global map 1310 or global area map. The robot 5300 may be capable of taking on a number of poses for the purposes of performing its tasks, these poses comprising the conditions and actions of its moveable parts, such as the arms, joints, shovel, and grabber pads, described in detail with respect to FIG. 53A through FIG. 54E. Simultaneous localization 1304 and mapping 1306 may be performed by localization logic 5902 and mapping logic 5904, such as that described in greater detail with respect to FIG. 59. In one embodiment SLAM algorithms may be utilized to generate the global map and localize the robot on the map simultaneously. A number of SLAM algorithms are known in the art and commercially available. The SLAM logic may also fuse the global map 1310 with local occupancy map data 138 from the perception module 1000. The navigation module 1300 may send the global map 1310, the robot pose 140, and the fused local map with local occupancy data 1312 to the robot brain 400.

FIG. 14 illustrates a navigation module 1400 in accordance with one embodiment. The navigation module 1400 may include a simultaneous localization and mapping module 1402 (SLAM) with localization 1404 and mapping 1406 modules, similar in some respects to that of the navigation module 1200 previously described. The simultaneous localization and mapping module 1402 may receive image data 118, lidar data 120, IMU data 122, and wheel encoding data 124 from the sensing system 102, as well as filtered 2D and 3D bounding boxes 134 and local occupancy map data 138 from the perception module 1100. In alternative embodiments, the navigation module 1400 may receive similar inputs, as well as the scene layout map data 136, from the perception module 200, perception module 800, perception module 900, or perception module 1000 previously described.

The navigation module 1400 may include a state machine 1408 that performs analyses and indicates decisions based on localization and mapping as well as sensor input from the sensing system 102, including image data 118, lidar data 120, IMU data 122, wheel encoding data 124, and other sensor data 126, as shown. The state machine 1408 may track a robot state 1410 based on output from the simultaneous localization and mapping module 1402, and operate through a process of search 1412, pickup 1414, and dump 1416, as described in greater detail with respect to the robot brain flow diagram 600 of FIG. 6A and FIG. 6B and the robotic process 6000 and state space map 6100 of FIG. 60 and FIG. 61. The state machine may inform planner 1420 and recovery 1422 modules, such as the path planner 5908 and pick-up planner 5910 described with respect to FIG. 59, which in turn may instruct a controller 1418 to signal robot actuators 116 in order to effect robot action in the environment, similar to the actions of the action module 500 of FIG. 5 and/or the motor and servo controller 5914 of FIG. 59.

Figure 15:
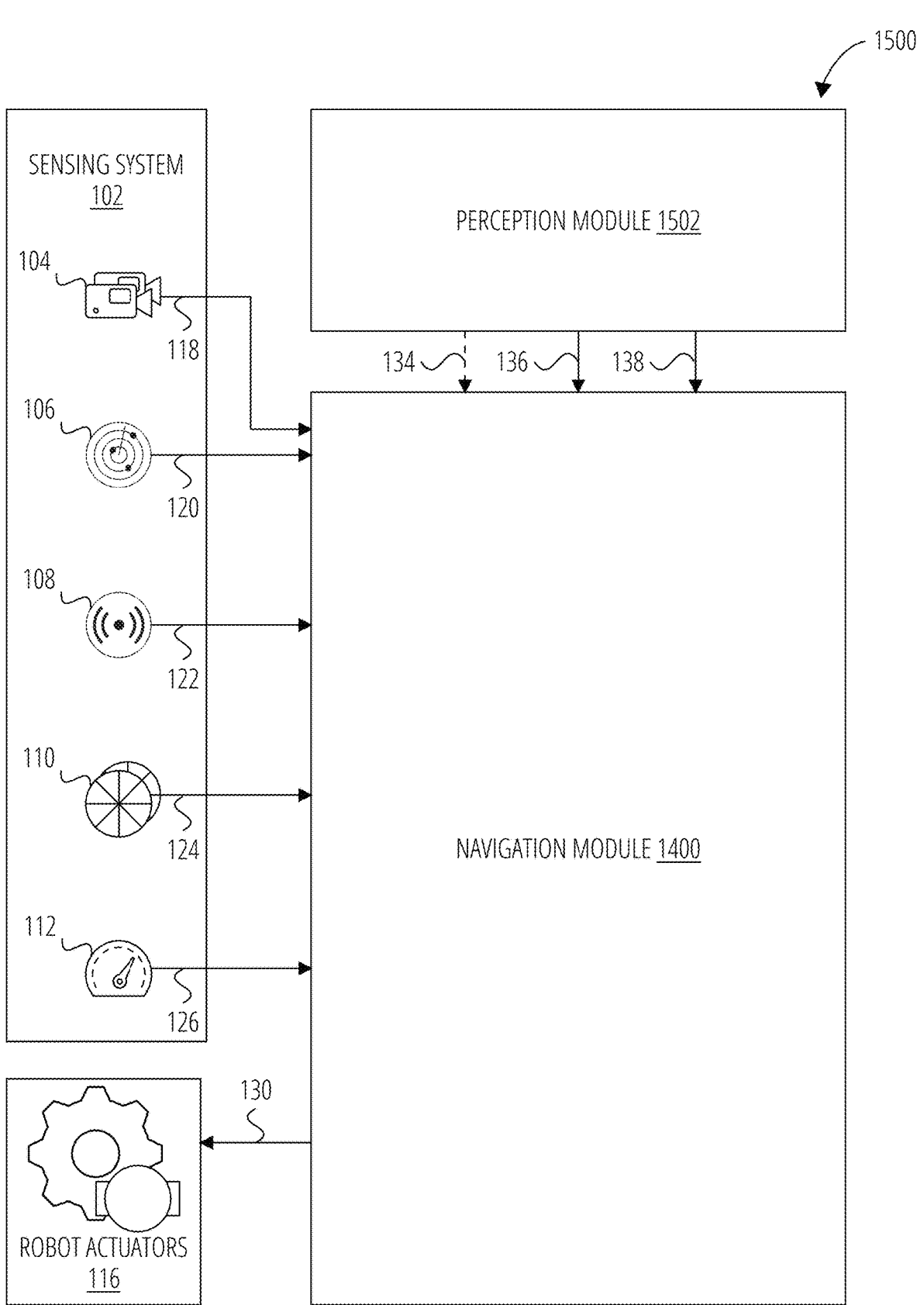
FIG. 15 illustrates a robotic control system interfaces 1500 in accordance with one embodiment.

FIG. 15 illustrates a robotic control system interfaces 1500 in accordance with one embodiment. The robotic control system interfaces 1500 may comprise a perception module 1502 and a navigation module 1400. The perception module 1502 may receive data from the sensing system 102, including image data 118 and, in some embodiments, lidar data 120. From these data the perception module 1502 may produce filtered 2D and 3D bounding boxes 134, scene layout map data 136, and local occupancy map data 138 to be sent to the navigation module 1400. The perception module 1502 may operate in a manner similar to the embodiments described with respect to FIG. 2 and FIG. 8-FIG. 11.

The navigation module 1400 may receive data from the sensing system 102, such as image data 118, lidar data 120, IMU data 122, wheel encoding data 124, and other sensor data 126, and may send robot action command signal 130 to the robot actuators 116, as is described with respect to FIG. 14.

Figure 18:
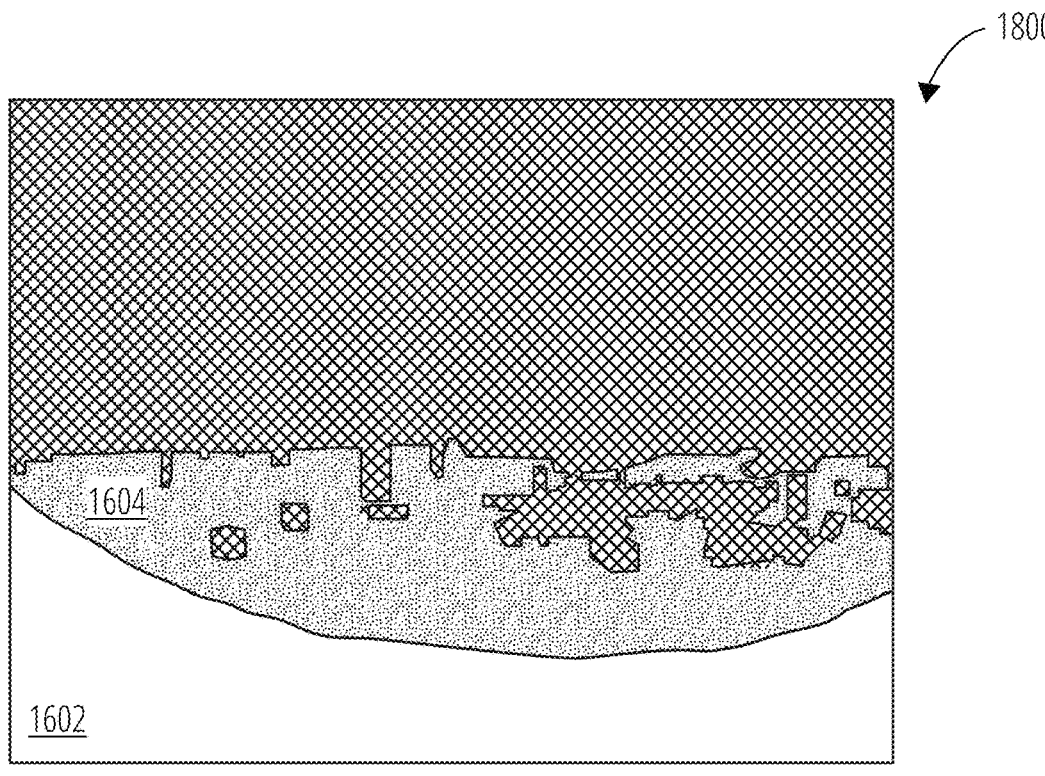
Figure 20:
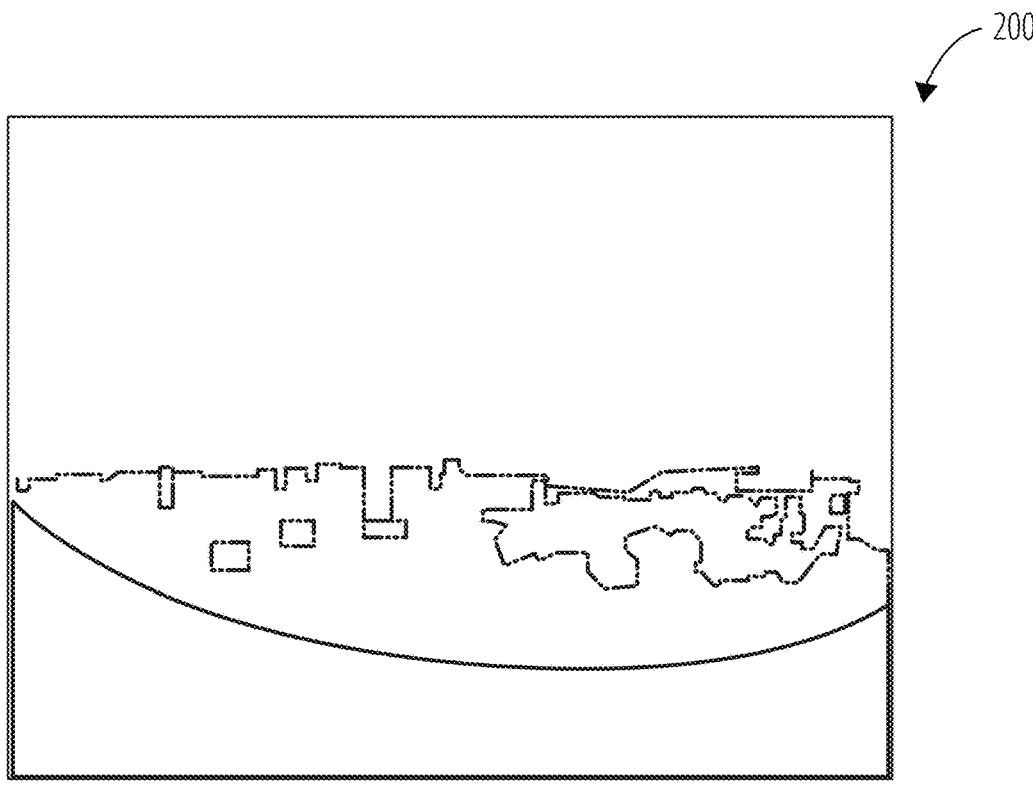
Figure 21:
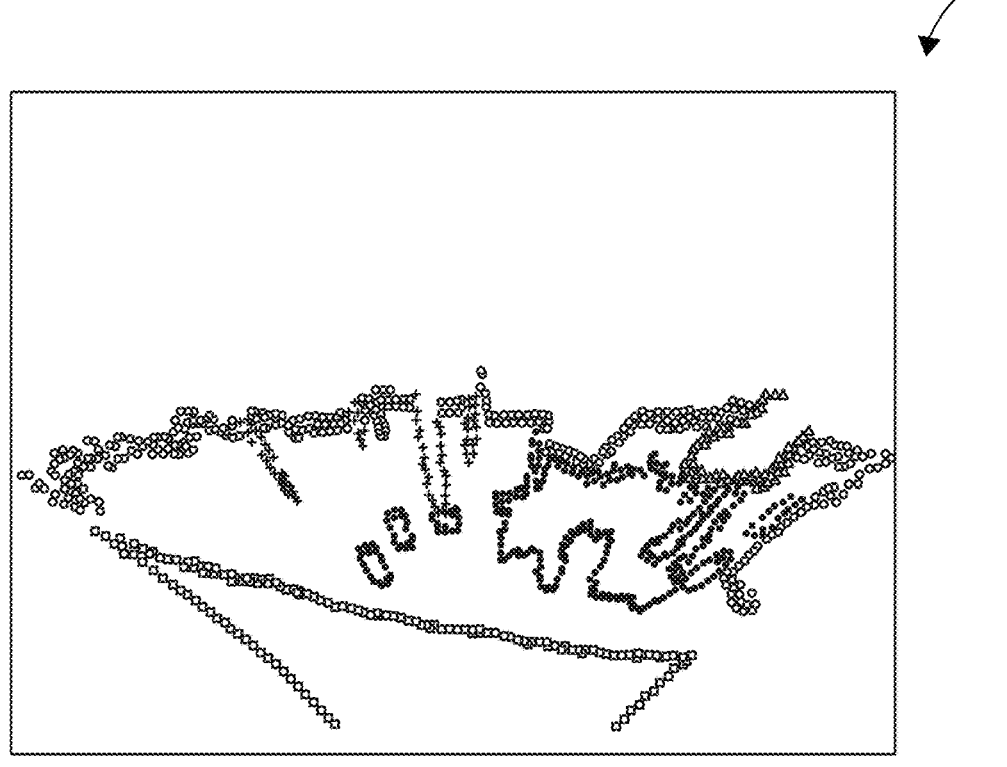
Figure 22:
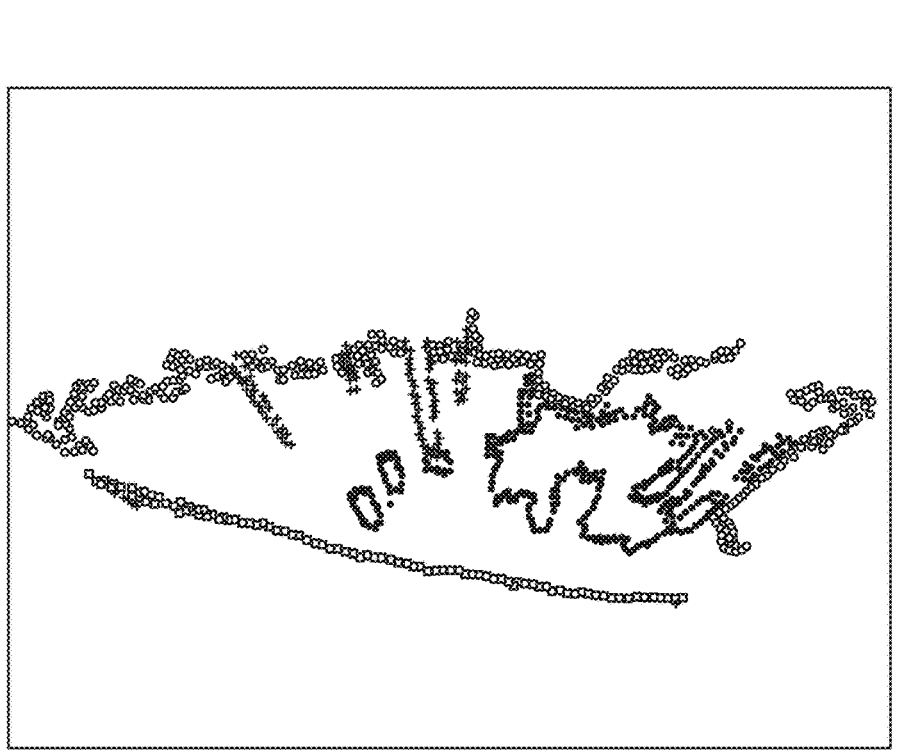
Figure 23:

FIG. 16-FIG. 52 provide exemplary visual representations of data input to, processed in, and output by the perception module and navigation module embodiments herein. FIG. 16 illustrates a detected image of a scene 1600 in accordance with one embodiment. FIG. 17 illustrates classified 2D bounding boxes 1700 in accordance with one embodiment. FIG. 18 illustrates a multi-class segmentation map 1800 in accordance with one embodiment. FIG. 19 illustrates drivable area boundary masks with semantic information 1900 in accordance with one embodiment. FIG. 20 illustrates a semantically rich boundary map 2000 in accordance with one embodiment. FIG. 21 illustrates pseudo-laserscan/point cloud with semantic label classes 2100 in accordance with one embodiment. FIG. 22 illustrates scene layout map 2200 in accordance with one embodiment. FIG. 23 illustrates local occupancy map 2300 in accordance with one embodiment.

Figure 24:
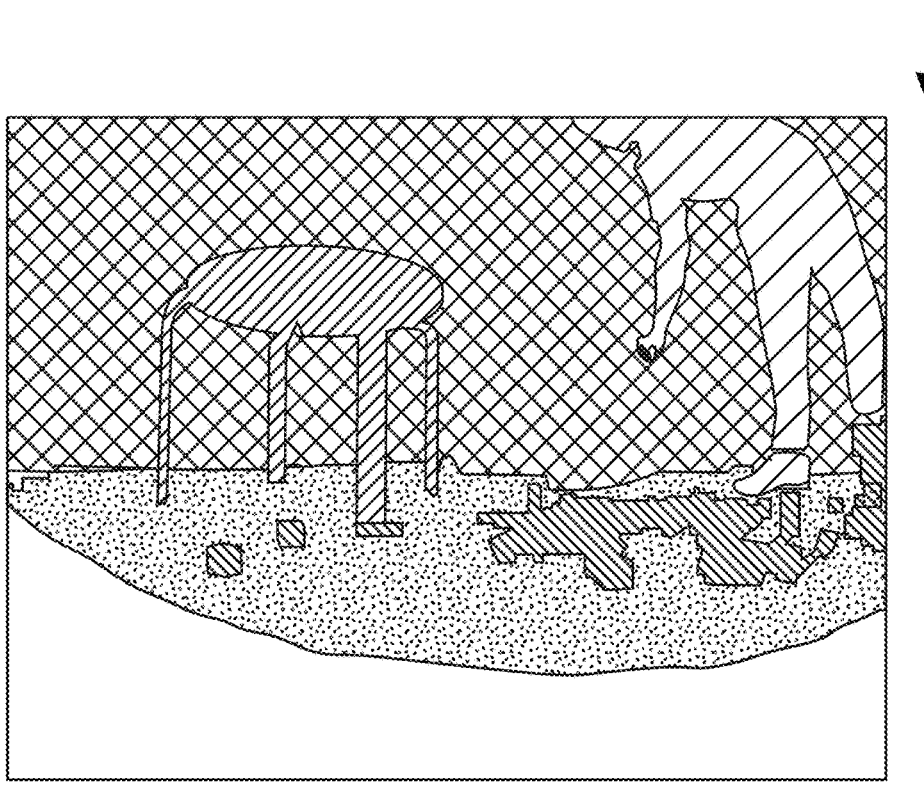
Figure 25:
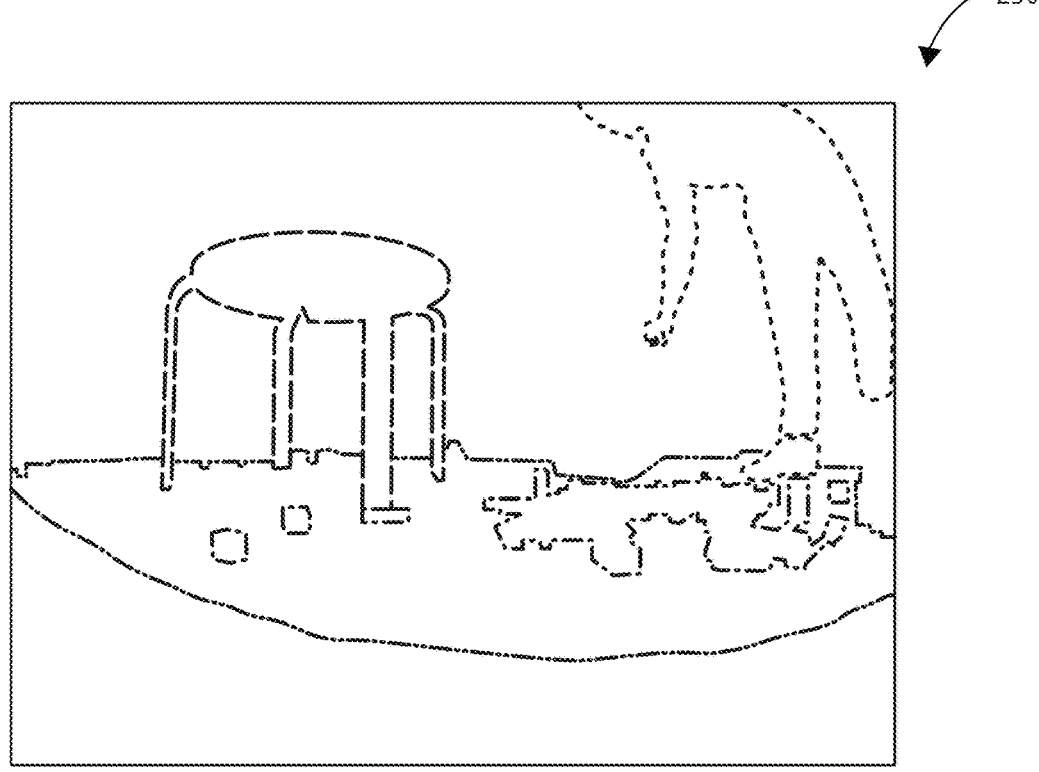
Figure 26:
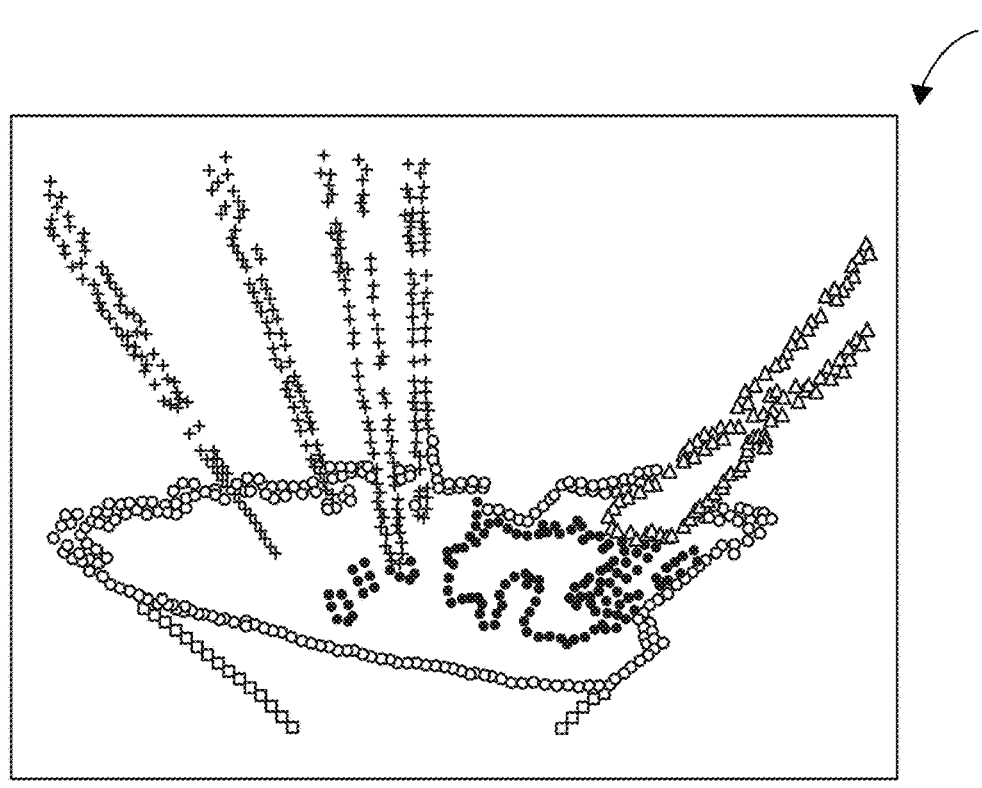
Figure 27:
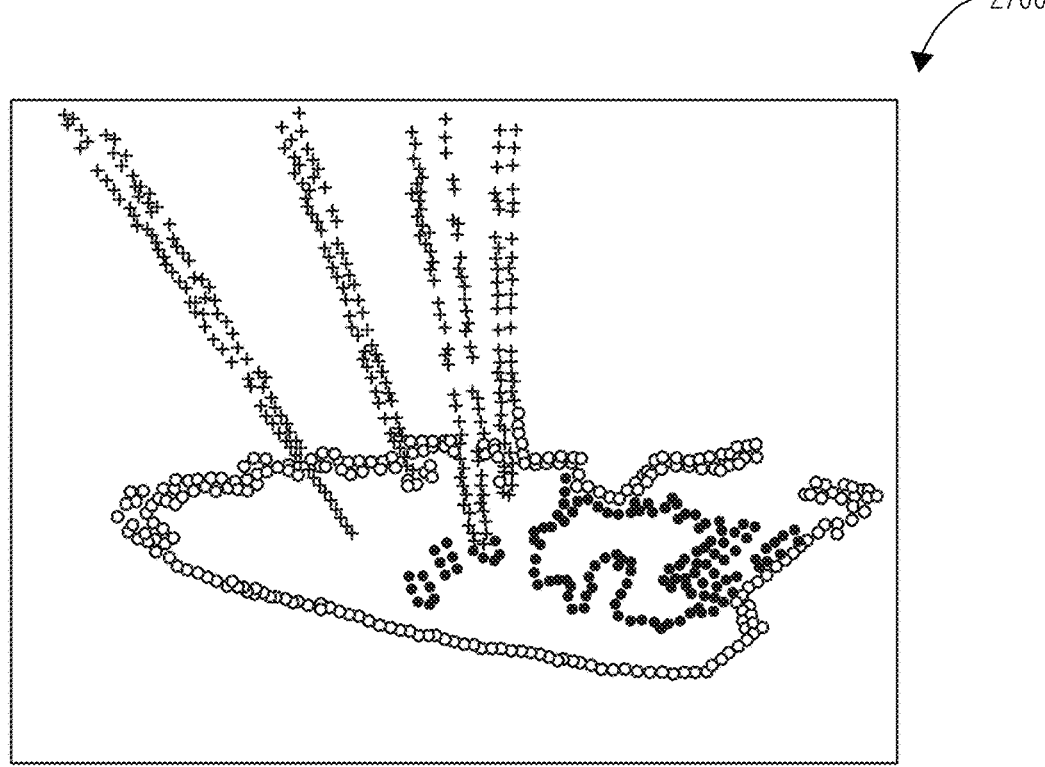
Figure 28:
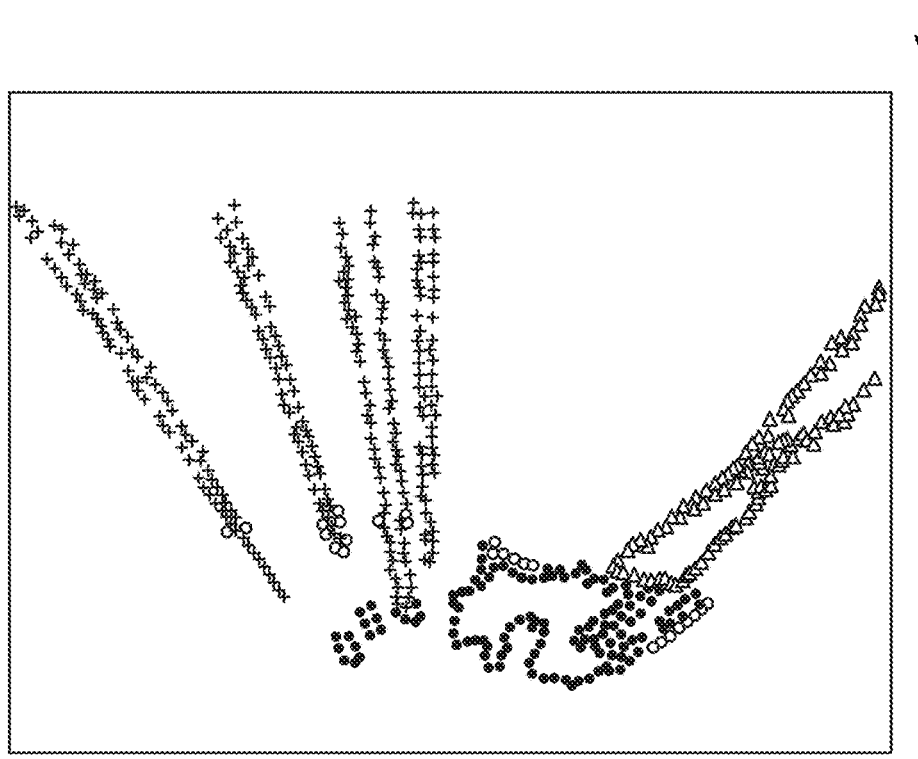

FIG. 24 illustrates a multi-class segmentation map 2400 in accordance with one embodiment. FIG. 25 illustrates a scene edge map 2500 in accordance with one embodiment. FIG. 26 illustrates a pseudo-laserscan/point cloud with semantic label classes 2600 in accordance with one embodiment. FIG. 27 illustrates a scene layout map 2700 in accordance with one embodiment. FIG. 28 illustrates a local occupancy map 2800 in accordance with one embodiment.

Figure 29:
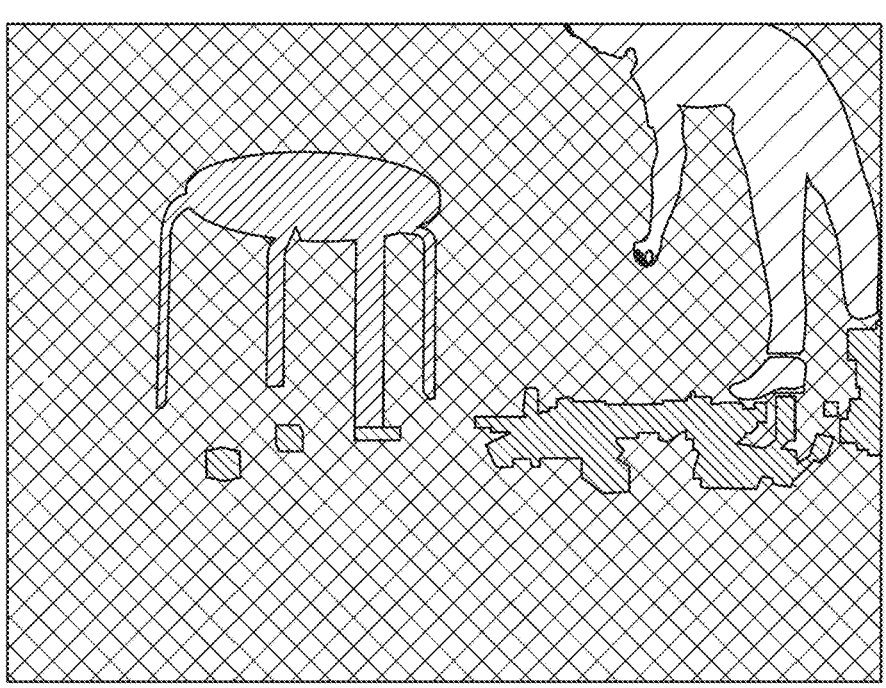
Figure 30:
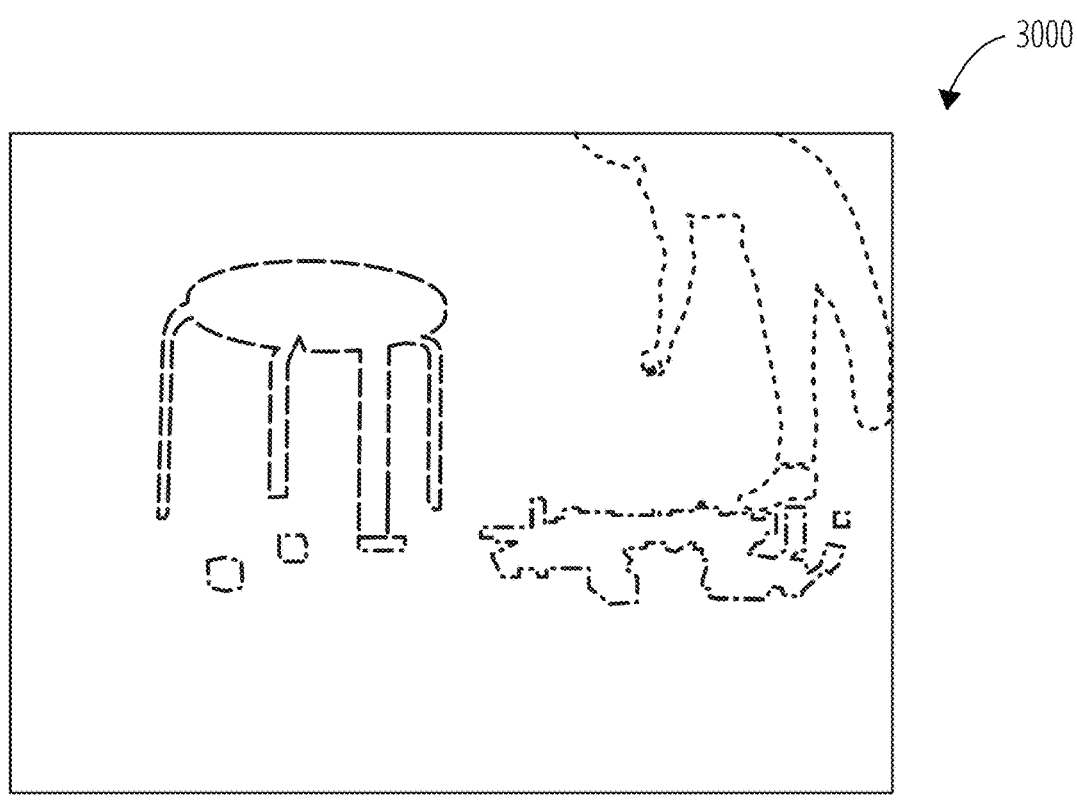
Figure 31:
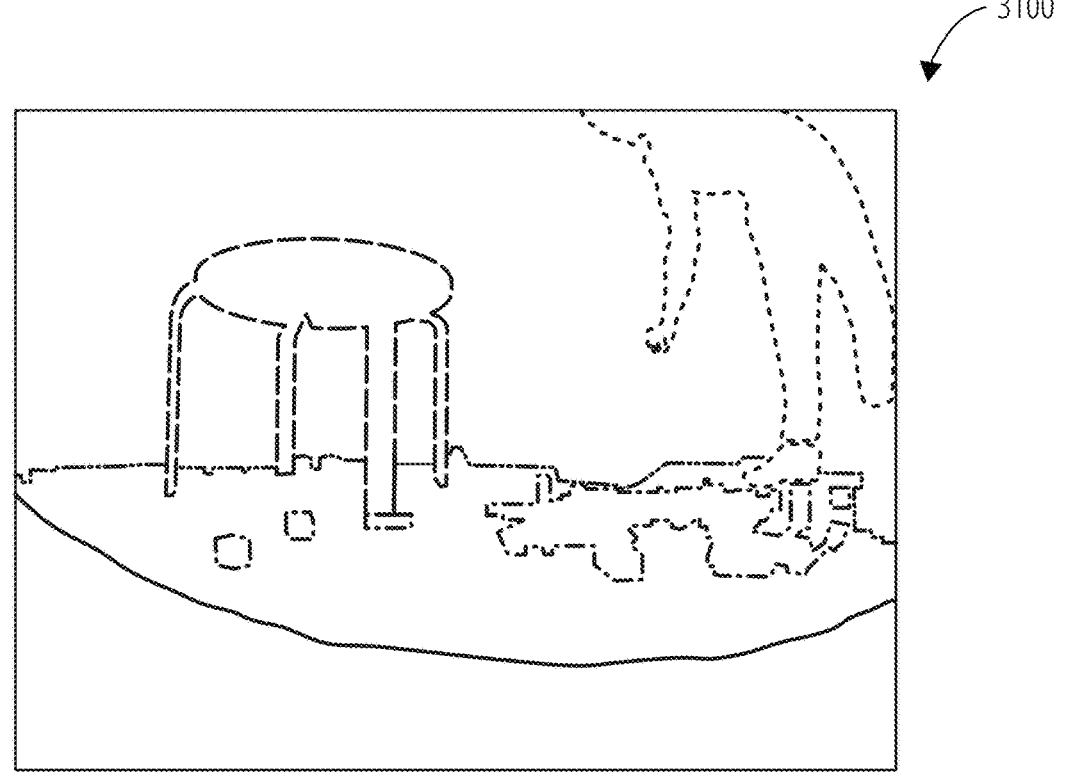

FIG. 29 illustrates a segmentation mask 2900 in accordance with one embodiment. FIG. 30 illustrates a semantic boundary map 3000 in accordance with one embodiment. FIG. 31 illustrates a semantically rich boundary map 3100 in accordance with one embodiment. FIG. 32 illustrates a pseudo-laserscan/point cloud with semantic label classes 3200 in accordance with one embodiment. FIG. 33 illustrates a scene layout map 3300 in accordance with one embodiment.

Figure 34:
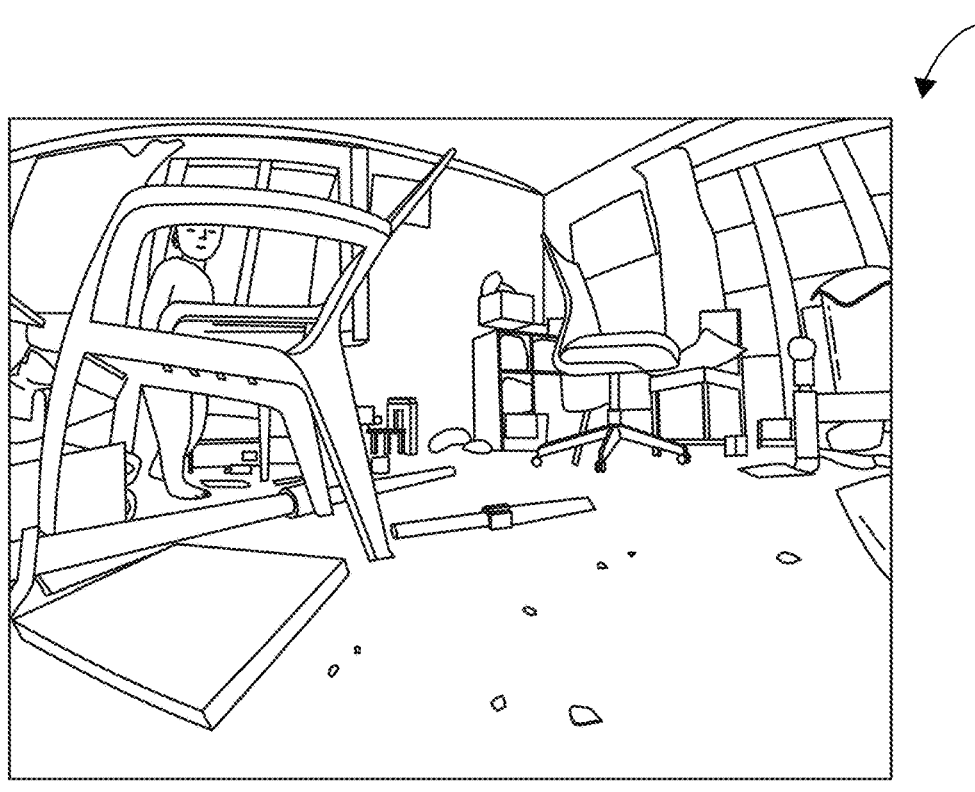
Figure 35:
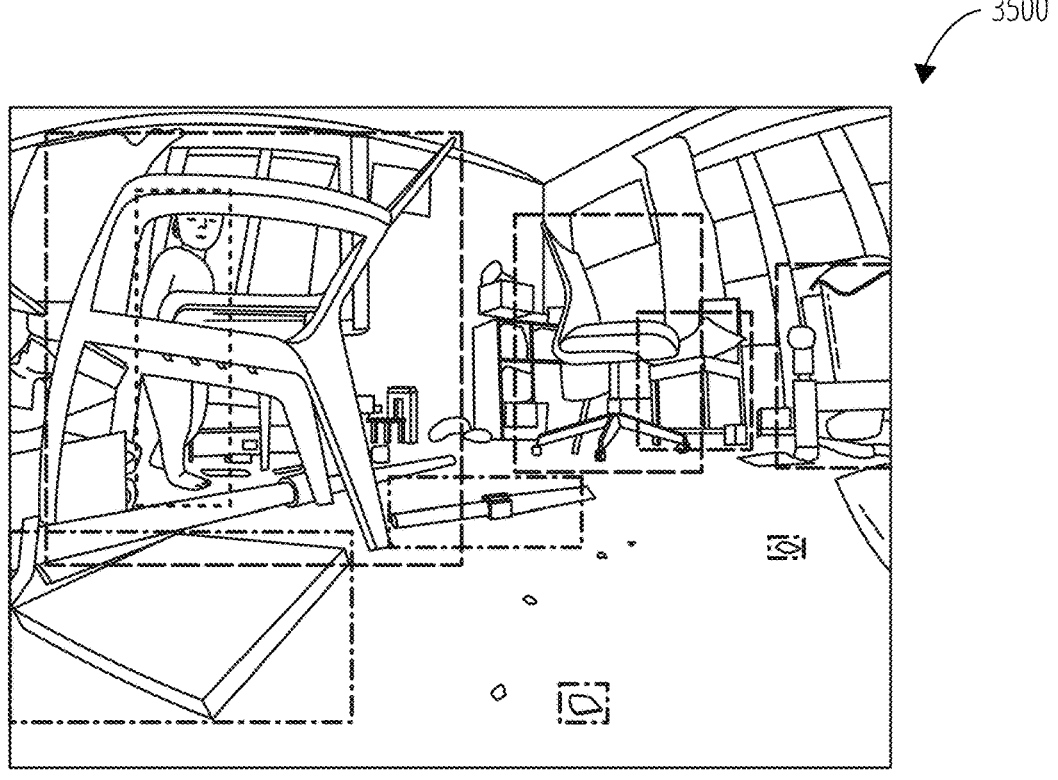
Figure 36:
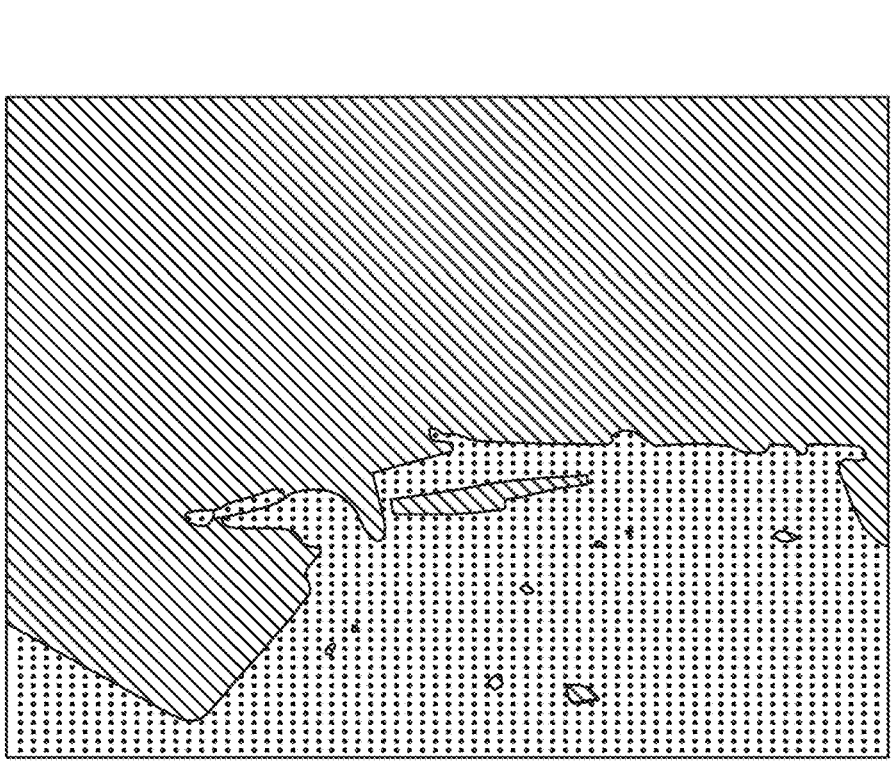
Figure 37:
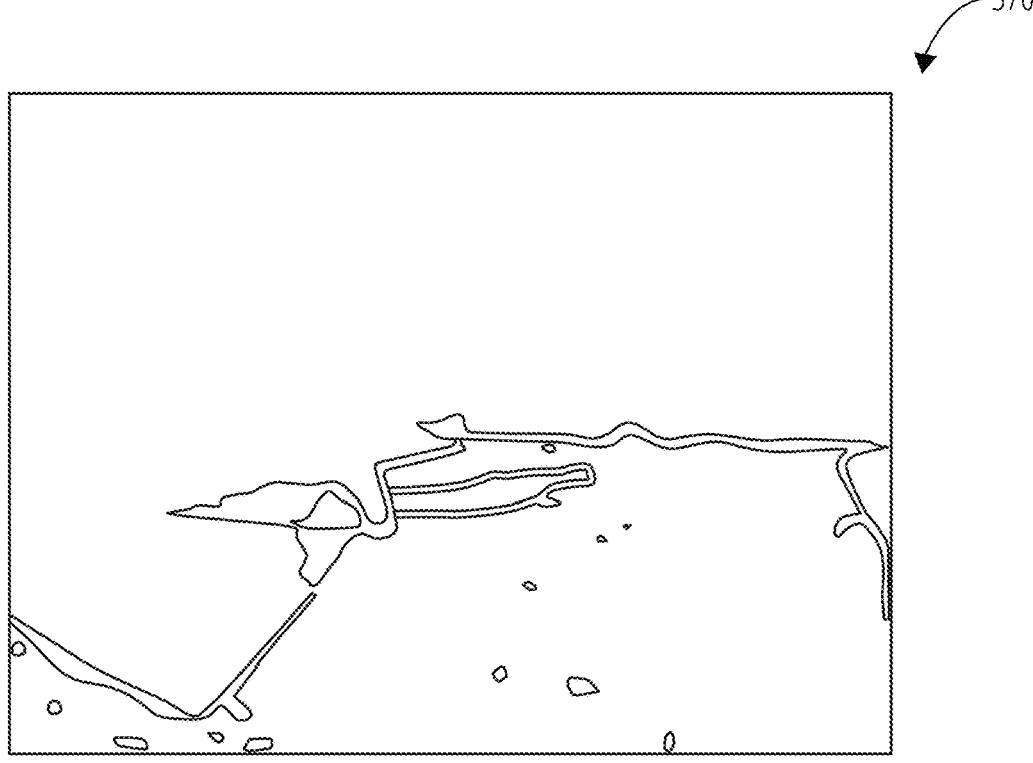
Figure 38:
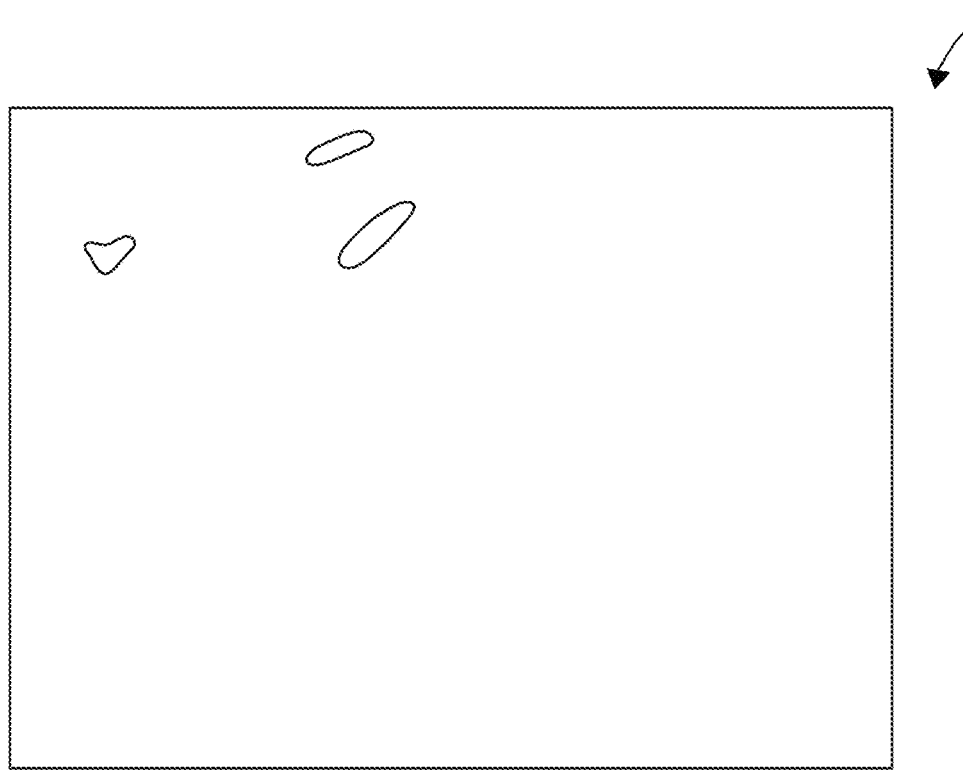
Figure 39:
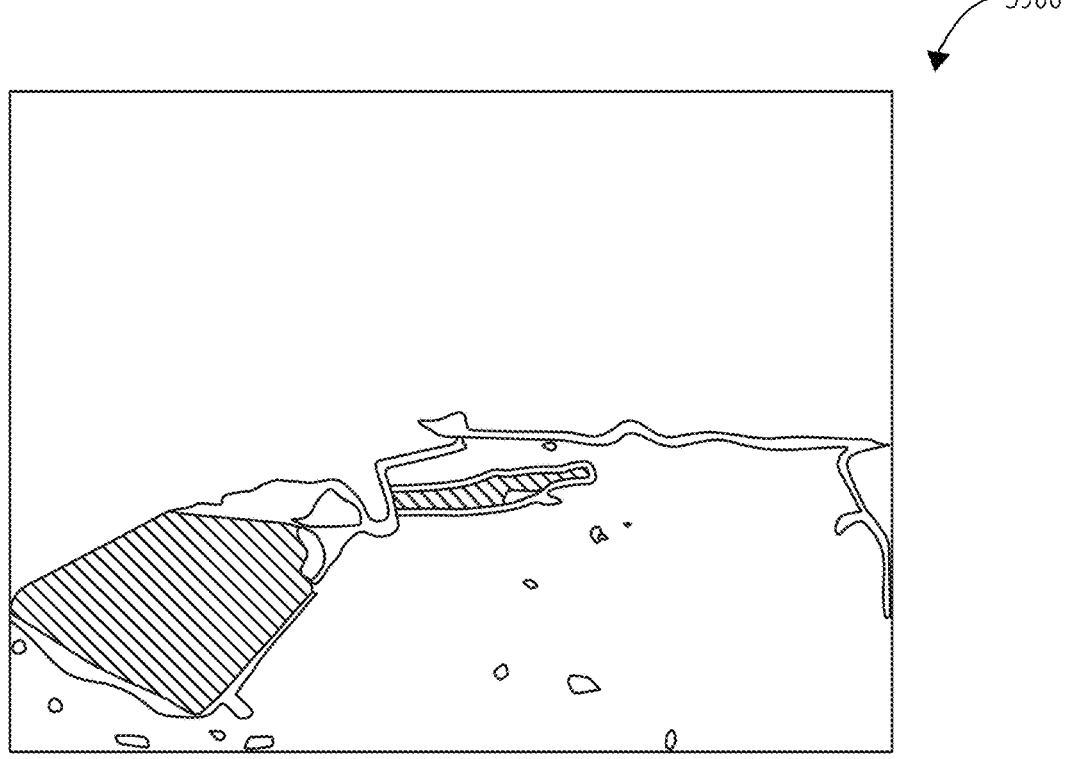
Figure 40:
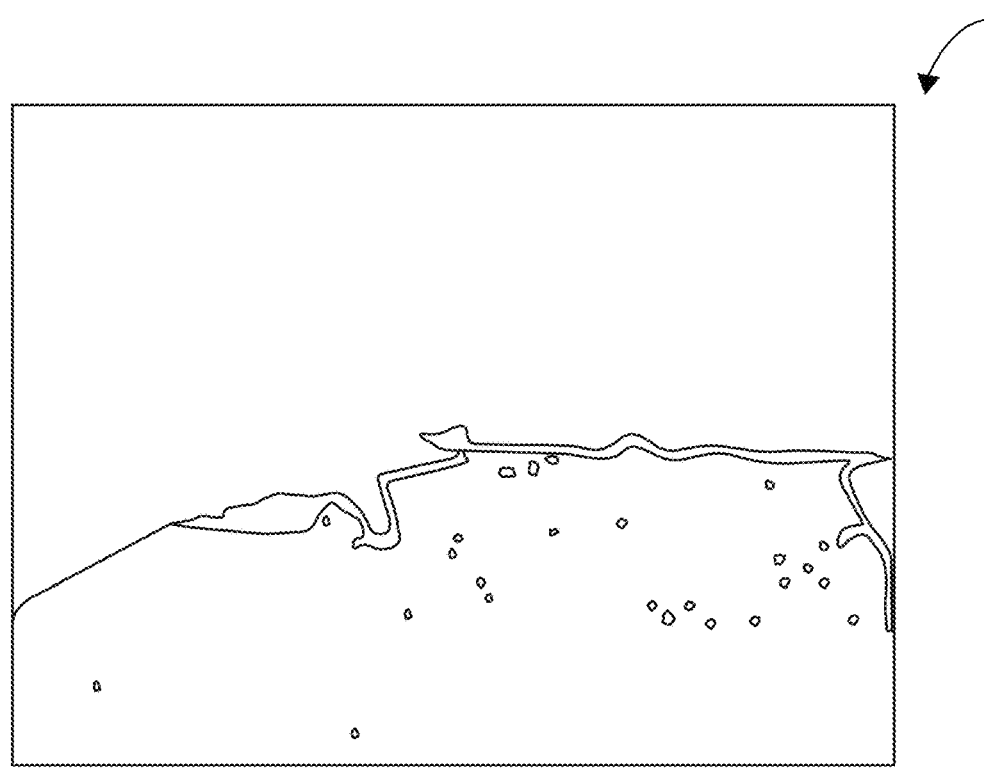
Figure 41:
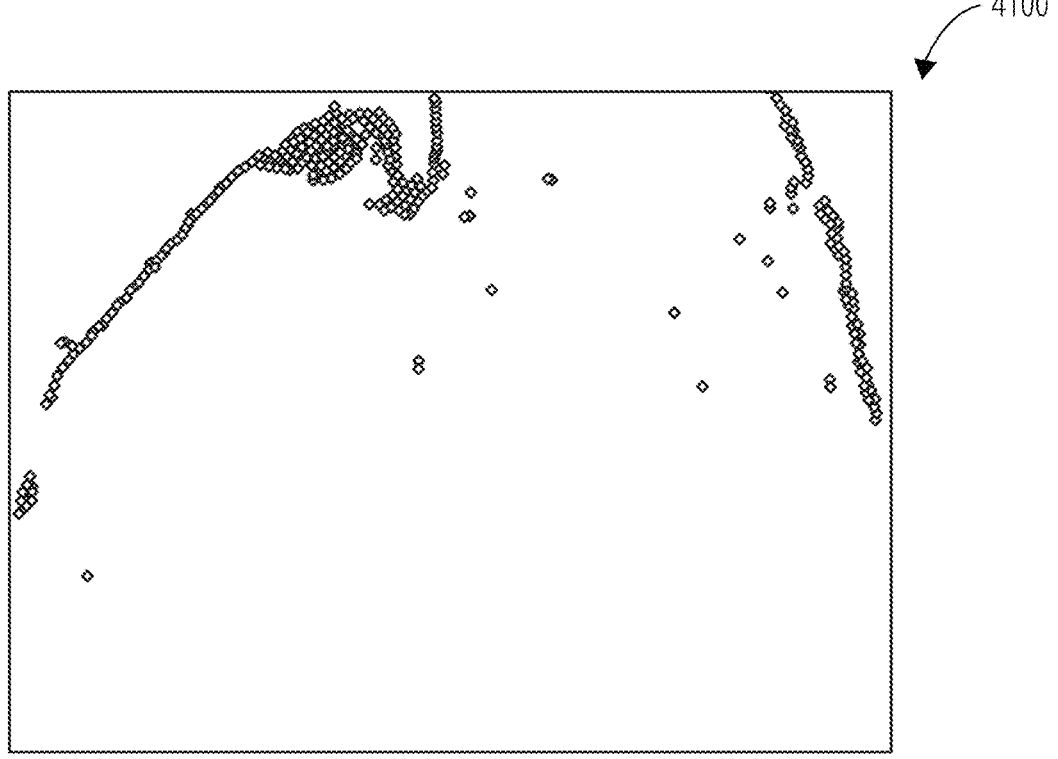
Figure 42:
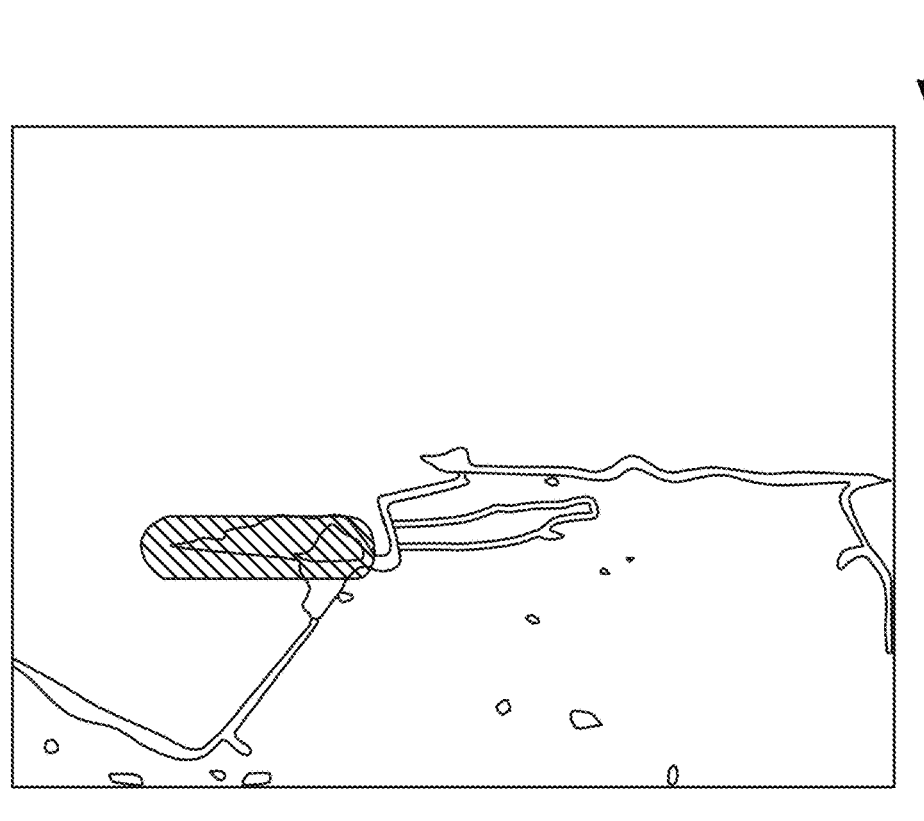
Figure 43:
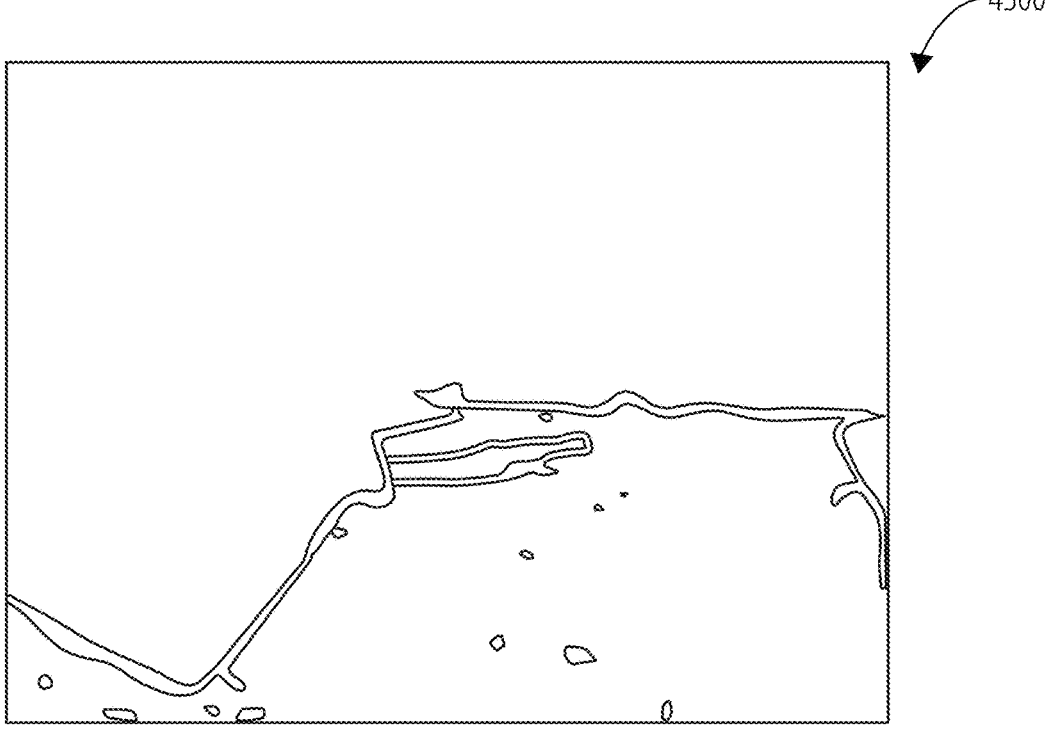
Figure 44:
Figure 45:

FIG. 34 illustrates a detected image of a scene 3400 in accordance with one embodiment. FIG. 35 illustrates classified 2D bounding boxes 3500 in accordance with one embodiment. FIG. 36 illustrates a floor segmentation 3600 in accordance with one embodiment. FIG. 37 illustrates a floor boundary mask 3700 in accordance with one embodiment. FIG. 38 illustrates a laserscan 3800 in accordance with one embodiment. FIG. 39 illustrates mask tidyable object regions 3900 in accordance with one embodiment. FIG. 40 illustrates a floor boundary mask excluding tidyable objects 4000 in accordance with one embodiment. FIG. 41 illustrates a non-pickable object pseudo-laserscan/point cloud 4100 in accordance with one embodiment. FIG. 42 illustrates mask narrow regions 4200 in accordance with one embodiment. FIG. 43 illustrates a floor boundary mask excluding narrow regions 4300 in accordance with one embodiment. FIG. 44 illustrates a non-narrow region pseudo-laserscan/point cloud 4400 in accordance with one embodiment.

Figure 46:
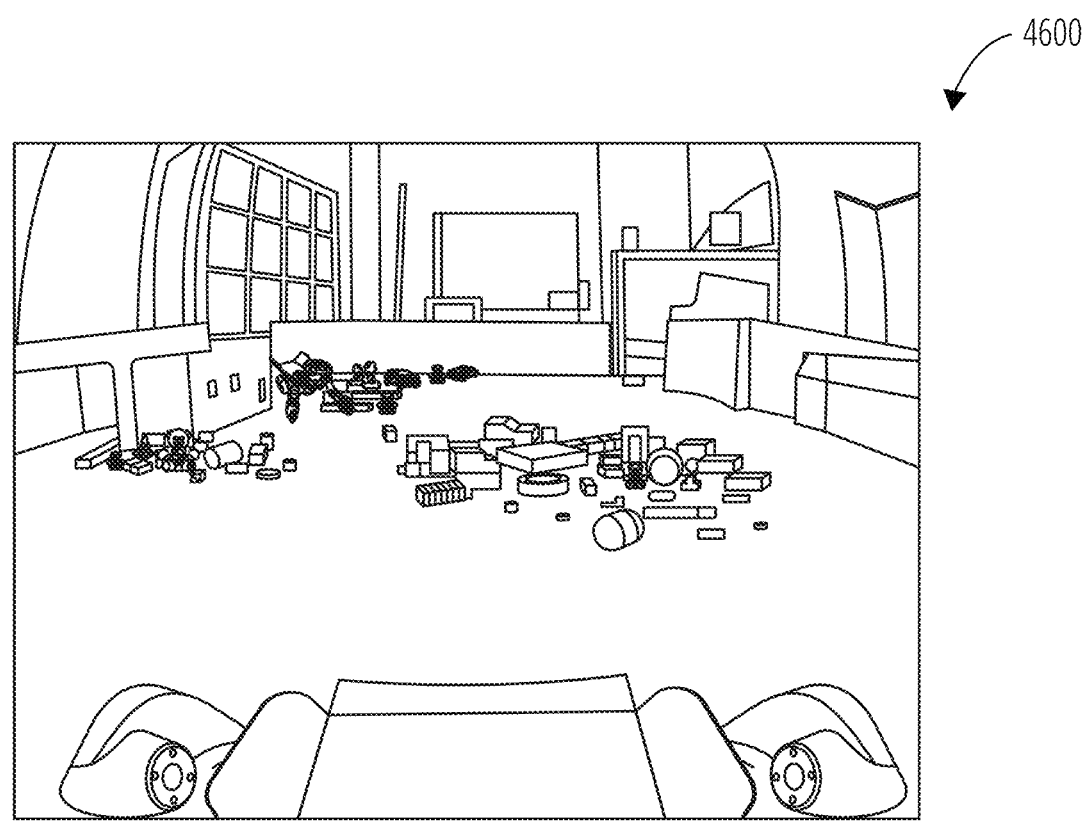

FIG. 46 illustrates detected objects in a scene 4600 in accordance with one embodiment. FIG. 47 illustrates a SLAM global map 4700 in accordance with one embodiment. FIG. 48 illustrates a navigation global map 4800 in accordance with one embodiment. FIG. 49 illustrates an inflated local map 4900 in accordance with one embodiment. FIG. 50 illustrates an inflated global map 5000 in accordance with one embodiment. FIG. 51 illustrates an inflated local map 5100 in accordance with one embodiment. FIG. 52 illustrates an inflated global map 5200 in accordance with one embodiment.

Figure 53A:
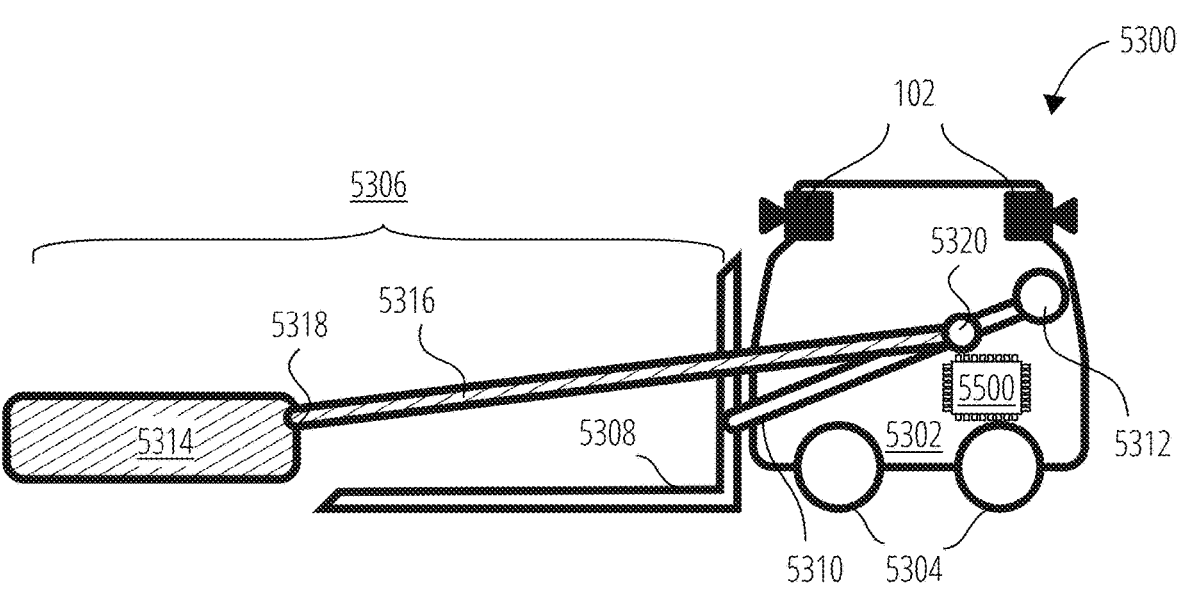
FIG. 53A-FIG. 53D illustrate aspects of a robot 5300 in accordance with one embodiment.
Figure 53B:
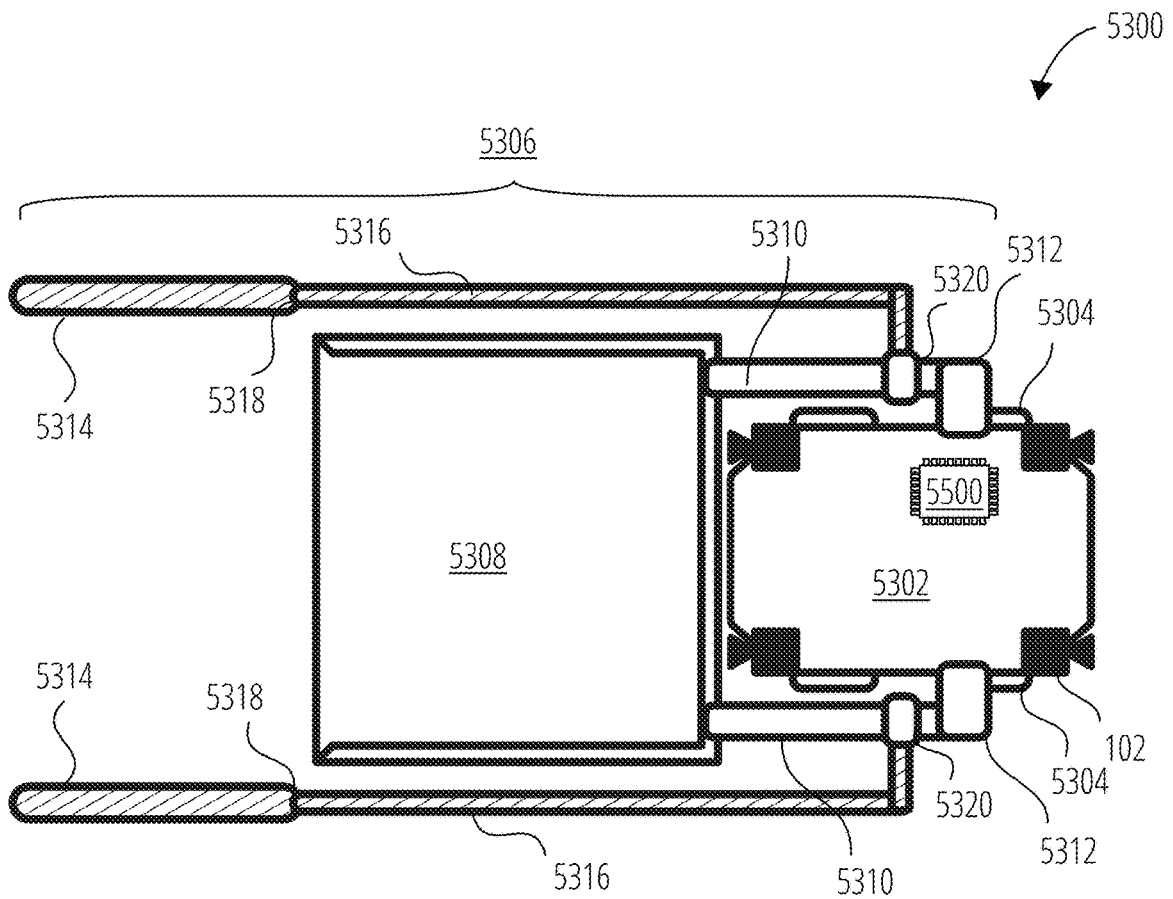

FIG. 53A through FIG. 53D illustrate a robot 5300 in accordance with one embodiment. FIG. 53A illustrates a side view of the robot 5300, and FIG. 53B illustrates a top view. The robot 5300 may comprise a chassis 5302, a mobility system 5304, a sensing system 102, a capture and containment system 5306, and a robotic control system 5500. The capture and containment system 5306 may further comprise a shovel 5308, a shovel arm 5310, a shovel arm pivot point 5312, two grabber pads 5314, two grabber pad arms 5316, and two pad arm pivot points 5320.

The chassis 5302 may support and contain the other components of the robot 5300. The mobility system 5304 may comprise wheels as indicated, as well as caterpillar tracks, conveyor belts, etc., as is well understood in the art. The mobility system 5304 may further comprise motors, servos, or other sources of rotational or kinetic energy to impel the robot 5300 along its desired paths. Mobility system 5304 components may be mounted on the chassis 5302 for the purpose of moving the entire robot without impeding or inhibiting the range of motion needed by the capture and containment system 5306. Elements of the sensing system 102, such as cameras 104, lidar sensors 106, or other components, may be mounted on the chassis 5302 in positions giving the robot 5300 clear lines of sight around its environment in at least some configurations of the chassis 5302, shovel 5308, grabber pad 5314, and grabber pad arm 5316 with respect to each other.

The chassis 5302 may house and protect all or portions of the robotic control system 5500, (portions of which may also be accessed via connection to a cloud server) comprising in some embodiments a processor, memory, and connections to the mobility system 5304, sensing system 102, and capture and containment system 5306. The chassis 5302 may contain other electronic components such as batteries, wireless communication devices, etc., as is well understood in the art of robotics. The robotic control system 5500 may function as described in greater detail with respect to FIG. 55. The mobility system 5304 and or the robotic control system 5500 may incorporate motor controllers used to control the speed, direction, position, and smooth movement of the motors. Such controllers may also be used to detect force feedback and limit maximum current (provide overcurrent protection) to ensure safety and prevent damage.

The capture and containment system 5306 may comprise a shovel 5308, a shovel arm 5310, a shovel arm pivot point 5312, a grabber pad 5314, a grabber pad arm 5316, a pad pivot point 5318, and a pad arm pivot point 5320. In some embodiments, the capture and containment system 5306 may include two grabber pad arms 5316, grabber pads 5314, and their pivot points. In other embodiments, grabber pads 5314 may attach directly to the shovel 5308, without grabber pad arms 5316. Such embodiments are illustrated later in this disclosure.

The geometry and of the shovel 5308 and the disposition of the grabber pads 5314 and grabber pad arms 5316 with respect to the shovel 5308 may describe a containment area, illustrated more clearly in FIG. 54A through FIG. 54E, in which objects may be securely carried. Servos, direct current (DC) motors, or other actuators at the shovel arm pivot point 5312, pad pivot points 5318, and pad arm pivot points 5320 may be used to adjust the disposition of the shovel 5308, grabber pads 5314, and grabber pad arms 5316 between fully lowered shovel and grabber positions and raised shovel and grabber positions, as illustrated with respect to FIG. 54A through FIG. 54C.

The point of connection shown between the shovel arms and grabber pad arms is an exemplary position and not intended to limit the physical location of such points of connection. Such connections may be made in various locations as appropriate to the construction of the chassis and arms, and the applications of intended use.

In some embodiments, gripping surfaces may be configured on the sides of the grabber pads 5314 facing in toward objects to be lifted. These gripping surfaces may provide cushion, grit, elasticity, or some other feature that increases friction between the grabber pads 5314 and objects to be captured and contained. In some embodiments, the grabber pad 5314 may include suction cups in order to better grasp objects having smooth, flat surfaces. In some embodiments, the grabber pads 5314 may be configured with sweeping bristles. These sweeping bristles may assist in moving small objects from the floor up onto the shovel 5308. In some embodiments, the sweeping bristles may angle down and inward from the grabber pads 5314, such that, when the grabber pads 5314 sweep objects toward the shovel 5308, the sweeping bristles form a ramp, allowing the foremost bristles to slide beneath the object, and direct the object upward toward the grabber pads 5314, facilitating capture of the object within the shovel and reducing a tendency of the object to be pressed against the floor, increasing its friction and making it more difficult to move.

Figure 53C:
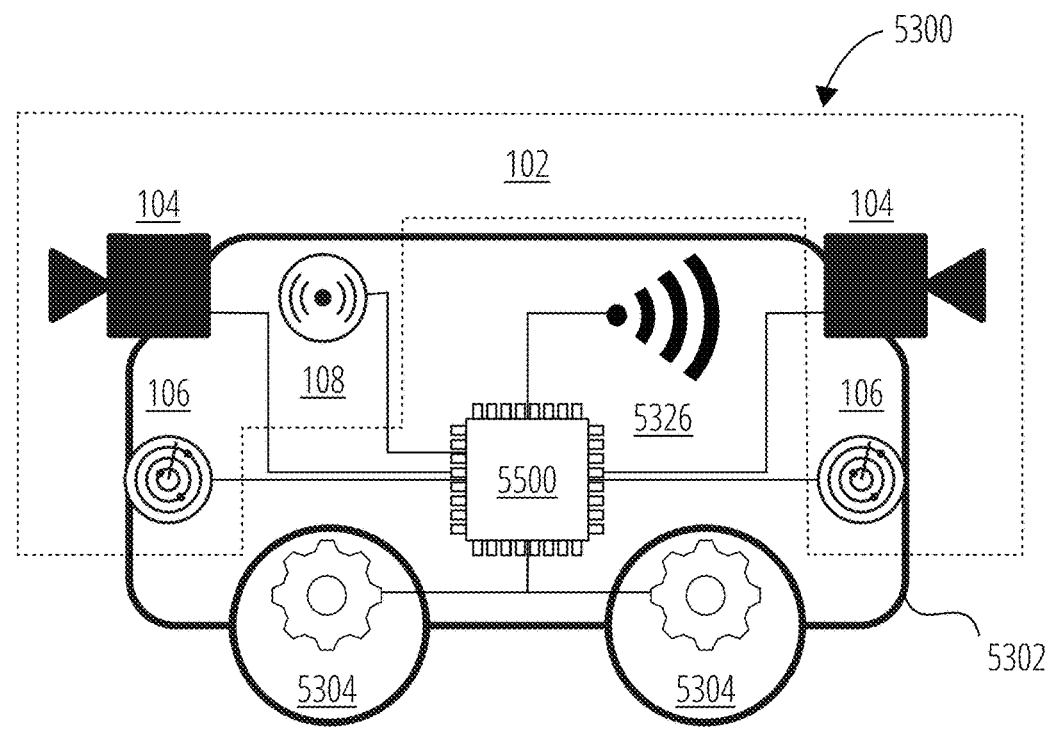
Figure 53D:
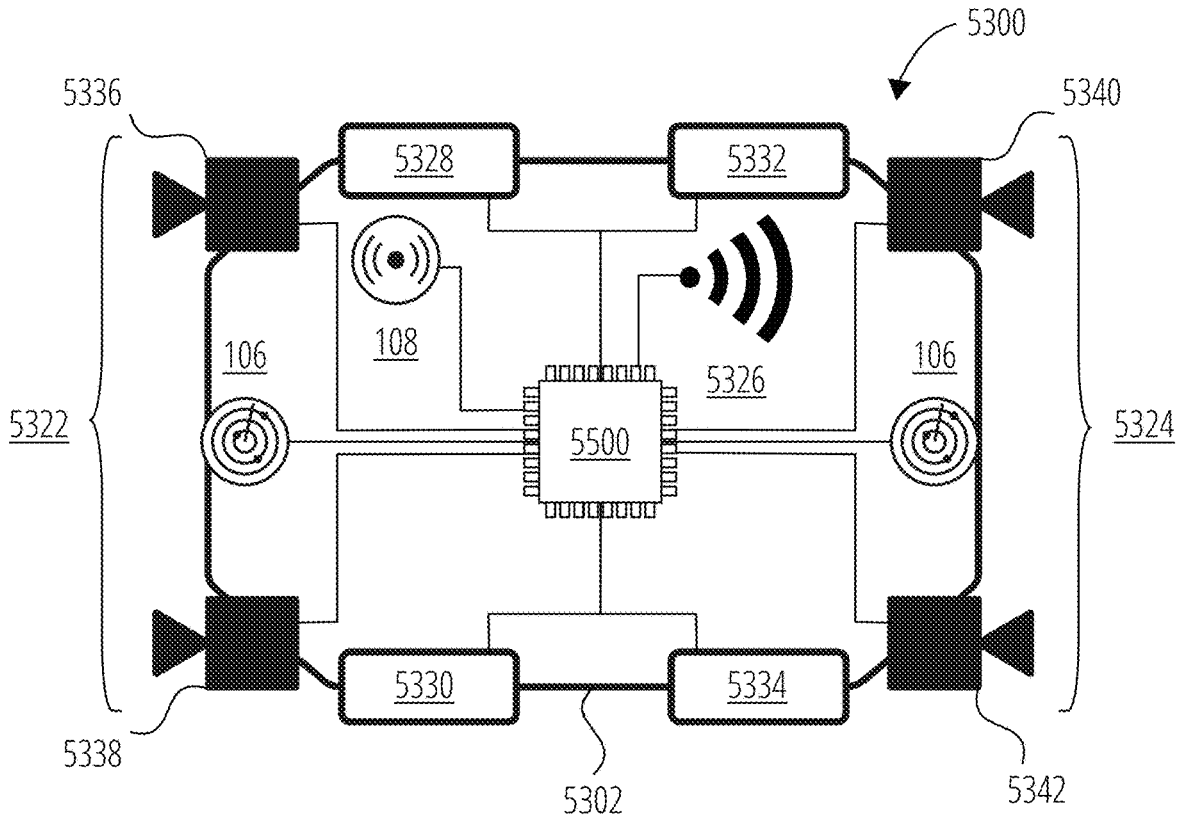

FIG. 53C and FIG. 53D illustrate a side view and top view of the chassis 5302, respectively, along with the general connectivity of components of the mobility system 5304, sensing system 102, and communications 5326, in connection with with the robotic control system 5500. In some embodiments, the communications 5326 may include the network interface 5512 described in greater detail with respect to robotic control system 5500.

In one embodiment, the mobility system 5304 may comprise a right front wheel 5328, a left front wheel 5330, a right rear wheel 5332, and a left rear wheel 5334. The robot 5300 may have front wheel drive, where right front wheel 5328 and left front wheel 5330 are actively driven by one or more actuators or motors, while the right rear wheel 5332 and left rear wheel 5334 spin on an axle passively while supporting the rear portion of the chassis 5302. In another embodiment, the robot 5300 may have rear wheel drive, where the right rear wheel 5332 and left rear wheel 5334 are actuated and the front wheels turn passively. In another embodiment, each wheel may be actively actuated by separate motors or actuators.

The sensing system 102 may further comprise cameras camera 104 such as the front cameras 5322 and rear cameras 5324, light detecting and ranging (LIDAR) sensors such as lidar sensors lidar sensor 106, and inertial measurement unit (IMU) sensors, such as IMU sensors IMU sensor 108. In some embodiments, front camera 5322 may include the front right camera 5336 and front left camera 5338. In some embodiments, rear camera 5324 may include the rear left camera 5340 and rear right camera 5342.

Figures 54A, 54B, 54C:
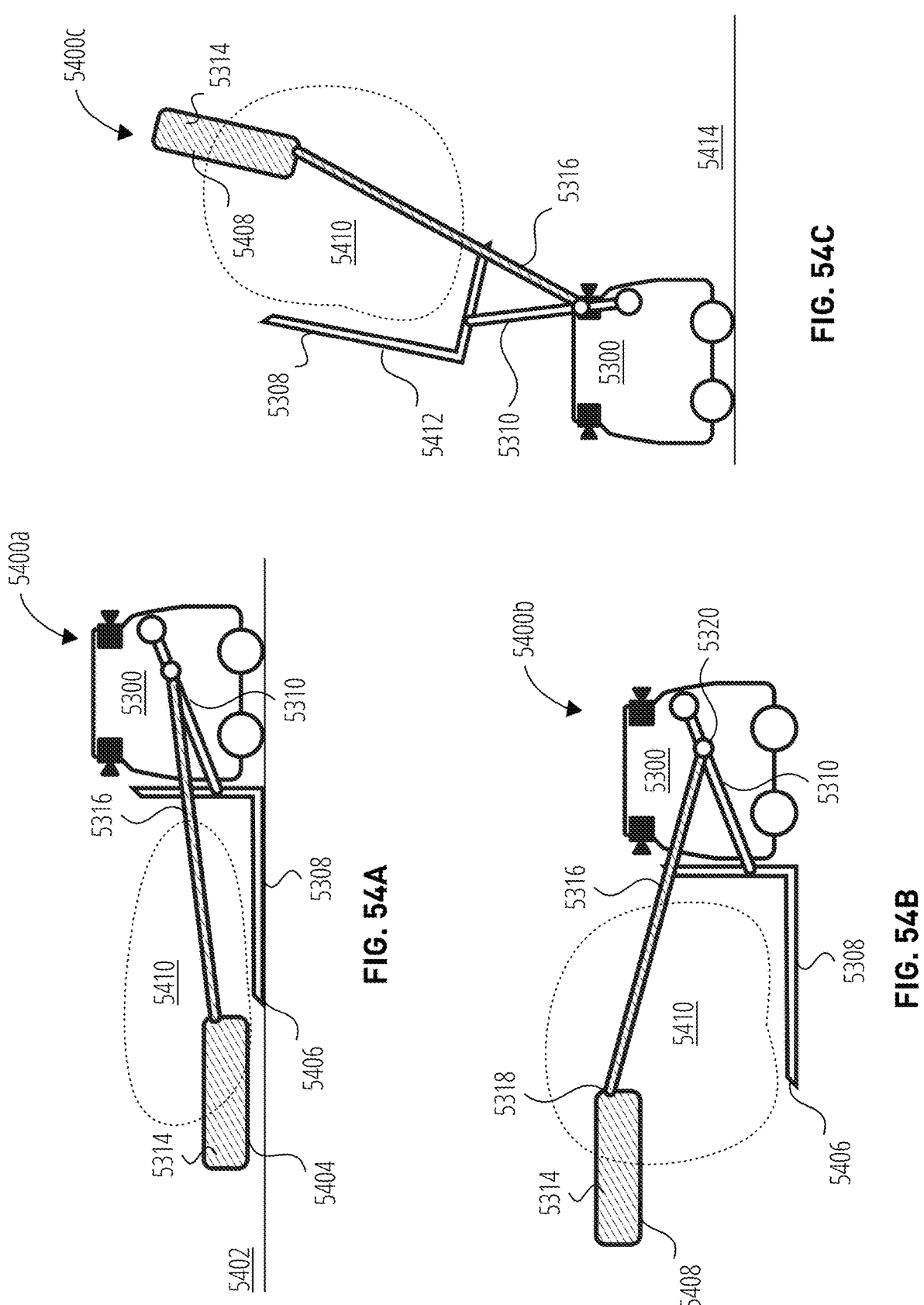
FIG. 54A illustrates a lowered shovel position and lowered grabber position 5400a for the robot 5300 in accordance with one embodiment.
FIG. 54B illustrates a lowered shovel position and raised grabber position 5400b for the robot 5300 in accordance with one embodiment.
FIG. 54C illustrates a raised shovel position and raised grabber position 5400c for the robot 5300 in accordance with one embodiment.

FIG. 54A illustrates a robot 5300 such as that introduced with respect to FIG. 9 disposed in a lowered shovel position and lowered grabber position 5400a. In this configuration, the grabber pads 5314 and grabber pad arms 5316 rest in a lowered grabber position 5404, and the shovel 5308 and shovel arm 5310 rest in a lowered shovel position 5406 at the front 5402 of the robot 5300. In this position, the shovel 5308 and grabber pads 5314 may roughly describe a containment area 5410 as shown.

FIG. 54B illustrates a robot 5300 with a lowered shovel position and raised grabber position 5400b. Through the action of servos or other actuators at the pad pivot points 5318 and pad arm pivot points 5320, the grabber pads 5314 and grabber pad arms 5316 may be raised to a raised grabber position 5408 while the shovel 5308 and shovel arm 5310 maintain a lowered shovel position 5406. In this configuration, the grabber pads 5314 and shovel 5308 may roughly describe a containment area 5410 as shown, in which an object taller than the shovel 5308 height may rest within the shovel 5308 and be held in place through pressure exerted by the grabber pads 5314.

Pad arm pivot points 5320 and pad pivot points 5318, and other device attributes may provide the robot 5300 a range of motion of these components beyond what is illustrated herein. The positions shown in the disclosed figures are for illustrative purposes, and not meant to indicate the limits of the robot's component range of motion.

FIG. 54C illustrates a robot 5300 with a raised shovel position and raised grabber position 5400c. The grabber pads 5314 and grabber pad arms 5316 may be in a raised grabber position 5408 while the shovel 5308 and shovel arm 5310 are in a raised shovel position 5412. In this position, the robot 5300 may be able to allow objects to drop from the shovel 5308 and grabber pad arms 5316 to an area at the rear 5414 of the robot 5300.

The carrying position may involve the disposition of the grabber pads 5314, grabber pad arms 5316, shovel 5308, and shovel arm 5310, in relative configurations between the extremes of lowered shovel position and lowered grabber position 5400a and raised shovel position and raised grabber position 5400c.

Figure 54D:
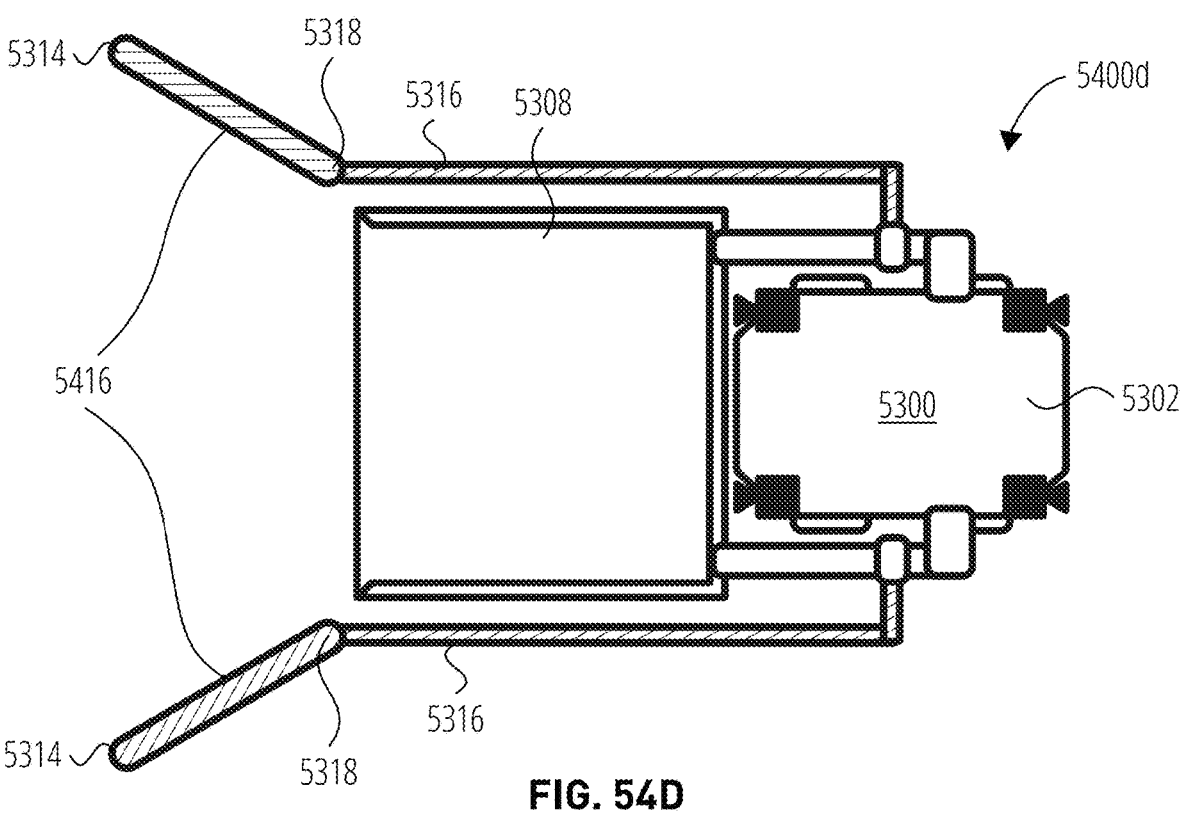
FIG. 54D illustrates a robot 5300 with grabber pads extended 5400d in accordance with one embodiment.

FIG. 54D illustrates a robot 5300 with grabber pads extended 5400d. By the action of servos or other actuators at the pad pivot points 5318, the grabber pads 5314 may be configured as extended grabber pads 5416 to allow the robot 5300 to approach objects as wide or wider than the robot chassis 5302 and shovel 5308. In some embodiments, the grabber pads 5314 may be able to rotate through almost three hundred and sixty degrees, to rest parallel with and on the outside of their associated grabber pad arms 5316 when fully extended.

Figure 54E:
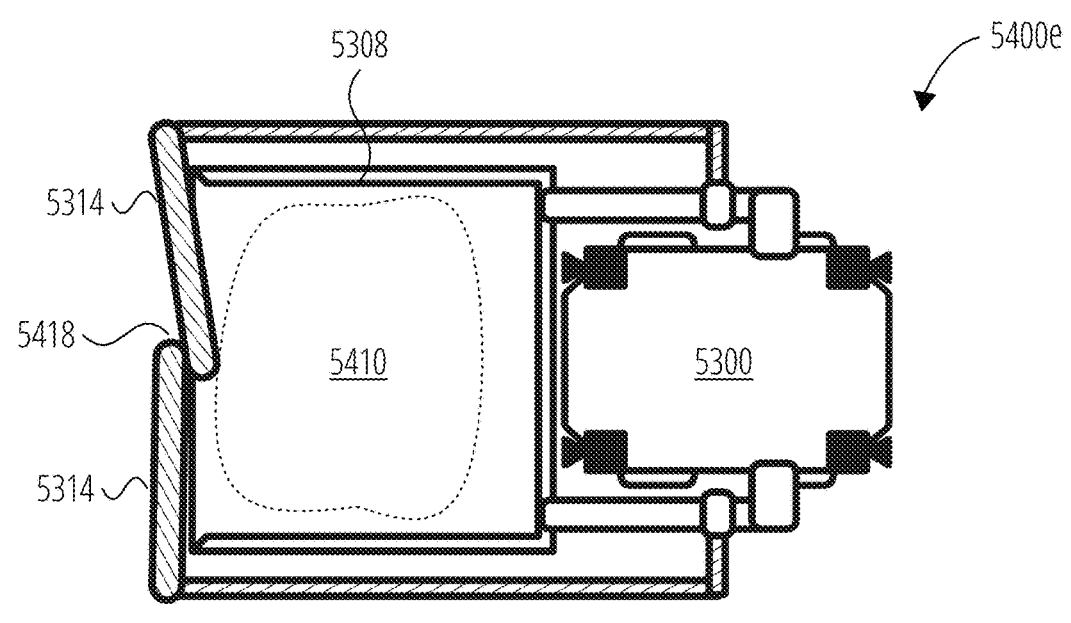
FIG. 54E illustrates a robot 5300 with grabber pads retracted 5400e in accordance with one embodiment.

FIG. 54E illustrates a robot 5300 with grabber pads retracted 5400e. The closed grabber pads 5418 may roughly define a containment area 5410 through their position with respect to the shovel 5308. In some embodiments, the grabber pads 5314 may be able to rotate farther than shown, through almost three hundred and sixty degrees, to rest parallel with and inside of the side walls of the shovel 5308.

Figure 55:
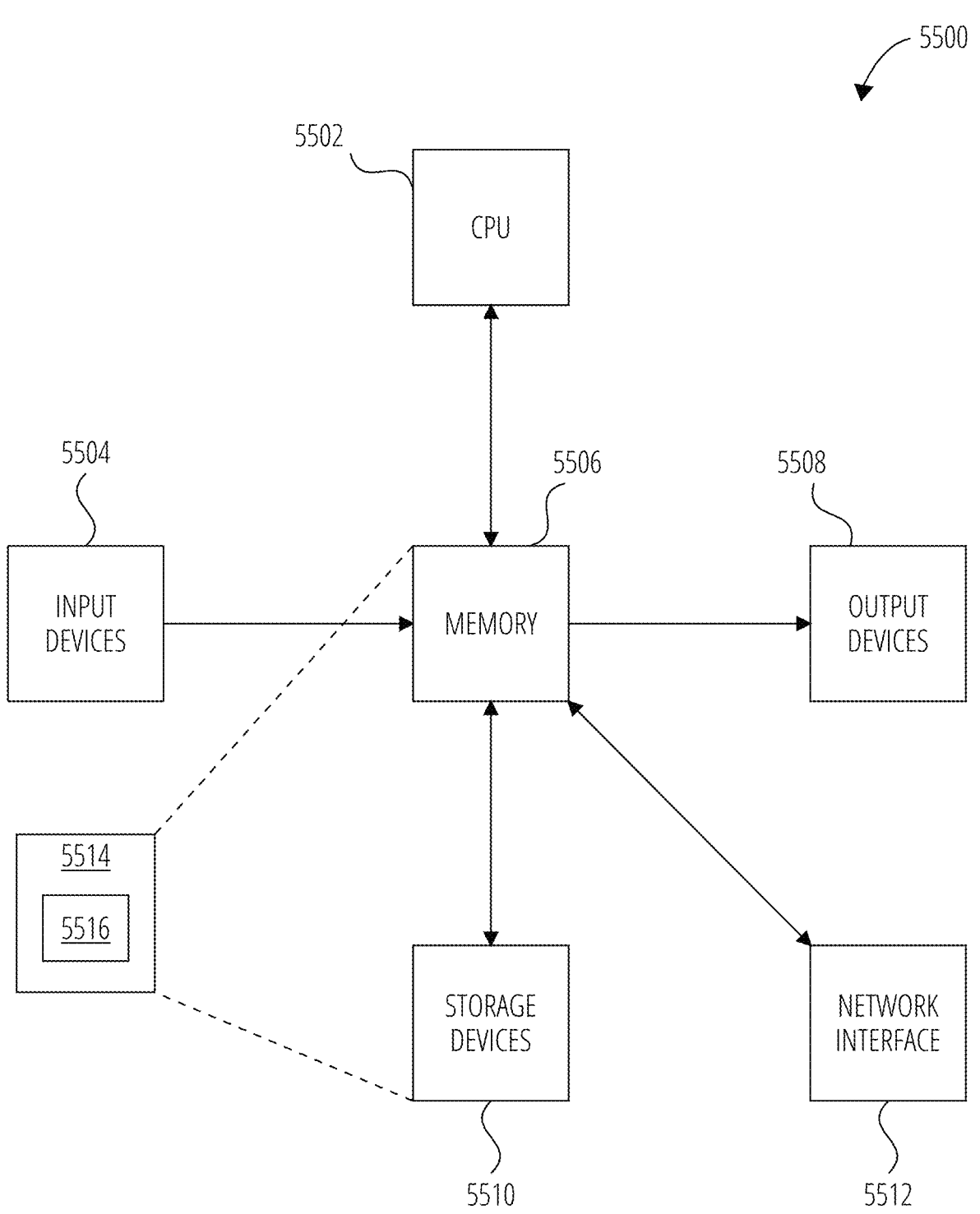
FIG. 55 illustrates an embodiment of a robotic control system 5500 to implement components and process steps of the system described herein.

FIG. 55 depicts an embodiment of a robotic control system 5500 to implement components and process steps of the systems described herein. Some or all portions of the robotic control system 5500 and its operational logic may be contained within the physical components of a robot and/or within a cloud server in communication with the robot. In one embodiment, aspects of the robotic control system 5500 on a cloud server may control more than one robot at a time, allowing multiple robots to work in concert within a working space.

Input devices 5504 (e.g., of a robot or companion device such as a mobile phone or personal computer) comprise transducers that convert physical phenomena into machine internal signals, typically electrical, optical or magnetic signals. Signals may also be wireless in the form of electromagnetic radiation in the radio frequency (RF) range but also potentially in the infrared or optical range. Examples of input devices 5504 are contact sensors which respond to touch or physical pressure from an object or proximity of an object to a surface, mice which respond to motion through space or across a plane, microphones which convert vibrations in the medium (typically air) into device signals, scanners which convert optical patterns on two- or three-dimensional objects into device signals. The signals from the input devices 5504 are provided via various machine signal conductors (e.g., busses or network interfaces) and circuits to memory 5506.

The memory 5506 is typically what is known as a first or second-level memory device, providing for storage (via configuration of matter or states of matter) of signals received from the input devices 5504, instructions and information for controlling operation of the central processing unit or CPU 5502, and signals from storage devices 5510. The memory 5506 and/or the storage devices 5510 may store computer-executable instructions and thus forming logic 5514 that when applied to and executed by the CPU 5502 implement embodiments of the processes disclosed herein. Logic 5514 may include portions of a computer program, along with configuration data, that are run by the CPU 5502 or another processor. Logic 5514 may include one or more machine learning models 5516 used to perform the disclosed actions. In one embodiment, portions of the logic 5514 may also reside on a mobile or desktop computing device accessible by a user to facilitate direct user control of the robot.

Information stored in the memory 5506 is typically directly accessible to the CPU 5502 of the device. Signals input to the device cause the reconfiguration of the internal material/energy state of the memory 5506, creating in essence a new machine configuration, influencing the behavior of the robotic control system 5500 by configuring the CPU 5502 with control signals (instructions) and data provided in conjunction with the control signals.

Second- or third-level storage devices 5510 may provide a slower but higher capacity machine memory capability. Examples of storage devices 5510 are hard disks, optical disks, large-capacity flash memories or other non-volatile memory technologies, and magnetic memories.

In one embodiment, memory 5506 may include virtual storage accessible through connection with a cloud server using the network interface 5512, as described below. In such embodiments, some or all of the logic 5514 may be stored and processed remotely.

The CPU 5502 may cause the configuration of the memory 5506 to be altered by signals in storage devices 5510. In other words, the CPU 5502 may cause data and instructions to be read from storage devices 5510 in the memory 5506, from which they may influence the operations of CPU 5502 as instructions and data signals, and from which they may also be provided to the output devices 5508. The CPU 5502 may alter the content of the memory 5506 by signaling to a machine interface of memory 5506 to alter the internal configuration and then send converted signals to the storage devices 5510 to alter its material internal configuration. In other words, data and instructions may be backed up from memory 5506, which is often volatile, to storage devices 5510, which are often non-volatile.

Output devices 5508 are transducers that convert signals received from the memory 5506 into physical phenomena such as vibrations in the air, patterns of light on a machine display, or vibrations (i.e., haptic devices) or patterns of ink or other materials (i.e., printers and 3-D printers).

The network interface 5512 receives signals from the memory 5506 and converts them into electrical, optical, or wireless signals to other machines, typically via a machine network. The network interface 5512 also receives signals from the machine network and converts them into electrical, optical, or wireless signals to the memory 5506. The network interface 5512 may allow a robot to communicate with a cloud server, a mobile computing device, other robots, and other network-enabled devices.

Figure 56:
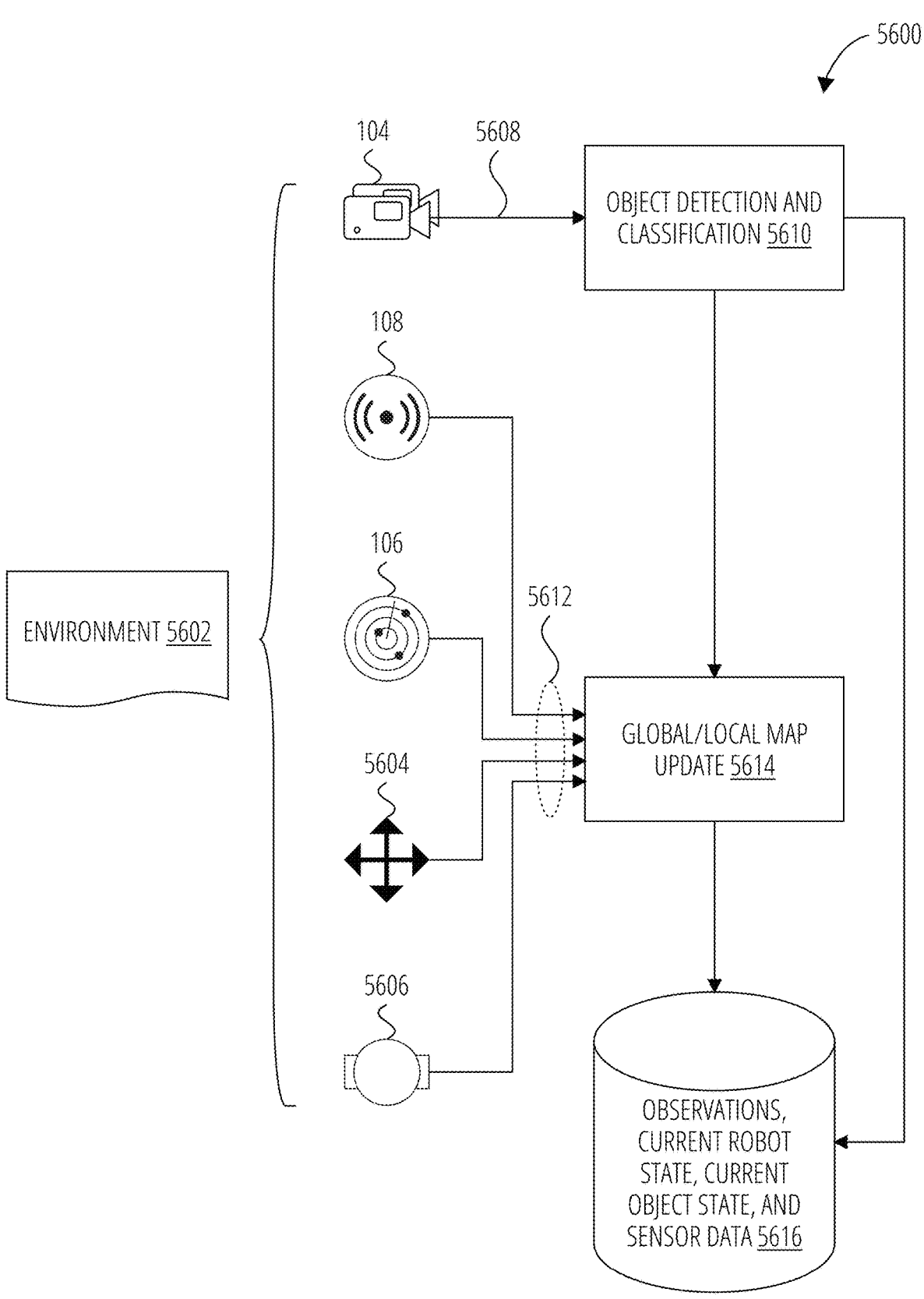
FIG. 56 illustrates sensor input analysis 5600 in accordance with one embodiment.

FIG. 56 illustrates sensor input analysis 5600 in accordance with one embodiment. Sensor input analysis 5600 may inform the robot 5300 of the dimensions of its immediate environment 5602 and the location of itself and other objects within that environment 5602.

The robot 5300 as previously described includes a sensing system 102. This sensing system 102 may include at least one of cameras 104, IMU sensors 108, lidar sensor 106, odometry 5604, and actuator force feedback sensor 5606. These sensors may capture data describing the environment 5602 around the robot 5300.

image data 5608 from the cameras 104 may be used for object detection and classification 5610. Object detection and classification 5610 may be performed by algorithms and models configured within the robotic control system 5500 of the robot 5300. In this manner, the characteristics and types of objects in the environment 5602 may be determined.

image data 5608, object detection and classification 5610 data, and other sensor data 5612 may be used for a global/local map update 5614. The global and/or local map may be stored by the robot 5300 and may represent its knowledge of the dimensions and objects within its decluttering environment 5602. This map may be used in navigation and strategy determination associated with decluttering tasks.

The robot may use a combination of camera 104, lidar sensor 106, and other sensors to maintain a global or local area map of the environment and to localize itself within that. Additionally, the robot may perform object detection and object classification and may generate visual re-identification fingerprints for each object. The robot may utilize stereo cameras along with a machine learning/neural network software architecture (e.g., semi-supervised or supervised convolutional neural network) to efficiently classify the type, size, and location of different objects on a map of the environment.

The robot may determine the relative distance and angle to each object. The distance and angle may then be used to localize objects on the global or local area map. The robot may utilize both forward and backward-facing cameras to scan both to the front and to the rear of the robot.

image data 5608, object detection and classification 5610 data, other sensor data 5612, and global/local map update 5614 data may be stored as observations, current robot state, current object state, and sensor data 5616. The observations, current robot state, current object state, and sensor data 5616 may be used by the robotic control system 5500 of the robot 5300 in determining navigation paths and task strategies.

Figure 57:
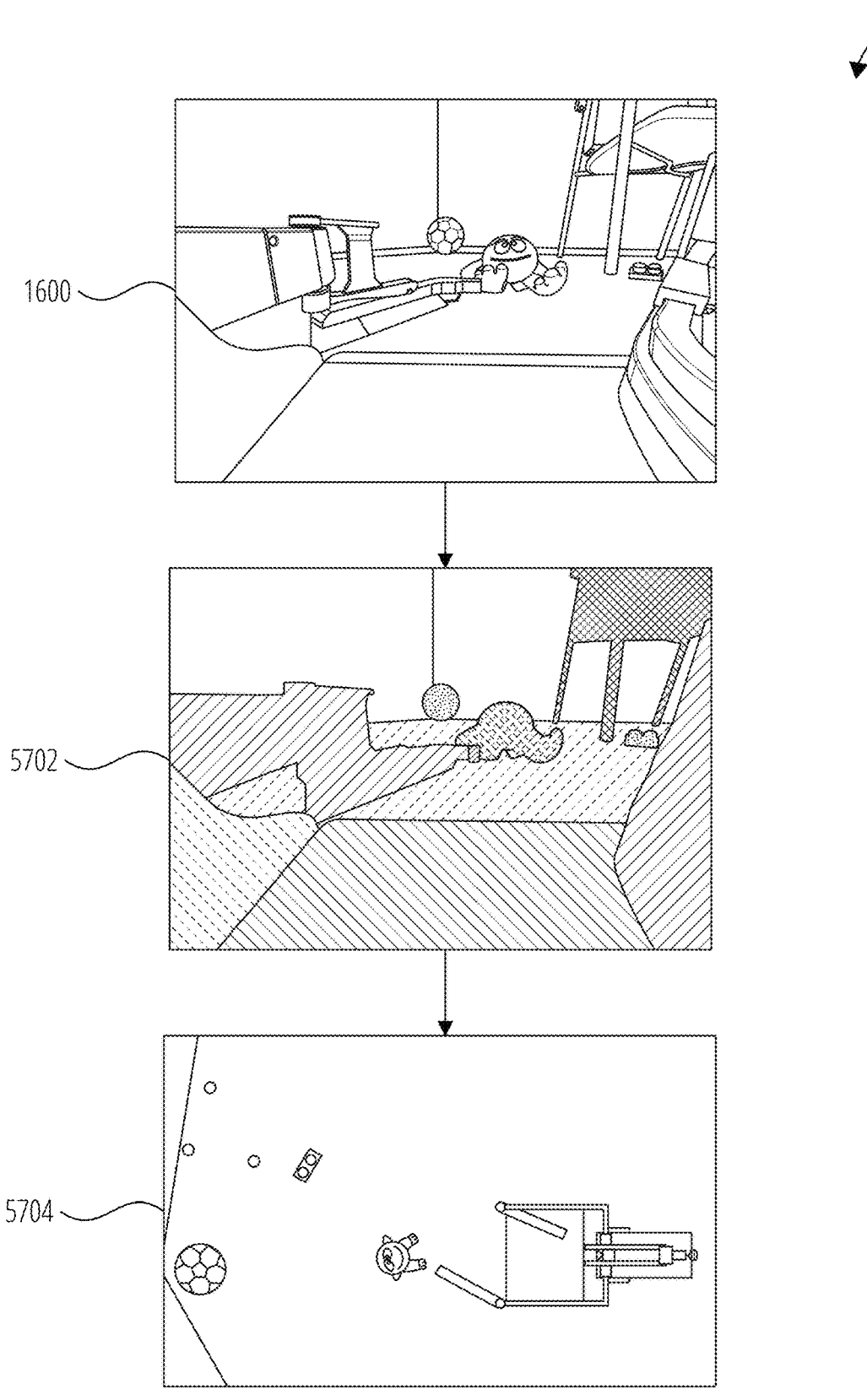
FIG. 57 illustrates an image processing routine 5700 in accordance with one embodiment.

FIG. 57 illustrates an image processing routine 5700 in accordance with one embodiment. Detected images of a scene 1600 captured by the robot sensing system 102 may undergo segmentation, such that areas of the segmented image 5602 may be identified as different objects, and those objects may be classified. Classified objects may then undergo perspective transform 5604, such that a map, as shown by the top-down view at the bottom, may be updated with objects detected through segmentation of the image.

The robot illustrated with respect to FIG. 53A through FIG. 54E may include one or more processors as part of a robotic control system such as that illustrated in FIG. 55, or may be in communication with processing utilities available on other local devices in communication with the robot or through cloud computing. The robot may include sensors as described in FIG. 53A through FIG. 54E and FIG. 56. The sensors may provide sensor data to the robotic control system. In one embodiment, this may be image data, such as the detected image of a scene 1600 of this figure.

The processors of the robotic control system may perform a segmentation step to determine separate objects or entities in its surroundings, as well as the floor those entities may rest upon, which the robot may need to traverse. This may result in a segmented image 5702. This view may also include classifications of the objects detected, as is indicated here by the different colors. The robot may determine that portions of the image represent itself (red, orange, teal, and blue), toys (yellow and beige), furniture (black), and the floor (gray). This segmentation may be performed by a perception module, such as the perception module 200 described in greater detail with respect to FIG. 2. In one embodiment, a detection module 202 in the perception module 200 may detect and apply bounding boxes and categorizations to objects detected in the detected image of a scene 1600. A scene segmentation module 210 of the perception module 200 may perform floor segmentation to identify a ground plane from the detected image of a scene 1600.

The segmented image 5702, such as one delineating detected objects and ground plane, and in some embodiments the classifications contained therein, may undergo a perspective transformation. Such a transform may be performed on an edge detection from a floor boundary mask, using mathematical algorithms applied to the segmented detections based on the geometry of the robot. These may be performed in some embodiments by a top view transformation modules 220 that resides in a mapping module 216 of a perception module 200, as described with regard to FIG. 2. In this manner, the robot may create or update a perspective transform 5704 of the objects, entities, and structures in the robot's working space. The perspective transform 5704 may be instrumental in instructing additional control engines in a robotic control system, such as a navigation module 300, a robot brain 400, and an action module 500, as is described in greater detail with respect to previously described figures.

Figure 58:
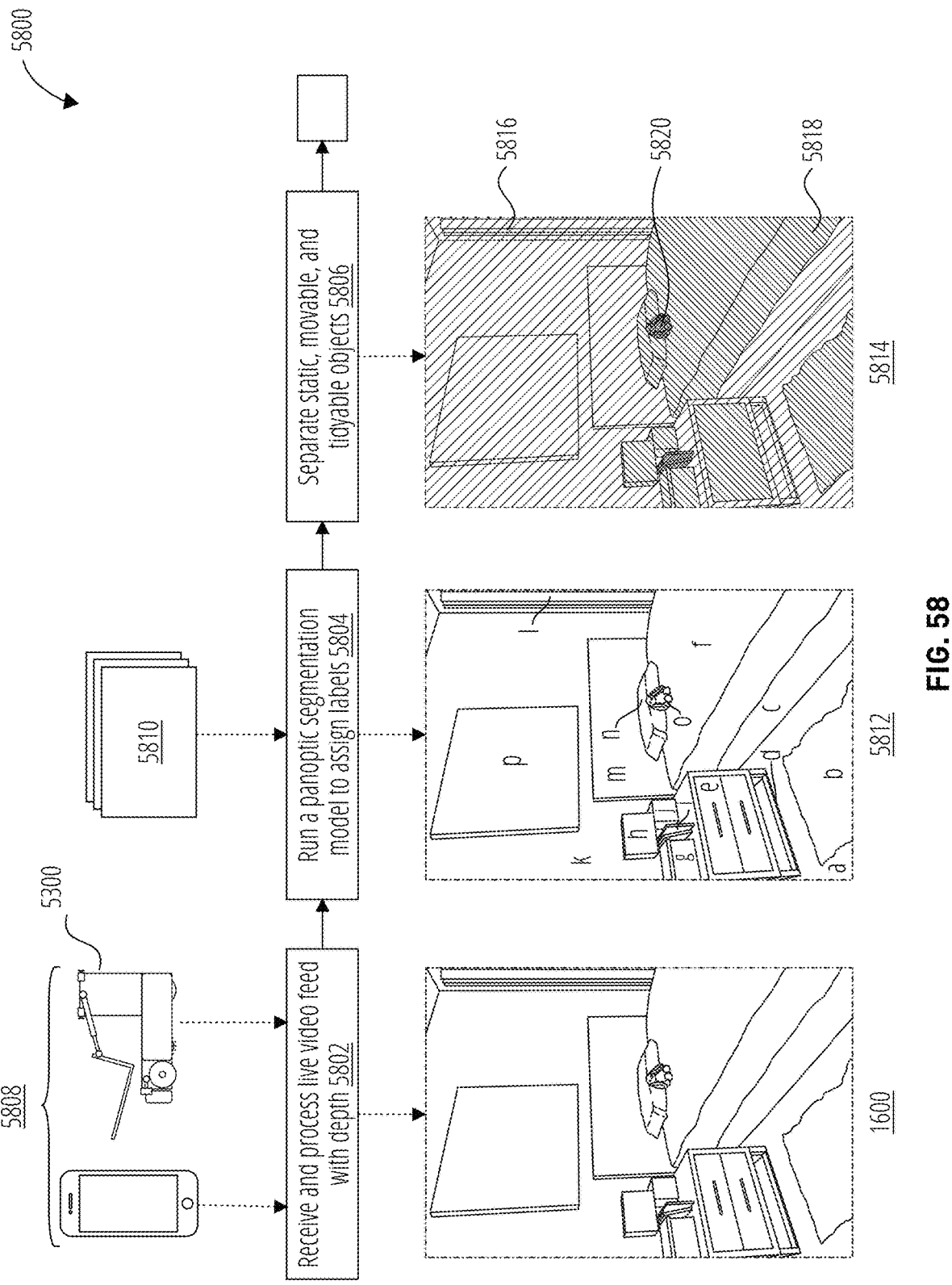
FIG. 58 illustrates a video-feed segmentation routine 5800 in accordance with one embodiment.

FIG. 58 illustrates a video-feed segmentation routine 5800 in accordance with one embodiment. Although the example video-feed segmentation routine 5800 depicts a particular sequence of operations, the sequence may be altered without departing from the scope of the present disclosure. For example, some of the operations depicted may be performed in parallel or in a different sequence that does not materially affect the function of the video-feed segmentation routine 5800. In other examples, different components of an example device or system that implements the video-feed segmentation routine 5800 may perform functions at substantially the same time or in a specific sequence.

According to some examples, the method includes receiving and processing live video with depth at block 5802. The live video feed may capture an environment to be tidied. For example, a mobile computing device 5808 may be configured to receive and process live video with depth using a camera 104 configured as part of the mobile computing device 5808 in conjunction with the robotic control system 5500. Mobile computing devices 5808 may include smartphones, tablets, personal digital assistants, laptops, and the robot 5300 disclosed herein and described in detail with respect to FIG. 53A-FIG. 54E above.

This live video may be used to begin mapping the environment to be tidied, and to support the configuration and display of an augmented reality (AR) user interface.

Alternatively, the tidying robot previously disclosed may be configured to receive and process live video with depth using their cameras camera 104 in conjunction with the robotic control system 5500. This may support the robot's initialization, configuration, and operation as disclosed herein. The live video feed may include detected images of a scene 1600 across the environment to be tidied. These may be processed to display an augmented reality view to a user on a global map of the environment to be tidied.

According to some examples, the method includes running a panoptic segmentation model 5810 to assign labels at block 5804. For example, the panoptic segmentation model 5810 illustrated in FIG. 58 may run a model to assign labels.

The model may assign a semantic label (such as an object type), an instance identifier, and a movability attribute (such as static, movable, and tidyable) for each pixel in a detected image of a scene 1600 (such as is displayed in a frame of captured video). The panoptic segmentation model 5810 may be configured as part of the logic 5514 of the robotic control system 5500 in one embodiment. The panoptic segmentation model 5810 may in this manner produce a segmented image 5812 for each detected image of a scene 1600. Elements detected in the segmented image 5812 may in one embodiment be labeled as shown:

a. floor
b. rug
c. bedframe
d. nightstand
e. drawer
f. bedspread
g. box
h. lamp
i. books
j. picture
k. wall
l. curtains
m. headboard
n. pillow
o. stuffed animal
p. painting According to some examples, the method includes separating the segmented image into static objects 5816, movable objects 5818, and tidyable objects 5820 at block 5806. For example, the robotic control system 5500 illustrated in FIG. 55 may separate static, movable, and tidyable objects. Using the segmented image 5812 and assigned labels, static structures in the represented scene, such as floors, walls, and large furniture, may be separated out as static objects 5816 from movable objects 5818 like chairs, doors, and rugs, and tidyable objects 5820 such as toys, books, and clothing. Upon completion of the video-feed segmentation routine 5800, the mobile computing device and robotic control system may act to identify objects separated into static objects, movable objects, and tidyable objects 5814.

Figure 59:
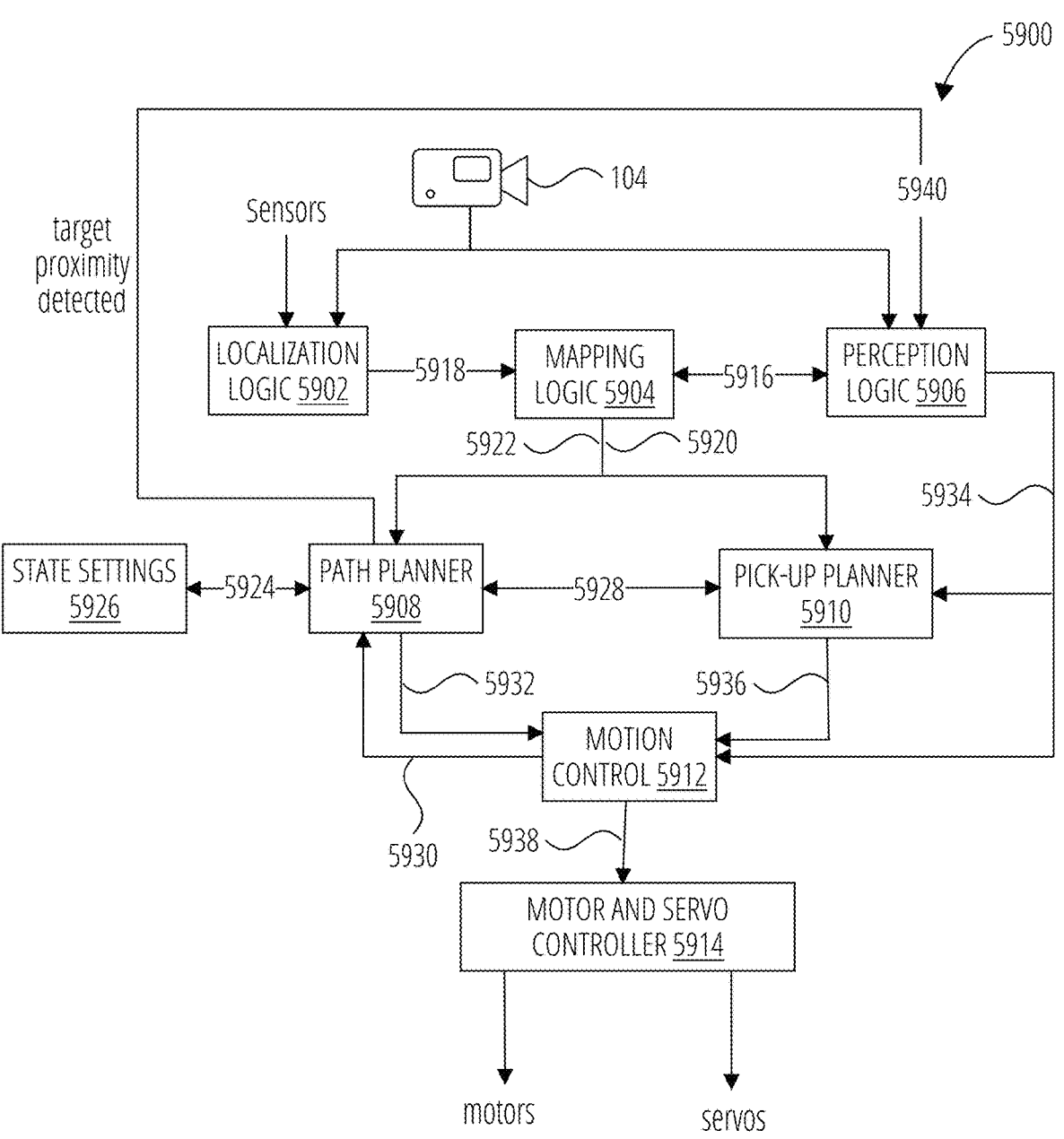
FIG. 59 depicts a robotics system 5900 in accordance with one embodiment.

FIG. 59 depicts a robotics system 5900 in one embodiment. The robotics system 5900 receives inputs from one or more sensing system 102 and one or more cameras 104 and provides these inputs for processing by localization logic 5902, mapping logic 5904, and perception logic 5906. Outputs of the processing logic are provided to the robotics system 5900 path planner 5908, pick-up planner 5910, and motion controller 5912, which in turn drives the system's motor and servo controller 5914.

The cameras may be disposed in a front-facing stereo arrangement and may include a rear-facing camera or cameras as well. Alternatively, a single front-facing camera may be utilized, or a single front-facing along with a single rear-facing camera. Other camera arrangements (e.g., one or more side or oblique-facing cameras) may also be utilized in some cases.

One or more of the localization logic 5902, mapping logic 5904, and perception logic 5906 may be located and/or executed on a mobile robot, or may be executed in a computing device that communicates wirelessly with the robot, such as a cell phone, laptop computer, tablet computer, or desktop computer. In some embodiments, one or more of the localization logic 5902, mapping logic 5904, and perception logic 5906 may be located and/or executed in the "cloud", i.e., on computer systems coupled to the robot via the Internet or other network.

The perception logic 5906 is engaged by an image segmentation activation 5940 signal and utilizes any one or more of well-known image segmentation and objection recognition algorithms to detect objects in the field of view of the camera 104. The perception logic 5906 may also provide calibration and objects 5916 signals for mapping purposes. The localization logic 5902 uses any one or more of well-known algorithms to localize the mobile robot in its environment. The localization logic 5902 outputs a local to global transform 5918 reference frame transformation and the mapping logic 5904 combines this with the calibration and objects 5916 signals to generate an environment map 5920 for the pick-up planner 5910, and object tracking 5922 signals for the path planner 5908.

In addition to the object tracking 5922 signals from the mapping logic 5904, the path planner 5908 also utilizes a current state 5924 of the system from the system state settings 5926, synchronization signals 5928 from the pick-up planner 5910, and movement feedback 5930 from the motion controller 5912. The path planner 5908 transforms these inputs into navigation waypoints 5932 that drive the motion controller 5912. The pick-up planner 5910 transforms local perception with image segmentation 5934 inputs from the perception logic 5906, the 5920 from the mapping logic 5904, and synchronization signals 5928 from the path planner 5908 into manipulation actions 5936 (e.g., of robotic graspers, shovels) to the motion controller 5912. Embodiments of algorithms utilized by the path planner 5908 and pick-up planner 5910 are described in more detail below.

In one embodiment SLAM algorithms may be utilized to generate the global map and localize the robot on the map simultaneously. A number of SLAM algorithms are known in the art and commercially available.

The motion controller 5912 transforms the navigation waypoints 5932, manipulation actions 5936, and local perception with image segmentation 5934 signals to target movement 5938 signals to the motor and servo controller 5914.

Figure 60:
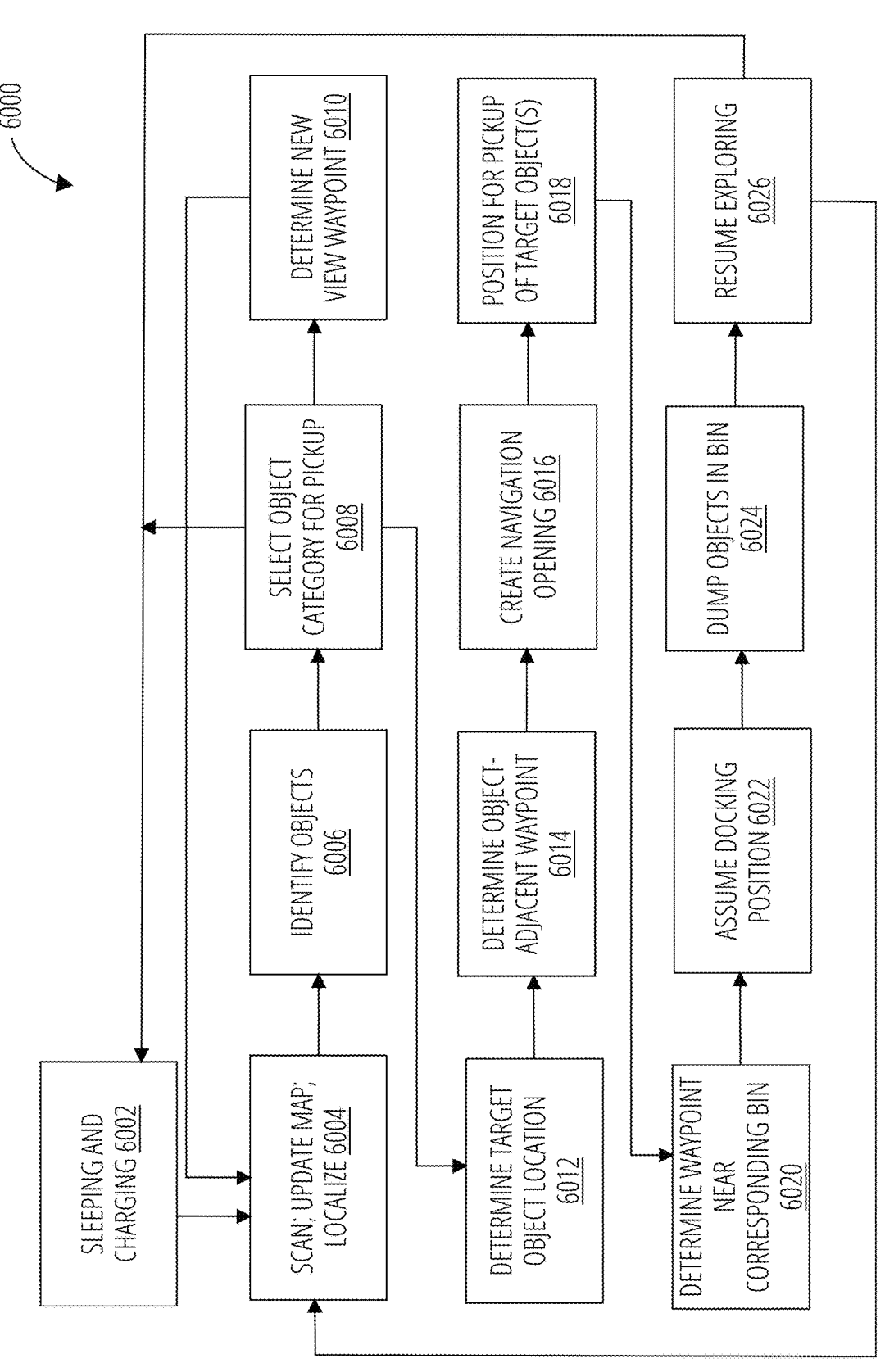
FIG. 60 depicts another robotic process 6000 in accordance with one embodiment.
Figure 61:
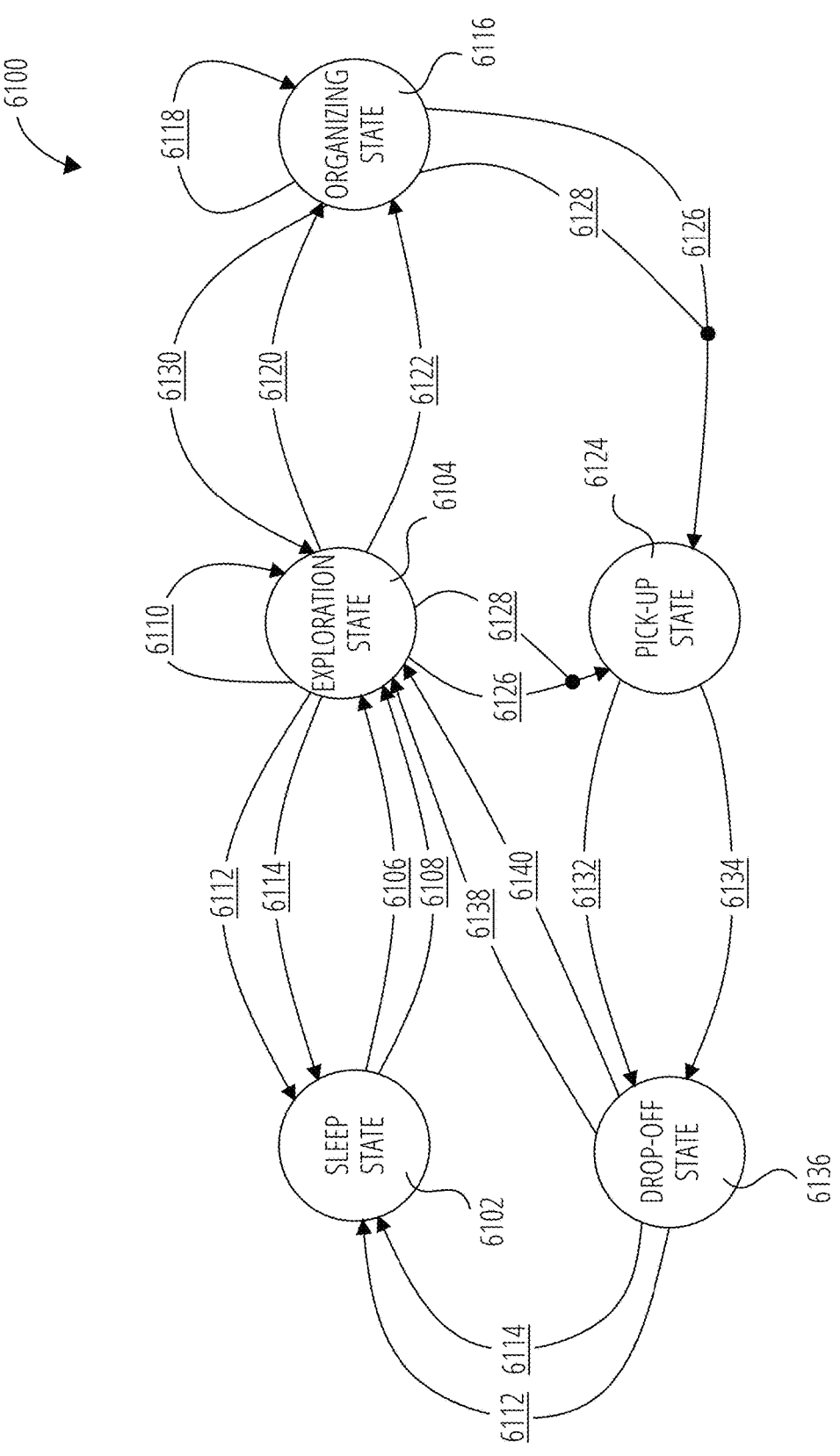
FIG. 61 depicts a state space map 6100 for a robotic system in accordance with one embodiment.

FIG. 60 also depicts a robotic process 6000 in one embodiment, in which the robotic system sequences through an embodiment of a state space map 6100 as depicted in FIG. 61.

The sequence begins with the robot sleeping (sleep state 6102) and charging at the base station (block 6002). The robot is activated, e.g., on a schedule, and enters an exploration mode (environment exploration state 6104, activation action 6106, and schedule start time 6108). In the environment exploration state 6104, the robot scans the environment using cameras (and other sensors) to update its environmental map and localize its own position on the map (block 6004, explore for configured interval 6110). The robot may transition from the environment exploration state 6104 back to the sleep state 6102 on condition that there are no more objects to pick up 6112, or the battery is low 6114.

From the environment exploration state 6104, the robot may transition to the object organization state 6116, in which it operates to move the items on the floor to organize them by category 6118. This transition may be triggered by the robot determining that objects are too close together on the floor 6120, or determining that the path to one or more objects is obstructed 6122. If none of these triggering conditions is satisfied, the robot may transition from the environment exploration state 6104 directly to the object pick-up state 6124 on condition that the environment map comprises at least one drop-off container for a category of objects 6126, and there are unobstructed items for pickup in the category of the container 6128. Likewise, the robot may transition from the object organization state 6116 to the object pick-up state 6124 under these latter conditions. The robot may transition back to the environment exploration state 6104 from the object organization state 6116 on condition that no objects are ready for pick-up 6130.

In the environment exploration state 6104 and/or the object organization state 6116, image data from cameras is processed to identify different objects (block 6006). The robot selects a specific object type/category to pick up, determines a next waypoint to navigate to, and determines a target object and location of type to pick up based on the map of environment (block 6008, block 6010, and block 6012).

In the object pick-up state 6124, the robot selects a goal location that is adjacent to the target object(s) (block 6014). It uses a path-planning algorithm to navigate itself to that new location while avoiding obstacles. The robot actuates left and right pusher arms to create an opening large enough that the target object may fit through, but not so large that other unwanted objects are collected when the robot drives forward (block 6016). The robot drives forward so that the target object is between the left and right pusher arms, and the left and right pusher arms work together to push the target object onto the collection shovel (block 6018).

The robot may continue in the object pick-up state 6124 to identify other target objects of the selected type to pick up based on the map of the environment. If other such objects are detected, the robot selects a new goal location that is adjacent to the target object. It uses a path-planning algorithm to navigate itself to that new location while avoiding obstacles while carrying the target object(s) that were previously collected. The robot actuates left and right pusher arms to create an opening large enough that the target object may fit through, but not so large that other unwanted objects are collected when the robot drives forward. The robot drives forward so that the next target object(s) are between the left and right pusher arms. Again, the left and right pusher arms work together to push the target object onto the collection shovel.

On condition that all identified objects in category are picked up 6132, or if the shovel is at capacity 6134, the robot transitions to the object drop-off state 6136 and uses the map of the environment to select a goal location that is adjacent to the bin for the type of objects collected and uses a path planning algorithm to navigate itself to that new location while avoiding obstacles (block 6020). The robot backs up towards the bin into a docking position where the back of the robot is aligned with the back of the bin (block 6022). The robot lifts the shovel up and backward, rotating over a rigid arm at the back of the robot (block 6024). This lifts the target objects up above the top of the bin and dumps them into the bin.

From the object drop-off state 6136, the robot may transition back to the environment exploration state 6104 on condition that there are more items to pick up 6138, or it has an incomplete map of the environment 6140. the robot resumes exploring and the process may be repeated (block 6026) for each other type of object in the environment having an associated collection bin.

The robot may alternatively transition from the object drop-off state 6136 to the sleep state 6102 on condition that there are no more objects to pick up 6112 or the battery is low 6114. Once the battery recharges sufficiently, or at the next activation or scheduled pick-up interval, the robot resumes exploring and the process may be repeated (block 6026) for each other type of object in the environment having an associated collection bin.

FIG. 61 illustrates a state space map 6100 in accordance with one embodiment through which a robot 5300 may sequence as described above.

Figure 62:
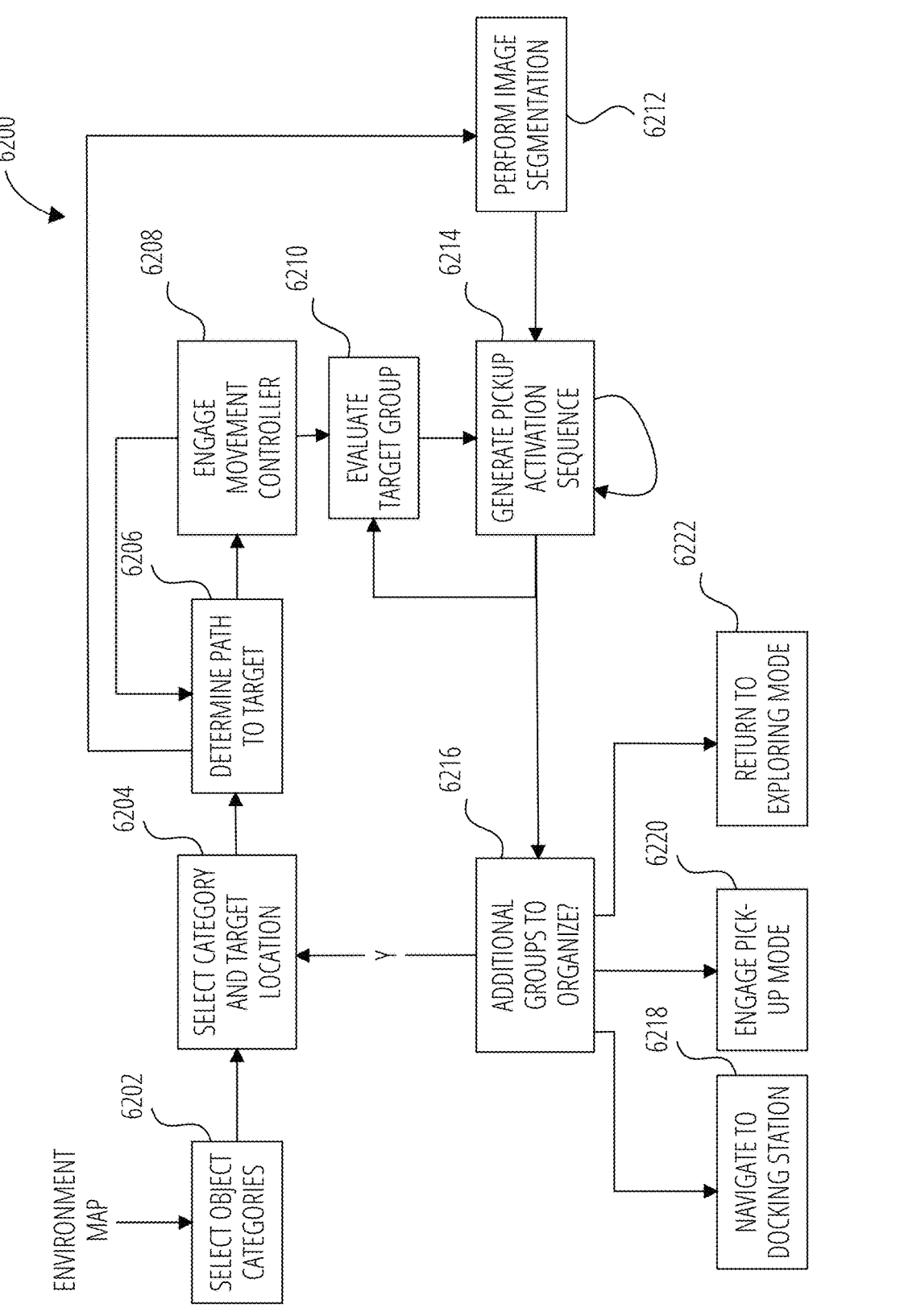
FIG. 62 depicts a robotic control algorithm 6200 for a robotic system in accordance with one embodiment.

FIG. 62 depicts a robotic control algorithm 6200 for a robotic system in one embodiment. The robotic control algorithm 6200 begins by selecting one or more category of objects to organize (block 6202). Within the selected category or categories, a grouping is identified that determines a target category and starting location for the path (block 6204). Any of a number of well-known clustering algorithms may be utilized to identify object groupings within the category or categories.

A path is formed to the starting goal location, the path comprising zero or more waypoints (block 6206). Movement feedback is provided back to the path planning algorithm. The waypoints may be selected to avoid static and/or dynamic (moving) obstacles (objects not in the target group and/or category). The robot's movement controller is engaged to follow the waypoints to the target group (block 6208). The target group is evaluated upon achieving the goal location, including additional qualifications to determine if it may be safely organized (block 6210).

The robot's perception system is engaged (block 6212) to provide image segmentation for determination of a sequence of activations generated for the robot's manipulators (e.g., arms) and positioning system (e.g., wheels) to organize the group (block 6214). The sequencing of activations is repeated until the target group is organized, or fails to organize (failure causing regression to block 6210). Engagement of the perception system may be triggered by proximity to the target group. Once the target group is organized, and on condition that there is sufficient battery life left for the robot and there are more groups in the category or categories to organize, these actions are repeated (block 6216).

In response to low battery life the robot navigates back to the docking station to charge (block 6218). However, if there is adequate battery life, and on condition that the category or categories are organized, the robot enters object pick-up mode (block 6220), and picks up one of the organized groups for return to the drop-off container. Entering pickup mode may also be conditioned on the environment map comprising at least one drop-off container for the target objects, and the existence of unobstructed objects in the target group for pick-up. On condition that no group of objects is ready for pick up, the robot continues to explore the environment (block 6222).

Figure 63:
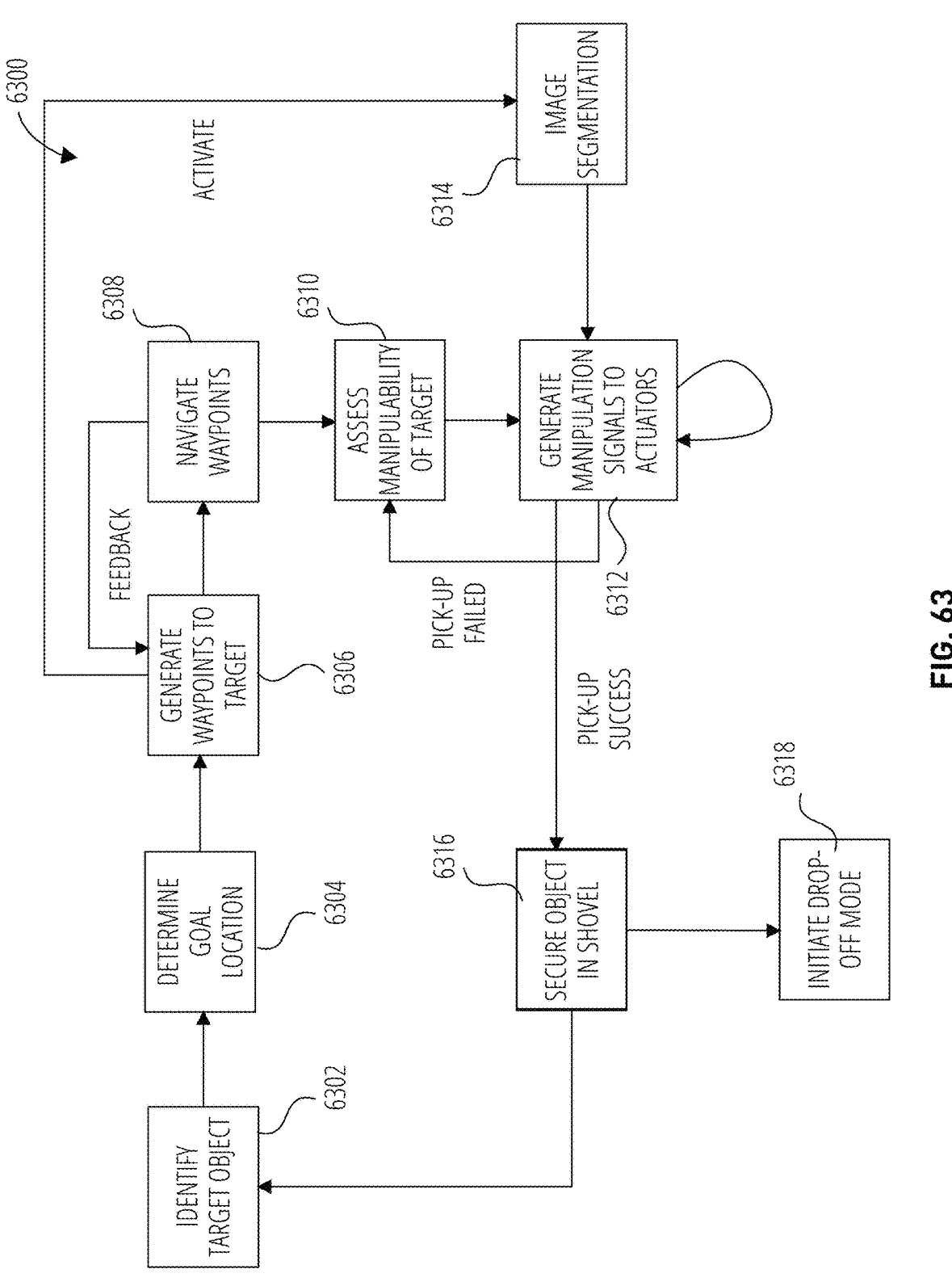
FIG. 63 depicts a robotic control algorithm 6300 for a robotic system in accordance with one embodiment.

FIG. 63 depicts a robotic control algorithm 6300 for a robotic system in one embodiment. A target object in the chosen object category is identified (item 6302) and a goal location for the robot is determined as an adjacent location of the target object (item 6304). A path to the target object is determined as a series of waypoints (item 6306) and the robot is navigated along the path while avoiding obstacles (item 6308).

Once the adjacent location is reached, an assessment of the target object is made to determine if may be safely manipulated (item 6310). On condition that the target object may be safely manipulated, the robot is operated to lift the object using the robot's manipulator arm, e.g., shovel (item 6312). The robot's perception module may by utilized at this time to analyze the target object and nearby objects to better control the manipulation (item 6314).

The target object, once on the shovel or other manipulator arm, is secured (item 6316). On condition that the robot does not have capacity for more objects, or it's the last object of the selected category (ies), object drop-off mode is initiated (item 6318). Otherwise, the robot may begin the process again (6302).

Figure 64:
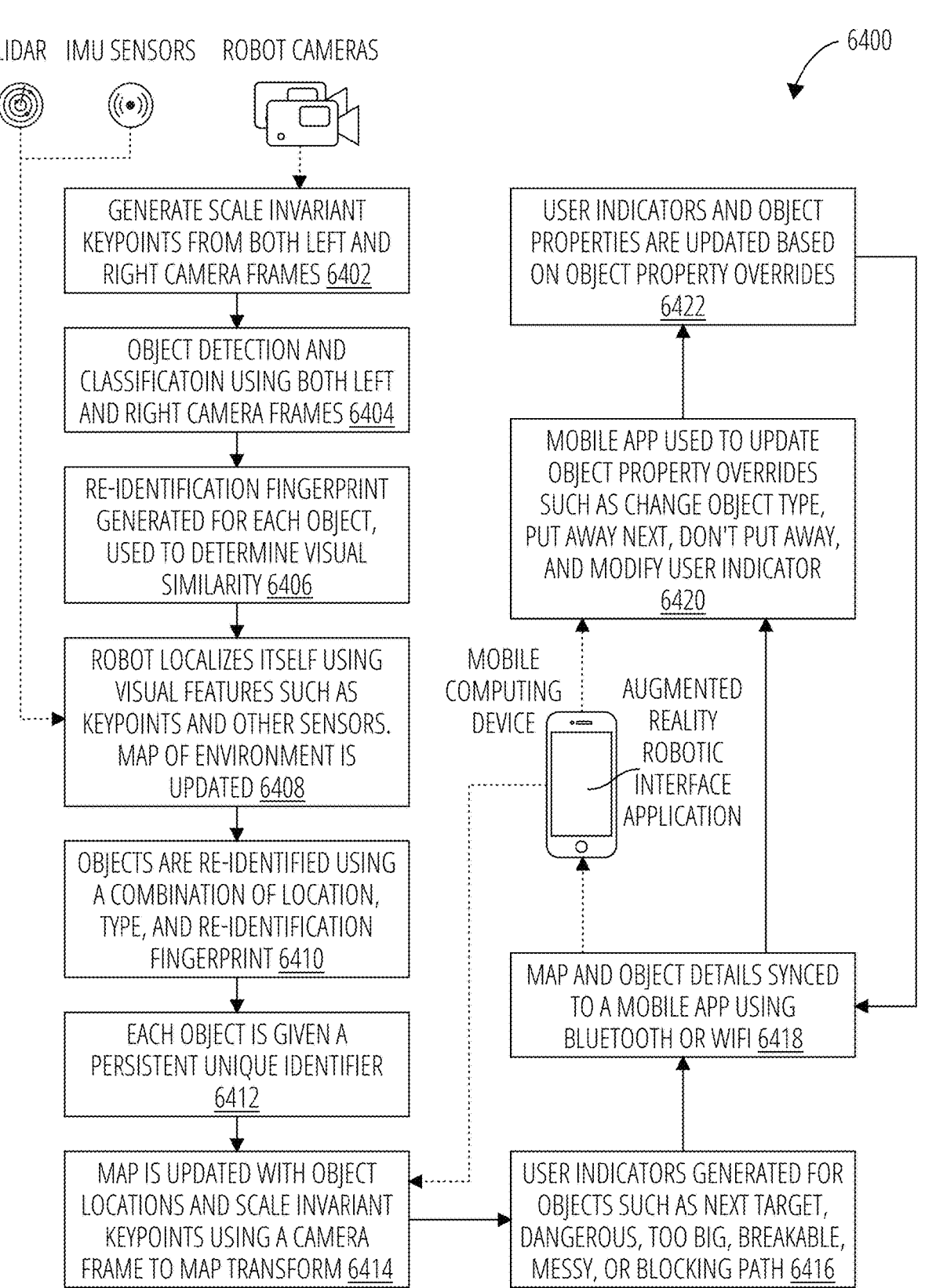
FIG. 64 depicts a robotic control algorithm 6400 in accordance with one embodiment.

FIG. 64 illustrates a robotic control algorithm 6400 in accordance with one embodiment. At block 6402, a left camera and a right camera, or some other configuration of robot cameras, of a robot such as that disclosed herein, may provide input that may be used to generate scale invariant keypoints within a robot's working space.

"Scale invariant keypoint" or "visual keypoint" in this disclosure refers to a distinctive visual feature that may be maintained across different perspectives, such as photos taken from different areas. This may be an aspect within an image captured of a robot's working space that may be used to identify a feature of the area or an object within the area when this feature or object is captured in other images taken from different angles, at different scales, or using different resolutions from the original capture.

Scale invariant keypoints may be detected by a robot or an augmented reality robotic interface installed on a mobile computing device based on images taken by the robot's cameras or the mobile computing device's cameras. Scale invariant keypoints may help a robot or an augmented reality robotic interface on a mobile computing device to determine a geometric transform between camera frames displaying matching content. This may aid in confirming or fine-tuning an estimate of the robot's or mobile computing device's location within the robot's working space.

Scale invariant keypoints may be detected, transformed, and matched for use through algorithms well understood in the art, such as (but not limited to) Scale-Invariant Feature Transform (SIFT), Speeded-Up Robust Features (SURF), Oriented Robust Binary features (ORB), and SuperPoint.

Objects located in the robot's working space may be detected at block 6404 based on the input from the left camera and the right camera, thereby defining starting locations for the objects and classifying the objects into categories. At block 6406, re-identification fingerprints may be generated for the objects, wherein the re-identification fingerprints are used to determine visual similarity of objects detected in the future with the objects. The objects detected in the future may be the same objects, redetected as part of an update or transformation of the global area map, or may be similar objects located similarly at a future time, wherein the re-identification fingerprints may be used to assist in more rapidly classifying the objects.

At block 6408, the robot may be localized within the robot's working space. Input from at least one of the left camera, the right camera, light detecting and ranging (LI-DAR) sensors, and inertial measurement unit (IMU) sensors may be used to determine a robot location. The robot's working space may be mapped to create a global area map that includes the scale invariant keypoints, the objects, and the starting locations of the objects. The objects within the robot's working space may be re-identified at block 6410 based on at least one of the starting locations, the categories, and the re-identification fingerprints. Each object may be assigned a persistent unique identifier at block 6412.

At block 6414, the robots may receive a camera frame from an augmented reality robotic interface installed as an application on a mobile computing device operated by a use and may update the global area map with the starting locations and scale invariant keypoints using a camera frame to global area map transform based on the camera frame. In the camera frame to global area map transform, the global area map may be searched to find a set of scale invariant keypoints that match the those detected in the mobile camera frame by using a specific geometric transform. This transform may maximize the number of matching keypoints and minimize the number of non-matching keypoints while maintaining geometric consistency.

At block 6416, user indicators may be generated for objects, wherein user indicators may include next target, target order, dangerous, too big, breakable, messy, and blocking travel path. The global area map and object details may be transmitted to the mobile computing device at block 6418, wherein object details may include at least one of visual snapshots, the categories, the starting locations, the persistent unique identifiers, and the user indicators of the objects. This information may be transmitted using wireless signaling such as BlueTooth or Wifi, as supported by the communications 5326 module introduced in FIG. 53C and the network interface 5512 introduced in FIG. 55.

The updated global area map, the objects, the starting locations, the scale invariant keypoints, and the object details, may be displayed on the mobile computing device using the augmented reality robotic interface. The augmented reality robotic interface may accept user inputs to the augmented reality robotic interface, wherein the user inputs indicate object property overrides including change object type, put away next, don't put away, and modify user indicator, at block 6420. The object property overrides may be transmitted from the mobile computing device to the robot and may be used at block 6422 to update the global area map, the user indicators, and the object details. Returning to block 6418, the robot may re-transmit its updated global area map to the mobile computing device to resynchronize this information.

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation— [entity] configured to [perform one or more tasks]—is used herein to refer to structure (i.e., something physical, such as an electronic circuit). More specifically, this formulation is used to indicate that this structure is arranged to perform the one or more tasks during operation. A structure may be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it).

Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed field programmable gate array (FPGA), for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112 (f) for that claim element. Accordingly, claims in this application that do not otherwise include the "means for" [performing a function] construct should not be interpreted under 35 U.S.C. § 112 (f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede and do not imply any type of ordering (e.g., spatial, temporal, logical, etc.), unless stated otherwise. For example, in a register file having eight registers, the terms "first register" and "second register" may be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the disclosure as claimed. The scope of disclosed subject matter is not limited to the depicted embodiments but is rather set forth in the following Claims.

What is claimed is:

1. A method comprising:
receiving, at a perception module configured in operational logic of a robotic control system, image data from a robot's sensors,
  wherein the perception module comprises a detection module, a scene segmentation module, and a mapping module,
  wherein the robot's sensors include at least one of cameras, lidar sensors, inertial measurement unit (IMU) sensors, wheel encoders, and other sensors, and
  wherein the operational logic of the robotic control system comprises executable instructions stored by a storage device of the robotic control system and executed by a processor of the robotic control system;
detecting, by the detection module, objects from the image data, as two-dimensional (2D) bounding boxes with object classes;
generating, by the detection module:
  predicted three-dimensional (3D) object locations, using the 2D bounding boxes and a ground plane; and
  two-dimensional-three-dimensional (2D-3D) bounding boxes with class labels, the 2D-3D bounding boxes based on the 2D bounding boxes and the predicted 3D object locations;
generating, by the scene segmentation module:
  a multi-class segmentation map, using a segmentation model to segregate a floor boundary and other relevant regions in the image data;
  an edge map including the floor boundary and other relevant boundaries, with semantic information; and
  semantic boundary masks, from the multi-class segmentation map, wherein the semantic boundary masks identify relevant boundaries and their semantic information;
generating, by the mapping module, using the 2D-3D bounding boxes and the semantic boundary masks:
  a scene layout map, wherein the scene layout map includes global elements relevant for global mapping; and
  a local occupancy map, wherein the local occupancy map includes local elements useful for local path planning and local obstacle avoidance;

receiving, at a navigation module configured in the operational logic of the robotic control system, the scene layout map, and the local occupancy map, wherein the navigation module includes:

a simultaneous localization and mapping module (SLAM);

a global mapper module; and a fusion and inflation module;

generating, by the SLAM, using lidar data, IMU data, and wheel encoding data:

a SLAM global map, which comprises a 2D occupancy grid representation of an environment with obstacle information at lidar height and real-time location information of the robot; and a robot pose;

generating, by the global mapper module, using the SLAM global map, the lidar data, and the scene layout map:

a navigation global map, which represents an improved 2D occupancy grid representation of the environment over the SLAM global map;

generating, by the fusion and inflation module using the lidar data, the navigation global map, and the local occupancy map:

a fused local occupancy map, with the lidar data and information from the navigation global map and the local occupancy map, making the fused local occupancy map useful for obstacle avoidance;

an inflated global map, which includes buffer regions for the robot around obstacles; and an inflated local map based on the fused local occupancy map, which includes the buffer regions for the robot around the obstacles;

receiving, at a robot brain configured in the operational logic of the robotic control system, the inflated global map, the robot pose, and the inflated local map;

generating, by the robot brain, robot action commands based on at least one of the inflated global map, the robot pose, and the inflated local map;

receiving, at an action module configured in the operational logic of the robotic control system, the robot action commands; and controlling robot actuators in response to the robot action commands.

2. The method of claim 1, further comprising:

receiving, at the robot brain, an interface signal from a robot user interface; and generating, by the robot brain, the robot action commands based on at least one of the inflated global map, the robot pose, the inflated local map, and the interface signal.

3. The method of claim 1, further comprising:

detection filtering, by the detection module, to remove the 2D-3D bounding boxes that are not on the ground or are inside of a shovel on the robot.

4. The method of claim 1, further comprising:

running an edge detection algorithm, by the scene segmentation module, on the multi-class segmentation map, resulting in the semantic boundary masks with the semantic information.

5. The method of claim 1, further comprising:

adding, using a labeling module included in the mapping module, additional semantic labels to the segmentation boundary masks by:

determining the points in the edge map that are inside a corresponding 2D bounding box or a corresponding 2D-3D bounding box; and assigning all of the points inside of the corresponding 2D bounding box or the corresponding 2D-3D bounding box a same label as that of the corresponding 2D bounding box or the corresponding 2D-3D bounding box, thereby resulting in a semantically rich boundary map;

warping, using a top view transformation module included in the mapping module, the semantically rich boundary map into a point cloud with real-world coordinates and semantic label classes by using at least one of:

a lookup table that stores pixel mappings from an image space to real-world coordinates; and a homography matrix that maps pixels from the image space to the real-world coordinates in real time;

filtering, by a scene layout module included in the mapping module, the point cloud with the real-world coordinates and the semantic label classes, keeping the semantically relevant points needed for the global mapping and discarding points not needed for the global mapping; and filtering, by a local occupancy module included in the mapping module, the point cloud with real-world coordinates and semantic label classes, keeping the semantically relevant points needed for the local path planning and the obstacle avoidance.

6. The method of claim 1, further comprising:

processing, using a filter and fusion module included in the SLAM, the lidar data, the IMU data, and the wheel encoding data by:

removing noise and potentially unreliable data from the lidar data and the IMU data resulting in filtered lidar data and filtered IMU data;

removing the noise and potentially unreliable data from an angular velocity output of the wheel encoding data; and fusing non-angular velocity output data of the wheel encoding data with the filtered IMU data to generate filtered and fused odometry data.

7. The method of claim 6, further comprising:

generating, using a main pipeline included in the SLAM, the 2D occupancy grid representation of the environment with the obstacle information at lidar height and the real-time location information of the robot by:

receiving the filtered lidar data and the filtered and fused odometry data;

creating a new 2D point registration for each new laser measurement at a given odometry reading;

estimating and correcting odometry slippages between each odometry reading by scan-to-scan matching the new 2D point registrations, thereby resulting in odometry slippage data points;

adding the odometry slippage data points to a pose-graph, resulting in an optimized pose-graph;

looking for loop closure in a chain of 'N' of the odometry slippage data points, wherein the loop closure represents a process of determining if a current location observed by the robot's sensors has been previously visited by the robot;

on condition the loop closure is detected:

correcting odometry poses for each new 2D point registration based on the optimized pose-graph, thereby resulting in loop closure pose corrections; and forming a common 2D occupancy grid using the 2D point registrations and probabilistically updated 2D point registrations, wherein the common 2D occupancy grid is the 2D occupancy grid representation of the environment with the obstacle information at lidar height and the real-time location information of the robot.

8. The method of claim 7, further comprising:

processing, using a sensor data filter, the lidar data, and the scene layout map by:

removing the noise and potentially unreliable data from the lidar data; and passing the scene layout map through a semantic filter that caters to the filtering of points from the scene layout map based on the semantic information provided, resulting in filtered lidar data and a filtered scene layout map where unreliable and irrelevant semantic labels have been removed during mapping.

9. The method of claim 8, further comprising:

generating, using a multi-sensor data registration, an enhanced 2D occupancy grid representation of the environment with the obstacle information at lidar height, from the filtered lidar data and the filtered scene layout map, by:

receiving the filtered lidar data and the filtered scene layout map;

creating a new enhanced 2D point registration for each new laser measurement and the filtered scene layout map using the real-time location information of the robot from the SLAM; and updating all registrations from all of the robot's sensors, probabilistically, together in an enhanced common 2D occupancy grid based on predetermined confidence values of the robot's sensors.

10. The method of claim 9, further comprising:

receiving, by loop closure integration, the new enhanced 2D point registrations and the SLAM global map including the loop closure pose corrections;

reiterating, temporally, over the new 2D point registrations that are near the loop closure pose corrections for all of the updated registrations of the robot's sensors from the multi-sensor data registration to provide reiterated loop closure pose corrections;

updating map pose data of each of the robot's sensors using the reiterated loop closure pose corrections;

re-updating the updated registrations of each of the robot's sensors with the updated map pose data, thereby resulting in enhanced registrations; and re-updating, probabilistically with the enhanced registrations, respective cells in the enhanced common 2D occupancy grid, thereby resulting in the navigation global map.

11. An apparatus comprising:

a robot;

a processor; and a memory storing instructions that, when executed by the processor, configure the apparatus to:

receive, at a perception module configured in operational logic of a robotic control system, image data from the robot's sensors, wherein the perception module comprises a detection module, a scene segmentation module, and a mapping module, wherein the robot's sensors include at least one of cameras, lidar sensor, inertial measurement unit (IMU) sensors, wheel encoder, and other sensors, and wherein the operational logic of the robotic control system comprises executable instructions stored by a storage device of the robotic control system and executed by a processor of the robotic control system;

detect, by the detection module, objects from the image data, as two-dimensional (2D) bounding boxes with object classes;

generate, by the detection module:

predicted three-dimensional (3D) object locations, using the 2D bounding boxes and a ground plane; and two-dimensional-three-dimensional (2D-3D) bounding boxes with class labels, the 2D-3D bounding boxes based on the 2D bounding boxes and the predicted 3D object locations;

generate, by the scene segmentation module:

a multi-class segmentation map, using a segmentation model to segregate a floor boundary and other relevant regions in the image data;

an edge map including the floor boundary and other relevant boundaries, with semantic information; and semantic boundary masks, from the multi-class segmentation map, wherein the semantic boundary masks identify relevant boundaries and their semantic information;

generate, by the mapping module, using the 2D-3D bounding boxes and the semantic boundary masks:

a scene layout map, wherein the scene layout map includes global elements relevant for global mapping; and a local occupancy map, wherein the local occupancy map includes local elements useful for local path planning and local obstacle avoidance;

receive, at a navigation module configured in the operational logic of the robotic control system, the scene layout map, and the local occupancy map, wherein the navigation module includes:

a simultaneous localization and mapping module (SLAM);

a global mapper module; and a fusion and inflation module;

generate, by the SLAM, using lidar data, (IMU) data, and wheel encoding data:

a SLAM global map, which comprises a 2D occupancy grid representation of an environment with obstacle information at lidar height and real-time location information of the robot; and a robot pose;

generate, by the global mapper module, using the SLAM global map, the lidar data, and the scene layout map:

a navigation global map, which represents an improved 2D occupancy grid representation of the environment over the SLAM global map;

generate, by the fusion and inflation module using the lidar data, the navigation global map, and the local occupancy map:

a fused local occupancy map, with the lidar data and information from the navigation global map and the local occupancy map, making the fused local occupancy map useful for obstacle avoidance;

an inflated global map, which includes buffer regions for the robot around obstacles; and an inflated local map based on the fused local occupancy map, which includes the buffer regions for the robot around the obstacles;

receive, at a robot brain, the inflated global map, the robot pose, and the inflated local map;

generate, by the robot brain configured in the operational logic of the robotic control system, robot action commands based on at least one of the inflated global map, the robot pose, and the inflated local map;

receive, at an action module configured in the operational logic of the robotic control system, the robot action commands; and control robot actuators in response to the robot action commands.

12. The apparatus of claim 11, wherein the instructions further configure the apparatus to:

receive, at the robot brain, an interface signal from a robot user interface; and generate, by the robot brain, the robot action commands based on at least one of the inflated global map, the robot pose, the inflated local map, and the interface signal.

13. The apparatus of claim 11, wherein the instructions further configure the apparatus to:

detection filter, by the detection module, to remove the 2D-3D bounding boxes that are not on the ground or are inside of a shovel on the robot.

14. The apparatus of claim 11, wherein the instructions further configure the apparatus to:

run an edge detection algorithm, by the scene segmentation module, on the multi-class segmentation map, resulting in the semantic boundary masks with the semantic information.

15. The apparatus of claim 11, wherein the instructions further configure the apparatus to:

add, using a labeling module included in the mapping module, additional semantic labels to the segmentation boundary masks by:

determine the points in the edge map that are inside a corresponding 2D bounding box or a corresponding 2D-3D bounding box; and assign all of the points inside of the corresponding 2D bounding box or the corresponding 2D-3D bounding box a same label as that of the corresponding 2D bounding box or the corresponding 2D-3D bounding box, thereby resulting in a semantically rich boundary map;

warp, using a top view transformation module included in the mapping module, the semantically rich boundary map into a point cloud with real-world coordinates and semantic label classes by using at least one of:

a lookup table that stores pixel mappings from an image space to real-world coordinates; and a homography matrix that maps pixels from the image space to the real-world coordinates in real time;

filter, by a scene layout module included in the mapping module, the point cloud with the real-world coordinates and the semantic label classes, keeping the semantically relevant points needed for the global mapping and discarding points not needed for the global mapping; and filter, by a local occupancy module included in the mapping module, the point cloud with real-world coordinates and semantic label classes, keeping the semantically relevant points needed for the local path planning and the obstacle avoidance.

16. The apparatus of claim 11, wherein the instructions further configure the apparatus to:

process, using a filter and fusion module included in the SLAM, the lidar data, the IMU data, and the wheel encoding data by:

remove noise and potentially unreliable data from the lidar data and the IMU data resulting in filtered lidar data and filtered IMU data;

remove the noise and potentially unreliable data from an angular velocity output of the wheel encoding data; and fuse non-angular velocity output data of the wheel encoding data with the filtered IMU data to generate filtered and fused odometry data.

17. The apparatus of claim 16, wherein the instructions further configure the apparatus to:

generate, using a main pipeline included in the SLAM, the 2D occupancy grid representation of the environment with the obstacle information at lidar height and the real-time location information of the robot by:

receive the filtered lidar data and the filtered and fused odometry data;

create a new 2D point registration for each new laser measurement at a given odometry reading;

estimate and correct odometry slippages between each odometry reading by scan-to-scan matching the new 2D point registrations, thereby resulting in odometry slippage data points;

add the odometry slippage data points to a pose-graph, resulting in an optimized pose-graph;

look for loop closure in a chain of 'N' of the odometry slippage data points, wherein the loop closure represents a process of determining if a current location observed by the robot's sensors has been previously visited by the robot;

on condition the loop closure is detected:

correct the odometry poses for each new 2D point registration based on the optimized pose-graph, thereby resulting in loop closure pose corrections;

form a common 2D occupancy grid using the 2D point registrations and probabilistically updated 2D point registrations, wherein the common 2D occupancy grid is the 2D occupancy grid representation of the environment with the obstacle information at lidar height and the real-time location information of the robot.

18. The apparatus of claim 17, wherein the instructions further configure the apparatus to:

process, using a sensor data filter, the lidar data, and the scene layout map by:

remove the noise and potentially unreliable data from the lidar data; and pass the scene layout map through a semantic filter that caters to the filtering of points from the scene layout map based on the semantic information provided, resulting in filtered lidar data and a filtered scene layout map where unreliable and irrelevant semantic labels have been removed during mapping.

19. The apparatus of claim 18, wherein the instructions further configure the apparatus to:

generate, using a multi-sensor data registration, an enhanced 2D occupancy grid representation of the environment with the obstacle information at lidar height, from the filtered lidar data and the filtered scene layout map by:

receive filtered lidar data and the filtered scene layout map;

create a new enhanced 2D point registration for each new laser measurement and the filtered scene layout map using the real-time location information of the robot from the SLAM; and update all registrations from all of the robot's sensors, probabilistically, together in an enhanced common 2D occupancy grid based on predetermined confidence values of the robot's sensors.

20. The apparatus of claim 19, wherein the instructions further configure the apparatus to:

receive, by loop closure integration, the new enhanced 2D point registrations and the SLAM global map including the loop closure pose corrections;

reiterate, temporally, over the new 2D point registrations that are near the loop closure pose corrections for all of the updated registrations of the robot's sensors from the multi-sensor data registration to provide reiterated loop closure pose corrections;

update map pose data of each of the robot's sensors using the reiterated loop closure pose corrections;

re-update the updated registrations of each of the robot's sensors with the updated map pose data, thereby resulting in enhanced registrations; and re-update, probabilistically with the enhanced registrations, respective cells in the enhanced common 2D occupancy grid, thereby resulting in the navigation global map.

* * * * *